US010856565B2

(12) United States Patent
Chen

(10) Patent No.: US 10,856,565 B2
(45) Date of Patent: *Dec. 8, 2020

(54) OAT PROTEIN GELS

(71) Applicant: THE GOVERNORS OF THE UNIVERSITY OF ALBERTA, Edmonton (CA)

(72) Inventor: Lingyun Chen, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 173 days.

This patent is subject to a terminal disclaimer.

(21) Appl. No.: 15/919,081

(22) Filed: Mar. 12, 2018

(65) Prior Publication Data
US 2019/0053525 A1    Feb. 21, 2019

Related U.S. Application Data

(62) Division of application No. 14/956,174, filed on Dec. 1, 2015, now Pat. No. 10,701,962.

(60) Provisional application No. 62/085,971, filed on Dec. 1, 2014.

(51) Int. Cl.
*A23L 29/206* (2016.01)
*A23J 1/12* (2006.01)
*A23J 3/34* (2006.01)
*A23L 33/21* (2016.01)

(52) U.S. Cl.
CPC ............. *A23L 29/206* (2016.08); *A23J 1/12* (2013.01); *A23J 3/346* (2013.01); *A23L 33/21* (2016.08)

(58) Field of Classification Search
None
See application file for complete search history.

(56) References Cited

PUBLICATIONS

Ma and Wood. "Functional Properties of Oat Proteins Modified by Acylation, Trypsin Hydrolysis or Linoleate Treatment". JAOCS, vol. 64, No. 12, Dec. 1987. pp. 1726-1731. (Year: 1987).*
Tseng, et al. "Effects of Inulin/Oligofructose on the Thermal Stability and Acid Induced Gelation of Soy Proteins". Journal of Food Science. vol. 73, No. 2, 2008. pp. E44-E50. (Year: 2008).*
Ma and Khanzada, et al. "Thermal Gelation of Oat Protein". J. Agric. Food Chem. 1988, 36 (2), 275-280. (Year: 1988).*
"Make your own microwaveable oatmeal". Available online as of Sep. 4, 2012 from www.momskitchenhandbook.com. pp. 1-11. (Year: 2012).*
Ma and Khanzada. "Functional Properties of Deamidated Oat Protein Isolates". Journal of Food Science, vol. 52, No. 6, 1987. pp. 1583-1587 (Year: 1987).*
Adler-Nissen, J. (1979). Determination of degree of hydrolysis of food protein hydrolysates by tnnitrobenzenesulfonic acid. Journal of Agricultural and Food Chemistry, 6, 1256-1262.
G.E. Remondetto, Cold Gelation of β-lactoglobulin in the Presence of Iron.
Banerjee, P., Keener, K M., & Lukito, V. D. (2011). Influence of carbon dioxide on the activity of chicken egg with lysozyme. Poultry Science, 90( 4), 889-895.
Benitez, R., Ibarz, A, & Pagan, J. (2008). Protein hydrolysates: Processes and applications. Acta Bioquimica Clinica Latinoamericana, 42(2), 227-236.
Braaten, J. T.,Wood, P. J., & Scott, F.W. (1994). Oat beta-glucan reduces blood cholesterol concentration in hypercholesterolemic subjects. European Journal of Clinical Nutrition, 48(7), 465-474.
Brinegar, C. A, & Peterson, D.M. (1982). Separation and characterization of oat globulin polypeptides. Archives of Biochemistry and Biophysics, 219(1 ), 71-79.
Bryant, C. M., & McClements, D. J. (2000). Optimizing preparation conditions for heat-denatured whey protein solutions to be used as cold-gelling ingredients. Journal of Food Science, 65, 259-263.
Burgess, S. R., Shewry, P. R., Matlashewski, G. J., Altosaar, I, & Miflin, B. J. (1983). Characteristics of oat (Avena sativa) seed globulin. Journal of Experimental Botany, 34, 1320-1332.
Chantrapornchai, W., & McClements, D. J. (2002). Influence of NaCl on optical properties, large-strain rheology and water holding capacity of heat induced whey protein isolate gels. Food Hydrocolloids, 16, 467-476.
Chen, J., Tian, J., Zheng, F., Li, X., Zhao, Y., Gao, X., et al. (2012). Effects of protein hydrolysis on pasting properties of wheat flour. Starch-Starke, 64, 524-530.
Foegeding, E. A, & Davis, J.P. (2011). Food protein functionality: A comprehensive approach. Food Hydrocolloids, 25, 1853-1864.
Gomez-Guillen, M. C., Turnay, J., Fernandez-Diaz,M., Ulmo, N., Lizarbe, M.A., & Montero, P. (2002). Structural and physical properties of gelatin extracted from different marine species: A comparative study. Food Hydrocolloids, 16, 25-34.
Hammershoj, M., & Larsen, L.B. (2001). Effect of hen egg production and protein composition on textural properties of egg albumen gels. Journal of Texture Studies, 32(2), 105-129.
Randa, A, Hayashi, K., Shidara, H., & Kuroda, N. (2001). Correlation of the protein structure and gelling properties in dried egg white products. Journal of Agricultural and Food Chemistry, 49, 3957-3964.
Hou, Y., & Zhao, X. -H. (2011). Limited hydrolysis of two soybean protein products with trypsin and neutrase and the impacts on their solubility, gelation and fat absorption capacity. Biotechnology, 10(2), 190-196.
Inglett, G. E., Lee, S., & Stevenson, D.G. (2008). Converting oats to high-fiber products for use in functional foods. In B. R. Hamaker (Ed.), Technology of functional cereal products (pp. 476-494). Cambridge: CRC, Woodhead.
Klose, C., & Arendt, E. K. (2012). Proteins in Oats; their synthesis and changes during germination: A review. Critical Reviews in Food Science and Nutrition, 52, 629-639.
Kuipers, B. J., & Gruppen, H. (2008). Identification of strong aggregating regions in soy glycinin upon enzymatic hydrolysis. Journal of Agricultural and Food Chemistry, 56, 3818-3827.

(Continued)

*Primary Examiner* — Jenna A Watts
(74) *Attorney, Agent, or Firm* — Bennett Jones LLP

(57) ABSTRACT

Gels made from oat proteins include partially hydrolysed oat protein, or oat protein and an organic acid or acidulant, or oat protein and inulin.

12 Claims, 30 Drawing Sheets

(56) References Cited

PUBLICATIONS

Lamsal, B. P., Jung, S., & Johnson, L. (2007). Rheological properties of soy hydrolysates obtained from limited enzymatic hydrolysis. Lwt-Food Science and Technology, 40, 1215-1223.

Lefevre, T., & Subirade, M. (2000). Molecular difference in the formation and structure of fine-stranded and particulate beta lactoglobulin gels. Biopolymers, 54, 578-586.

Liu G., Li, J., Shi, K., Wang, S., Chen, J., Liu, Y., et al. (2009). Composition, secondary structure, and self assembly of pat protein isolate. Journal of Agricultural and Food Chemistry, 57, 4552-4558.

Ma, C. -Y. (1984). Functional properties of acylated oat protein. Journal of Food Science, 49, 1128-1131.

Ma, C. -Y. (1985). Functional properties of oat concentrate treated with linoleate or trypsin. Journal Canadian Institute of Food Science and Technology, 18, 79-84.

Ma, C. -Y., & Harwalkar, V. R. (1987). Thermal coagulation of oat globulin. Cereal Chemistry, 64, 212-218.

Ma, C. -Y., Khanzada, G., & Harwalkar, V. R. (1988). Thermal gelation of oat. Journal of Agricultural and Food Chemistry, 36, 275-280.

Ma, C. -Y., Rout, M. K., & Phillips, D. L. (2003). Study of thermal aggregation and gelation of oat globulin by Raman spectroscopy. Spectroscopy, 17, 417-428.

Ma, C. -Y., & Wood, D. F. (1986). Functional properties of oat proteins modified by acylation, trypsin hydrolysis or inoleate treatment. Journal of the American Oil Chemists Society, 63, 447-447.

Ma, C. -Y., & Wood, D. F. (1987). Functional properties of oat protein modified by acylation, trypsin hydrolysis or inoleate treatment. Journal of the American Oil Chemists Society, 64, 1726-1731.

Mannheim, A, & Cheryan, M. (1992). Enzyme-modified proteins from corn gluten meal: Preparation and functional properties. Journal of the American Oil Chemists Society, 69, 1163-1169.

Mao, R., Tang, J., & Swanson, B. (2001). Water holding capacity and microstucture of gellan gels. Carbohydrate Polymers, 46(4), 356-371.

Marambe, P., Shand, P., &Wanasundara, J. (2008). An in-vitro investigation of selected biological activities of hydrolysed flaxseed (*Linum usitatissimum* L.) proteins. Journal of the American Oil Chemists Society, 85, 1155-1164.

Mohamed, A., Biresaw, G., Xu, J., Hojilla-Evangelista, M. P., & Rayas-Duarte, P. (2009). Oat protein isolate: Oats protein isolate: Thermal, rheological, surface and functional properties. Food Research International, 42, 107-114.

Molina, E., Defaye, A.B., & Ledward, D. A. (2002). Soy protein pressure-induced gels. Food Hydrocolloids, 16(6), 625-632.

Mulvihill, D.M., Rector, D., & Kinsella, J. E. (1991). Mercaptoethanol, N-ethylmaleimide, propylene glycol and urea effects on rheological properties of thermally induced B-lactoglobulin gels at alkaline pH. Journal of Food Science, 56 (5), 1338-1341.

Pinterits, A., & Arntfield, S. D. (2007). The effect of limited proteolysis on canola protein gelation. Food Chemistry, 102, 1337-1343.

Plietz, P., Zirwer, D., Schlesier, B., Gast, K., & Damaschun, G. (1984). Shape, symmetry, hydration and secondary structure of the legumin from Vicia faba in solution. Biochimica et Biophysica Acta, 784, 140-146.

Pons, M., & Fiszman, S. M. (1996). Instrumental texture profile analysis with particular reference to gelled systems. Journal of Texture Studies, 27, 597-624.

Robert, L. S., Nozzolillo, C., Cudjoe, A., & Altosaar, I. (1983). Total solubilization of groat proteins in high protein oat (*Avena sativa* L. cv. *Hinoat*): Evidence that glutelins are aminor component. Journal Canadian Institute of Food Science and Technology, 16(3), 196-200.

Sanchez, A.C., & Burgos, J. (1997). Factors affecting the gelation properties of hydrolyzed sunflower proteins. Journal of Food Science, 62(2), 284-288.

Statistics Canada (2012). Production of principal field crops, Nov. 2012 (final). Retrieved Jan. 28, 2013, from. http://www.statcan.gc.ca/daily-quotidien/121205/dq 121205a-eng.htm.

Sukan, G., & Andrews, A. T. (1982). Application of the plastein reaction to caseins and skim milk powder. I. Protein hydrolysis and plastein formation. Journal of Dairy Research, 49, 265-278.

Sun, X. D., & Arntheld, S. D. (2011). Dynamic oscillatory rheological measurements and thermal properties of pea protein extracted by salt: Effect of pH and NaCl. Journal of Food Engineering, 105, 577-582.

Svendsen, I., & Breddam, K. (1992). Isolation and amino acid sequence of a glutamic acid specific endopeptidase from Bacillus licheniformis. European Journal of Biochemistry, 204, 164-171.

Totosaus, A., Montejano, J. G., Salazar, J. A., & Guerrero, I. (2002). A reviewof physical and chemical protein-gel induction. International Journal of Food Science and Technology, 37, 589-601.

Wood, P. J., Scott, J. T., Riedel, K. D.,Wolynetz, M. S., & Collins, M.W. (1994). Effect of dose and modification of viscous properties of oat gum on plasma glucose and insulin following an oral glucose load. The British Journal of Nutrition, 72(5), 731-743.

Wu,W., Hua, Y., Lin, 0., & Xiao, H. (2011). Effects of oxidative modification on thermal aggregation and gel properties of soy protein by peroxyl radicals. International Journal of Food Science and Technology, 46, 1891-1897.

Wu, V., Sexson, K. R., Cluskey, J.E., & Inglett, G. E. (1977). Protein isolate from high-protein oats: Preparation composition and properties. Journal of Food Science, 42(5), 1383-1386.

Yamul, D. K., & Lupano, C. E (2003). Properties of gels from whey protein concentrate and honey at different pH. Food Research International, 36, 25-33.

Yeom, H. -J., Lee, E. -H., Ha,M. -S., Ha, S. -D., & Bae, D. H. (2010). Production of physicochemical properties of rice bran protein isolates prepared with autoclaving and enzymatic hydrolysis. Journal of Korean Society for Applied Biological Chemistry, 53(1), 62-70.

Yin, S. -W., Tang, C. H., Cao, J. -S., Hu, E. -K., Wen, Q. -B., & Yang, X. -Q. (2008). Effects of limited enzymatic hydrolysis with trypsin on the functional properties of hemp (*Cannabis sativa* L.) protein isolate. Food Chemistry, 106, 1004-1013.

Yuan, S., & Chang, S. (2007). Texture profile of Tufu as affected by Instron parameters and sample preparation, and correlations of Instron hardness and springines with sensory scores. Journal of Food Science, 72(2), 136-144.

Zhao, G., Liu, Y., Zhao,M., Ren, J., & Yang, B. (2011). Enzymatic hydrolysis and their effects on conformational and functional properties of peanut protein isolate. Food Chemistry, 127, 1438-1443.

Food and Agricultural Organization (FAO), 2012, 2014.

L. S. Robert, C. Nozzolillo, A Cudjoe and I. Altosaar, Canadian Institute of Food Science and Technology Journal, 1983, 16, 196-200.

T. V. Nieto-Nieto, Y. X. Wang, L. Ozimek and L. Chen, Food Res. Int., 2014, 55, 418-425 (DOI: 10.1016/j . foodres.2013 .11.038).

C. De Kruif and R. Tuinier, Food Hydrocoll., 2001, 15, 555-563.

S. Turgeon, M. Beaulieu, C. Schmitt and C. Sanchez, Current opinion in colloid & inteiface science, 2003, 8, 401-414.

X. T. Le and S. L. Turgeon, Soft Matter, 2013, 9, 3063-3073.

V. Morris, in in Gums and Stabilisers for the Food Industry 3, ed. ed. G. Phillips, D. Wedloc and P. Williams, Elsevier Applied Science, London, 1986, pp. 87-99.

S. M. Fitzsimons, D. M. Mulvihill and E. R. Morris, Food Hydrocoll., 2008, 22, 576-586.

H. H. Chen, S. Y. Xu and Z. Wang, J Food Eng., 2007, 80, 1051-1059.

J. T. Tobin, S. M. Fitzsimons, V. Chaurin, AL. Kelly and M. A Fenelon, Food Hydrocoll., 2012, 27, 201-207.

M. Tomczynska-Mleko, M. Wesolowska-Trojanowska, P. Grzegory, S. Mleko and L. Ozimek, Milchwissenschaft-Milk Science International, 2012, 67, 311-314.

Y. Tseng, Y. L. Xiong and F. Yang, J Sci. Food Agric., 2009, 89, 2650-2658.

M. B. Roberfroid, J Nutr., 2007, 137, 2493S-2502S.

C. Blecker, J. Chevalier, J. Van Herek, C. Fougnies, C. Deroanne and M. Paquot, Recent research developments in agricultural &food chemistry, 2001, 5, 125-131.

A Bot, U. Erle, R. Vreeker and W. G. Agterof, Food Hydrocoll., 2004, 18, 547-556.

(56) References Cited

PUBLICATIONS

O. Arango, A Trujillo and M. Castillo, J Dairy Sci., 2013, 96, 1984-1996.
D. Guggisberg, J. Cuthbert-Steven, P. Piccinali, U. Butikofer and P. Eberhard, Int. Dairy J, 2009, 19, 107-115.
A Giri, S. K. Kanawjia and Y. Khetra, Food and Bioprocess Technology, 2014, 7, 1533-1540.
P. Van der Meeren, K. Dewettinck and H. Saveyn, in in Handbook of Food Analysis: Methods and instruments in applied food analysis<br /><br I>, ed. ed. L. Nollet, Marcel Dekker AG, 2004, pp. 1805-1807.
S. Ikeda and V. J. Morris, Biomacromolecules, 2002, 3, 382-389.
P. Glibowski and A Bukowska, Acta Scientiarum Polonorum. Technologia Alimentaria, 2011, 10, 189-196.
J. A Pires Vilela, AL. F. Cavallieri and R. Lopes da Cunha, Food Hydrocoll., 2011, 25, 1710-1718 (DOI:http://dx.doi.org/1 0.1016/j.foodhyd.2011.03 .012).
F. A Perrechil, AL. M. Braga and R. L. Cunha, Int. J Food Sci. Tech., 2013, 48, 620-627.
C. E. Lupano and S. Gonzalez, J Agric. Food Chem., 1999, 47, 918-923.
J. Liu, K. Zhu, T. Ye, S. Wan, Y. Wang, D. Wang, B. Li and C. Wang, Food Res. Int., 2013, 51, 437-443 (DOI:http://dx.doi.org/10.1016/j.foodres.2013.01.002).
E. A Foegeding, Current Opinion in Colloid & Interface Science, 2007, 12, 242-250.
W. Chantrapomchai and D. J. McClements, Food Hydrocoll., 2002, 16, 467-476.
M. Djabourov, Contemporary Physics, 1988, 29, 273-297.
K. Weigandt and D. Pozzo, in in Proteins in Solutions and at Interphases: Methods and Applications in Biotechnology and Material Science, ed. ed. J. M. Ruso and A Pineiro, John Wiley & Sons, Inc., 2013, pp. 437-448.
S. R. Owen, M. A Tung and AT. Paulson, J Food Eng., 1992, 16, 39-53.
J. Lefebvre, Y. Papineau, G. Deshayes and L. Lavenant, Cereal Chem., 2000, 77, 193-201.
Y. Kim, M. Faqih and S. Wang, Carbohydr. Polym., 2001, 46, 135-145.
S. Samant, R. Singhal, P. Kulkarni and D. Rege, Int. J Food Sci. Tech., 1993, 28, 547-562.
Y. Zhao, Y. Mine and C. Ma, J Agric. Food Chem., 2004, 52, 3089-3096.
C. Ma, M. K. Rout and W. Mock, J Agric. Food Chem., 2001, 49, 3328-3334.
T. Lefevre and M. Subirade, Biopolymers, 2000, 54, 578-586.
G. E. Remondetto and M. Subirade, Biopolymers, 2003, 69, 461-469.
T. van Vliet, in in Hydrocolloids, ed. ed. K. Nishinari, New York, Elsevier Science, 2000, pp. 367-377.
R. Sarroukh, E. Goormaghtigh, J. Ruysschaert and V. Raussens, Biochimica et Biophysica Acta (BBA)-Biomembranes, 2013, 1828, 2328-2338.
V. Tolstoguzov, in in Understanding and controlling the microstructure of complex foods , ed. ed. D. McClements, Woodhead Publishing in Food Science, Technology and Nutrition, 2007, pp. 185-206.
L. Schaller-Povolny and D. Smith, Milchwissenschaft, 2002, 57, 494-497.
P. Glibowski, Int. Dairy J., 2009, 19, 443-449.
T. Barclay, M. Ginic-Markovic, P. Cooper and N. Petrovsky, Journal of Excipients & Food Chemicals, 2010, 1, 27-50.
A. Boraston, D. Bolam, H. Gilbert and G. Davies, Biochem. J., 2004, 382, 769-781.
Nai-Chi Siu et al., Functional Properties of Oat Globulin Modified by a Calcium-Independent Microbial Transglutaminase.
C.-Y. Ma et al., Rheological and Structural Properties of Egg White/Oat Globulin Co-Gels.
Ching-Yung Ma and Ghanikhan Khanzada, Functional Properties of Deamidated Oat Protein Isolates.
Ching-Yung Ma et al., Thermal gelation of oat globulin.
Anne Maltais et al.,Formation of Soy Protein Isolate Cold-set Gels: Protein and Salt Effects.

\* cited by examiner

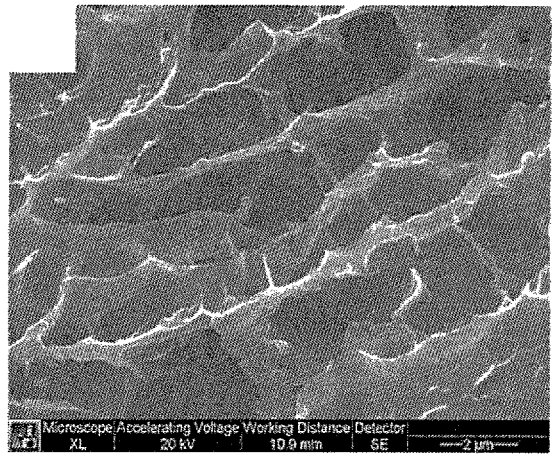
FIG. 27A
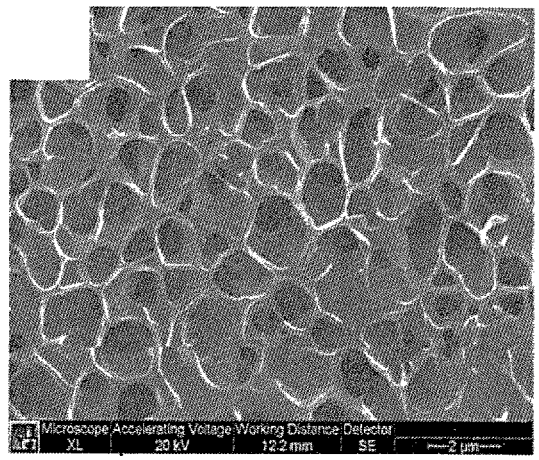
FIG. 27B
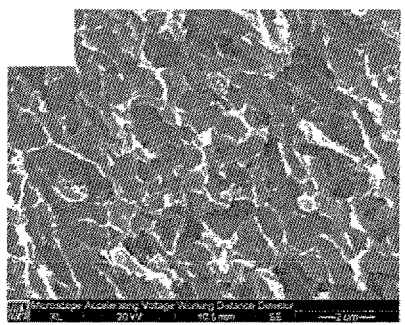
FIG. 28A
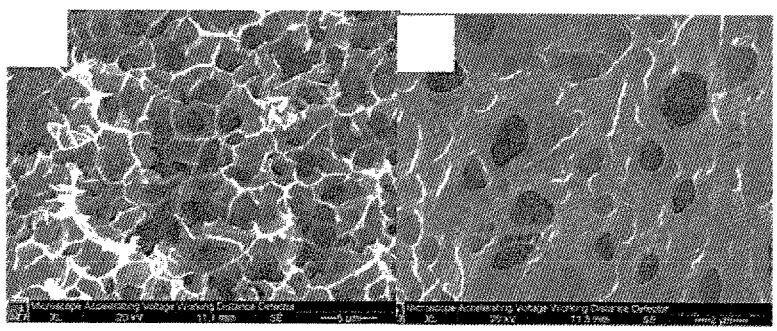
FIG. 28B          FIG. 28C

OAT PROTEIN GELS

FIELD OF THE INVENTION

The present invention relates oat protein gels and methods of making and using the same.

BACKGROUND

Gelation is an important functional property of proteins as it provides texture and support in foods. Generally, thermal gelation of globular proteins involves unfolding of the protein molecules by heating, which leads to exposure of hydrophobic amino acid residues. Later, unfolded molecules re-arrange and aggregate irreversibly via disulfide bridges, hydrogen bonds, hydrophobic and/or van der Waals interactions. Finally, aggregation carries on with association of protein particles and if the protein concentration is sufficiently high, a three-dimensional network is created (Lefevre & Subirade, 2000). This process only takes place in the presence of suitable environmental conditions, such as pH, temperature and ionic strength (Totosaus, Montejano, Salazar, & Guerrero, 2002). (Twomey, Keogh, Mehra, & O'Kennedy, 1997, Ziegler, & Foegeding, 1990).

Plant proteins are normally considered inferior to animal proteins in terms of gelling properties. Gelatin, egg white and whey proteins are widely used as gelling agents in the food industry, particularly in meat and dairy based systems. In recent years, proteins derived from plant sources are becoming an important ingredient segments owing to health (no Bovine Spongiforme Encephalopathy concern), religious and cost reasons. For a long time, soy protein has been the major plant protein gelling ingredient in the market. Yet there is an opportunity for other novel gelling ingredients of plant origin to meet the increasing market requirement for different functionalities and sensory attributes.

Oat is commonly used as an animal feed and only a small percentage of the grain is currently used for human consumption. Recently the human food market for oat has been gaining momentum mainly due to the growing public awareness of the health benefits of β-glucan. This soluble dietary fiber component of oat is known to reduce blood cholesterol (Braaten, Wood, & Scott, 1994), and regulate blood glucose levels (Wood, Scott, Riedel, Wolynetz, & Collins, 1994). Several techniques have been developed to isolate β-glucan from oat grain as a health ingredient in food products. The remaining components such as protein and starch are awaiting research to develop their full value (Inglett, Lee, & Stevenson, 2008).

Oat has the highest protein level (12-20%) (Mohamed, Biresaw, Xu, Hojilla-Evangelista, & Rayas-Duarte, 2009) among cereals, with a superior amino acid profile due to higher amounts of limiting amino acids lysine and threonine (Klose & Arendt, 2012). This is related to the fact that in most cereals the major storage proteins are alcohol-soluble prolamines whereas in oat, globulins represent 70-80% of the total protein fraction (Robert, Nozzolillo, Cudjoe, & Altosaar, 1983). The major fraction in oat protein is the 12S globulin, which consists of two major subunits with molecular weight of about 32 and 22 kDa called the A- and B-subunits, where the A-subunit is an acidic polypeptide and the B-subunit is a basic polypeptide. The A- and B-subunits are disulfide bonded in the native globulin, forming a dimer with a molecular weight of 54 kDa, which further associates into a hexamer through noncovalent forces (Burgess, Shewry, Matlashewski, Altosaar, & Miflin, 1983). The 7S and 3S are the minor fractions. 7S globulins are polypeptides with molecular weight of 55 kDa, and some minor components with a molecular weight of 65 kDa are also present. The 3S fraction entails at least two major components with molecular weight of about 15 and 21 kDa (Klose & Arendt, 2012).

Two previous publications demonstrated that oat protein could form gels (Ma & Harwalkar, 1987; Ma, Khanzada, & Harwalkar, 1988). But at acidic and neutral pH levels, very weak gels with poor water holding capacity were obtained. The gel properties improved above about pH 8, but strong gels could only be prepared at pHs 9-10. The gel hardness was greatly increased by both acetylation and succinylation (Ma & Wood, 1986, 1987). The authors suggested that the changes in the functional properties of oat protein after modification resulted from altered conformation and increase in net charge (Ma, 1984, 1985; Ma & Wood, 1986, 1987). This was later confirmed with the study of the thermal aggregation of oat globulin by Raman spectroscopy (Ma, Rout, & Phillips, 2003). In this work, changes in protein interactions and conformation were induced by the addition of protein structure modifying agents such as chaotropic salts, sodiumdodecyl sulfate or dithiothreitol, which can either enhance or inhibit thermal gelation of oat globulin.

Enzymatic hydrolysis is a preferable tool to alter functional properties of proteins because of milder processing conditions required, easier control of reaction and minimal formation of by-products (Mannheim & Cheryan, 1992). Recent research has reported the effect of enzymatic hydrolysis over the gelling properties of proteins including soy protein (Hou & Zhao, 2011), rice bran protein (Yeom, Lee, Ha, Ha, & Bae, 2010), sunflower protein (Sanchez & Burgos, 1997), and canola protein (Pinterits & Arntfield, 2007). Results from these studies indicate that improvement of the gelling capacity is highly enzyme specific. The gelling properties of oat protein treated with trypsin were studied in previous work (Ma & Wood, 1986, 1987), however, weak gel structure was obtained due to the short size of the protein molecules, which may no longer be able to associate to form a strong gel matrix. Since the final composition and thus the use of the hydrolysates will depend on the type of enzyme used and the hydrolysis conditions (Benítez, Ibarz, & Pagan, 2008), a systematic investigation of the effect of various proteases over the gelling capacity of oat protein is required. Such information has not been available, however important for the development of new modification strategy to improve oat protein gelling properties.

Modification of protein conformation can also be achieved through limited hydrolysis, as changes in the secondary and tertiary structure can be produced. This can alter the surface exposure of reactive amino acids, leading to an increase in interactions favoring aggregation (Foegeding & Davis, 2011) and three-dimensional network formation.

Cold-set gelation as alternative gelling method opens an interesting opportunity for proteins in development of functional food ingredient, such as protecting heat sensitive bioactive compounds. This process consists of two consecutive steps. The first step is preheating protein above denaturation temperature to induce protein unfolding, exposure of reactive groups, and subsequent aggregation at solution pH far from protein isoelectric point (IEP) and at a concentration below a critical value. In this step, protein remains as soluble aggregates due to the high electrostatic repulsive forces. For the second step, addition of salt ($Ca^{2+}$) or altering solution pH induce the formation of three-dimensional gel network (Bryant and McClements, 1998, Alting, de Jongh, Visschers, & Simons, 2002; Alting, Hammer, de Kruif, & Visschers, 2003a; Campbell, Gu, Dewar, & Euston, 2009).

Generally, two kinds of cold-set gels, particulate and filamentous gels, can be achieved depending on processing conditions (Lefevre, and Subirade, 2000; Maltais, Remondetto, Gonzalez, Subirade, 2005; Maltais, Remondetto, Subirade, 2008). Filamentous gel is formed by linearly linked protein aggregates maintained by hydrophobic interactions at low ionic strength or pH far from protein IEP, which exhibits regular network structure with more or less linear strands. In contrast, particulate gel is created by random aggregation of protein units mainly through van der Waals interaction at high ionic strength or pH near protein IEP, which composes of large and almost spherical aggregates. These different predominated interactions and gel network structures lead to various gel mechanical properties and applications (Remondetto, Neyssac, & Subirade, 2004).

Extensive works have focused on salt-induced whey protein and soy protein gels in terms of gel properties, formation mechanism and applications (Maltais, Remondetto, Subirade. 2010; Barbut, & Foegeding, 1993, Foff, and Roegeding, 1996; Zhang, Liang, Chen, Subirade, 2012). These cold-set gels were used to improve the texture and stability of food products (Hongsprabhas, & Barbut, 1999), or play as carrier of bioactive compounds or divalent cations (Maltais, Remondetto, & Subirade, 2010; Remondetto, Beyssac, & Subirade, 2004; Vazquez da Silva, et al, 2010).

Another commonly used method to form cold-set gel is altering solution pH towards protein IEP. It can be achieved by adding organic acids or acidulants, or lactic acid fermentation, which lead to the reduction of electrostatic repulsion forces between protein aggregates (Venugopal, Doke, & Nair, 2002; Riebroya, Benjakula, Visessanguanb, Eriksonc, & Rustad, 2009; Xu, Xia, Yang, Kim & Nie, 2010). Among them, glucono-δ-lactone (GDL) as an acidulant has been widely used in food products (Tseng & Xiong, 2009; Chawla, Venugopal, & Mair, 1996). GDL can be slowly hydrolyzed to gluconic acid in water, which resulted in a gradual decrease of pH to neutralize negatively charged protein aggregates and create gel with homogeneous porous structure (Malaki, Nik, Alexander, Poysa, Woodrow, & Corredig, 2011). However, the gelation mechanism and protein conformational changes at different GDL concentrations were not completely elucidated.

The gelling properties of proteins can be affected by interaction with other components, such as polysaccharides. Protein and polysaccharide are often mixed to develop food products with novel textural properties. The interactions developed among protein and polysaccharide will define the microstructure of food product and thus the resulting texture or mechanical properties. Interactions between protein and polysaccharides can be either associative or segregative depending on the molecular characteristics of the contributing polymers and the medium conditions such as pH, or ionic strength. As electrostatic interactions are produced under associative conditions between a protein and an ionic polysaccharide of opposite charge, a complex coacervate structure is obtained. When no strong interactions exist between protein and polysaccharide, interpenetrating networks are formed, where each polymer is in its own continuous network. Phase-separated networks are formed when interactions between polymers are repulsive or when there are no electrostatic forces to drive the association. This results in a bi-continuous phase or a continuous supporting phase containing inclusions of the other phase.

SUMMARY OF THE INVENTION

Therefore, in one aspect, the invention may comprise a gel formed from oat protein hydrolysate, having a degree of hydrolysation less than about 20, or less than about 15, or less than about 10. In one embodiment, the oat protein hydrolysate is formed by partially hydrolyzing oat protein with a protease, which may comprise flavourzyme, trypsin or alcalase.

In another aspect, the invention may comprise a method of forming an oat protein gel, comprising the step of partially hydrolyzing oat protein at a pH of about 7 or higher, preferably about pH 8 or about pH 9, and forming a gel from the hydrolysate. In one embodiment, the degree of hydrolysation is less than about 10, and preferably less than about 8.

In another aspect, the invention may comprise a gel formed from oat protein and an organic acid or acidulant. In one embodiment, the organic acid or acidulant comprises GDL.

In another aspect, the invention comprises a method of forming an oat protein gel, comprising the step of mixing oat protein with an organic acid or acidulant, and forming the gel. In one embodiment, oat protein is added at about 5 or about 7% w/v, and organic acid or acidulant at less than about 20% w/w of protein, or less than about 15%, or less than about 10%, or less than about 5%, at a pH less than about 9, or less than about 8, at about 20° C. In one specific embodiment, the method of claim 9 wherein the oat protein is added about 7% w/v, and GDL at about 10% w/w of protein, at a pH of about 8.

In another aspect, the invention may comprise a gel formed from oat protein and inulin.

In another aspect, the invention may comprise a method of forming an oat protein gel, comprising the step of mixing oat protein with inulin. In one specific embodiment, the oat protein is mixed at about 15% w/v with inulin less than about 1.0% w/v, heating at 100° C. at a pH of less than 8.

In another aspect, the invention may comprise a method of forming an oat protein gel comprising the steps of heating the oat protein at less than about 100° C. and microwaving the oat protein. The microwaved mixture may include inulin and/or a fatty acid.

BRIEF DESCRIPTION OF THE DRAWINGS

FIG. 3A: Hardness (N), FIG. 3B: cohesiveness and FIG. 3C springiness (mm).

FIG. 4A: OPI (pH 7), FIG. 4B: OPI-F (pH 7), FIG. 4C: OPI-F (pH 9), FIG. 4D: OPI-T (pH 7), and FIG. 4E: OPI-T (pH 9).

FIG. 9A: OG5-3; FIG. 9B: OG5-5; FIG. 9C: OG5-10; FIG. 9D: OG5-15; FIG. 9E: OG7-3; FIG. 9F: OG7-5; FIG. 9G: OG7-10; and FIG. 9H: OG7-15. Scale bar: 5 μm.

(FIG. 11B) preheated oat protein solutions (1% w/v in $D_2O$) with different GDL concentrations.

(FIG. 12A) Size distributions of oat protein in water at pH 8 before heating (BH), after heating to 115° C. (AH) and preheated oat protein solution with 3% GDL. AFM images of oat protein solutions: (FIG. 12B) before heating; (FIG. 12C) after heating to 115° C.; and (FIG. 12D) preheated oat protein solution with 3% GDL.

(FIG. 13A) Storage modulus-strain profiles of OPI gels prepared at different protein concentrations and 3% GDL. Double-logarithmic plots of critical strain (FIG. 13B) and storage modulus (FIG. 13C) of OPI gels prepared at different GDL contents as a function of protein concentrations.

(FIG. 18A) pH 7, (FIG. 18B) pH 2.5 and (FIG. 18C) pH5.

(FIG. 19A) pH 7, (FIG. 19B) pH 2.5 and (FIG. 19C) pH5

(FIG. 26A) Represents the homogeneous dispersion of OPI and inulin in a low concentration. (FIG. 26B) Phase separation begins as temperature increases. (FIG. 26C) OPI-inulin gel network is formed and reinforced as inulin performs a filing effect by occupying the void spaces of the protein network and forming junction zones. Additionally, localized interactions such as hydrogen and hydrophobic bonds take place between protein and inulin. Finally, increased interactions among protein molecules are promoted due to an increased apparent protein concentration indicated by circles in gray color.

FIGS. 27A to 27B. Even after freeze-thaw cycle, the polymer like network microstructure remained; FIG. 27A: oat protein gels (25% protein) and FIG. 27B: oat protein gels (25% protein) with 2% fatty acid after freeze-thaw cycle.

FIGS. 28A to 28C. FIG. 28A: Oat protein gels with 25% protein, FIG. 28B: oat protein gels (25% protein) with 1% inulin and 2% fatty acid, FIG. 28C: oat protein (25% protein) with 2% fatty acid.

DETAILED DESCRIPTION

Figure 1:
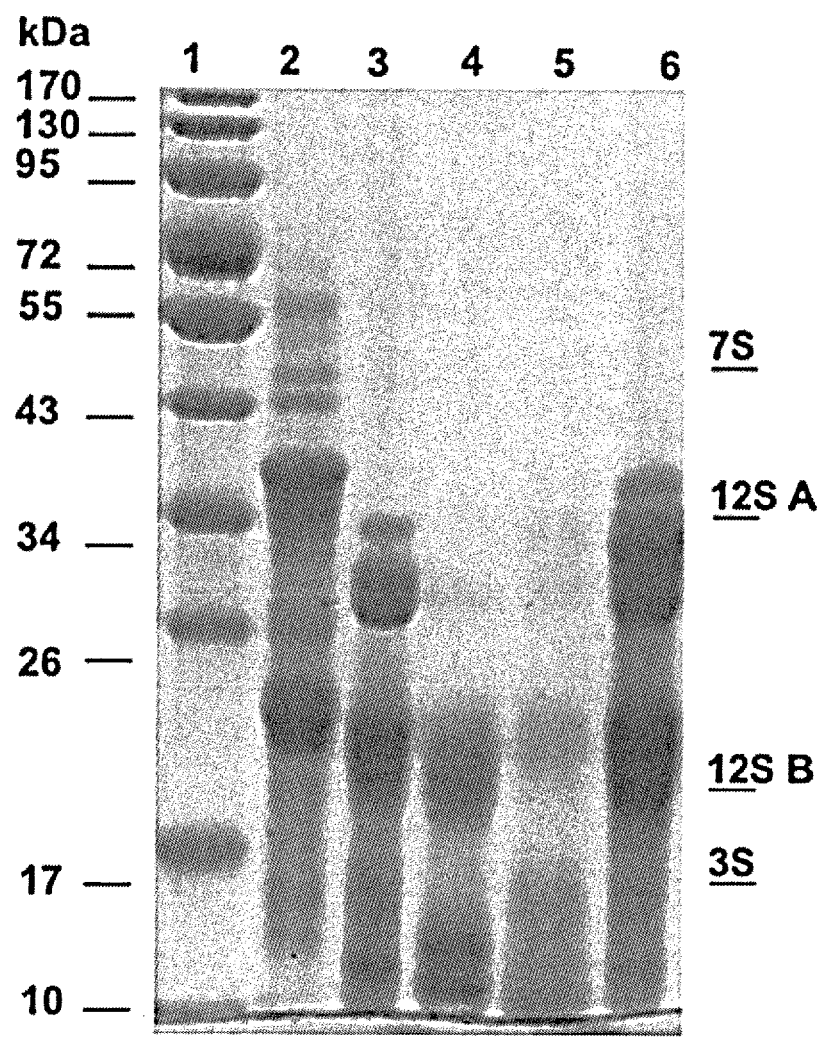
FIG. 1. SDS polyacrylamide gel electrophoresis of oat protein and its hydrolysates. Lanes: 1. Standard protein markers, 2. OPI, 3. OPI-F, 4. OPI-A, 5. OPI-P, and 6. OPI-T.

As will be apparent to those skilled in the art, various modifications, adaptations and variations of the following specific disclosure can be made without departing from the scope of the invention claimed herein. The various features and elements of the described invention may be combined in a manner different from the combinations described or claimed herein, without departing from the scope of the invention.

As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

As used herein, a "gel" means a material which comprises a three-dimensional network of a solid material, and a dispersed liquid or gaseous phase.

In one aspect, the invention comprises gels comprising partially hydrolysed oat protein, and methods of producing oat protein gels. We have demonstrated that partial enzymatic hydrolysis can improve oat protein gelling properties. Thus, it is believed that partially hydrolysed oat protein could form gels of plant origin with similar properties as those from animal proteins such as egg white, such as gel mechanical strength and water-holding capacity, which are important gel characteristics for food applications. If the defined gel physical properties would be in the range of similar properties of animal protein derived gels, value-added opportunities may exist for oat protein to be used as a new gelling ingredient in food formulations such as meat binder and fat replacer to create food with improved quality and nutritive value, or used in meat analogues for vegetarian foods.

The effects of partial hydrolysis and the environmental conditions (pH and temperature) on the gelling properties of oat protein isolate (OPI) were investigated. In one embodiment, OPI was partially hydrolysed with flavourzyme, alcalase, pepsin and trypsin.

The changes in protein structure were observed by SDS-PAGE, size exclusion high performance liquid chromatography (SE-HPLC) and amino acid analysis. Gel mechanical properties were evaluated by textural profile analysis (TPA). The results revealed that the acidic polypeptides (12S-A) of oat globulin exerted great influence over the gelling ability of oat protein. Partial hydrolysis by flavourzyme and trypsin could significantly improve oat protein gel strength, especially in the pH range of about 8 to about 9, by modulating the balance between the electrostatically repulsive force and the hydrophobic attractive force among polypeptide chains during the gelling process. The gels prepared with flavourzyme and trypsin treated oat proteins have comparable or higher mechanical strength than soy protein gels at neutral pH. At pH 9 the gel made of trypsin treated oat protein even showed comparable mechanical strength to egg white protein gels under the same pH. Both oat protein and its hydrolysate gel exhibited excellent water-holding capacity at neutral or mildly alkaline conditions.

Section 1

Methods and Materials

Naked oat grains (*Avena nuda*) were purchased from Wedge Farms Ltd., Manitoba, Canada. The protein content was 17.2%. Flavourzyme (≥500 U/g), alcalase (2.4 U/g), pepsin (≥250 U/mg), trypsin (1462 U/mg), sodium dodecyl sulfate (SDS) and Tri-nitro benzene sulfonic acid (TNBS) were obtained from Sigma-Aldrich Canada (Oakville, ON, Canada). E-Z run pre-stained protein ladder/marker was purchased from Fisher Scientific (Whitby, ON, Canada).

Oat grains were ground to flour using a mill (Ultra Centrifugal ZM 200 Retsch, Pa.) equipped with a 0.5 mm screen. The flour was then defatted with hexane at room temperature. Globular protein was extracted from the defatted oat flour according to the method reported by Wu, Sexson, Cluskey, and Inglett (1977) with some modifications. Briefly, defatted oat flour was dispersed in an alkali solution adjusted to pH 9.2 using sodium hydroxide at a flour-to-solvent ratio of 1:6 and mixed for 1 h at room temperature. The slurry then passed through a 300 μm wire mesh and the permeated mixture was centrifuged at 7000×g for 15 min. Then, the supernatant was collected and pH was adjusted to 5 with 1 M HCl, followed by centrifugation at 7000×g for 15 min. The pellet corresponding to the precipitated protein was washed with distilled water and freeze-dried for later use. Protein content of the extracted oat protein was determined using the Leco nitrogen analyzer (FP-428, Leco Corporation, St Joseph, Mich.) and a nitrogen to crude protein conversion factor of 6.25 was used.

A 2% (w/v) protein suspension was prepared with distilled water. The pH and temperature of the suspension were adjusted to the optimum condition for each enzyme. Hydrolysis with flavourzyme was carried out at pH 7 and 50° C., alcalase at pH 8 and 50° C., pepsin at pH 2 and 37° C. and trypsin at pH 8 and 37° C. The enzyme/substrate ratio was set at 10/100 for all treatments. Over the hydrolysis period (30 min) the pH was kept constant with 1 M HCl or 1 M NaOH. At the end of the hydrolysis, the solution was heated at 90° C. for 10 min to inactivate the enzyme. Hydrolysate samples were collected, freeze-dried and stored for further experiments. The protein content of the dried hydrolysates was also determined using the Leco nitrogen analyzer (FP-428, Leco Corporation, St. Joseph, Mich.).

Degree of hydrolysis (DH) was determined by the TNBS assay (Adler-Nissen, 1979). Total number of amino groups was determined in a sample completely hydrolyzed with 6N HCl at 110° C. for 24 h. The DH was calculated with the following equation.

$$DH = \frac{h}{h_{tot}} \times 100$$

where h (hydrolysis equivalents) is the amount of peptide bonds cleaved during hydrolysis, which is expressed as millimole equivalents per gram of protein (mmol/g of protein) and $h_{tot}$ is the total amount of peptide bonds in the protein substrate. L-Leucine (0-1.5 mM) was used to generate a standard curve (R2=0.99).

SDS-polyacrylamide gel electrophoresis (SDS-PAGE) was performed to study the molecular weight of the oat protein subunits. Protein samples were mixed with sample buffer (0.125 M Tris-HCl pH 6.8, 4% w/v SDS, 20% v/v glycerol, 0.5% 2-mercaptoethanol and 1% bromophenol blue w/v) and heated at 100° C. for 5 min, then cooled to room temperature. After cooling, 30 μL sample (1 mg/mL) was loaded on 4% stacking gel and 12% separating gel and subjected to electrophoresis at a constant voltage of 160 V. After electrophoresis the gels were stained with 0.1% (w/v) Coomassie Brilliant Blue R-250 in water-methanol-acetic acid (4:5:1, v:v:v). The molecular weight distribution of the samples was determined using a size exclusion high performance liquid chromatography (SE-HPLC) system (Agilent 1200 series) equipped with a Biosuite™ 125/5 μm HR-SEC column (7.8 Å~300 mm, Water Corp. MA, USA). The eluent used was 0.2 M phosphate buffer with 0.2 M NaCl (pH 7) at a flow rate of 0.5 mL/min and room temperature. Samples (50 μL) were injected into the system and elution was monitored at 220 nm. Standard molecular markers were used to calculate Mw of the oat protein samples. A calibration curve was made from the log Mw of the markers and their respective elution times (R2=0.97).

Amino acid composition analysis of the samples was performed using the Waters AccQ-Tag™ precolumn method. Dried samples were hydrolyzed under vacuum and after derivatization were loaded on a reversed phased column. The AccQ reagent, 6-aminoquinolyl-Nhydrozysuccinimidyl carbamate, is an N-hydroxysuccinimide-activated heterocyclic carbamate, which converts both primary and secondary amino acids to stable fluorescent derivatives.

The denaturation temperature of OPI and its hydrolysates was determined using a differential scanning calorimeter Q1000 (TA Instruments, New Castle, Del., USA). Approximately 10 μL of a 15% protein (w/v) suspension was weighed on a pre-weighed aluminumpan and hermetically sealed. An empty hermetic pan was used as reference. The sample was heated at a 10° C./min, over a temperature range of 30-160° C. The protein suspensions (15% protein) were prepared at pHs 5, 7 and 9 to study the effect of pH on the protein denaturation temperature. The denaturation temperature (Td) was computed from the endothermic peaks observed in the thermograms using computer software.

Gel Preparation

Gels were prepared by heating the protein sample suspension (15%, w/v) at pHs 5, 7 and 9. The pH of the suspension was adjusted using 1N NaOH or 1N HCl. Vacuum was applied to remove air bubbles. Test tubes containing the suspension were tightly closed and placed in an oil bath at 110° C. or 120° C. for 15 min. Once heat treatment was completed, the tubes were cooled in an ice bath and stored in the refrigerator overnight.

Textral Profile Analysis (TPA)

The mechanical properties of the gels prepared above were evaluated using an Instron 5967 universal testing machine (Instron Corp., Norwood, Mass., USA). Gels were released from test tubes and cut into cylindrical pieces (~10 mm height, ~14 mm diameter). A two cycle compression test using a 50N load cell was performed at room temperature at a rate of 1 mm/min to evaluate their mechanical properties. Each sample was compressed to 50%, since deformation levels between 20 and 50% have been commonly applied in several works on gel food systems. At this level the sample does not break, but it is still possible to obtain valuable information on important parameters (Pons & Fiszman, 1996). The textural profile parameters including, hardness, springiness and cohesiveness were calculated. These parameters were determined form the typical Instron force-time curve in which hardness is calculated as the peak compression force in the 1st bite cycle, and cohesiveness is the ratio of the area under the first and second compression peaks. Springiness is the distance calculated from the area under the second compression peak.

Scanning Electron Microscopy (SEM)

The morphology observation of the gels was carried out with a Phillips XL-30 scanning electron microscope (FEI Company, Oregon, USA). The samples were frozen in liquid nitrogen and freeze-dried before observation. Dry samples were coated with gold and platinum and a scanning electron microscope was used to observe the microstructure of the gels.

Water Holding Capacity (WHC)

A gel sample (0.9-1.2 g) was placed into a Vivaspin 20 centrifugal filter unit (GE Healthcare Bio-Sciences AB, Uppsala, Sweden) and centrifuged at 290 Å~g for 5 min at 15° C. The weight of the gel was recorded before (Wi) and after (Wf) centrifugation to the nearest 0.0001 mg and the percentage of water loss after centrifugation was expressed as:

$$\% WHC = 100 - \frac{(1 - W_f)}{W_1} \times 100$$

Statistical analysis All data were analyzed for significant differences, with minimum significance test set at the 5% level (p b 0.05) with Tukey's test to compare all means, using GraphPad Prism 5 (GraphPad Software, La Jolla, Calif., USA). All experimentswere performed at least in three independent trials and the results were reported as mean±standard deviation.

Results and Discussion

The protein content of the final oat protein isolate (OPI) was 91.2%±2.4. Oat protein isolte was partially hydrolyzed using flavourzyme, alcalase, pepsin or trypsin, which are common in industrial applications (Benítez et al., 2008). After 30 min of enzymatic treatment, limited hydrolysis was achieved with the final DH % value reaching 7.1%±0.54, 5.8%±0.44, 5.5%±0.41 and 5.3%±0.40 for flavourzyme, alcalase, pepsin and trypsin hydrolysates respectively and the samples were labeled as OPI-F, OPT-A, OPI-P and OPI-T, respectively.

Characterization of Oat Protein and its Hydrolysates

The SDS-PAGE pattern in FIG. 1 demonstrates that the predominating protein fraction in the extracted oat protein is 12S globulin (Lane 2). The acidic (12S-A) and basic (12S-B) polypeptides are easily identified. The bands between 43 and 72 kDa and below 17 kDa correspond to the 7S and 3S fractions, respectively.

Hydrolysis with flavourzyme partially affected the acidic polypeptide as the 12S-A fraction bands shifted to a lower molecular weight region (26-34 kDa) (Lane 3). In contrast, alcalase had a much stronger effect upon the 12S-A fraction as it disappeared in OPI-A sample (Lane 4). This 12S-A was less susceptible to trypsin as most of the original bands remained, although the low end of the band shifted to a lower molecular weight range (Lane 6). Flavourzyme is a protease composed of a mixture of endoprotease and exopeptidase, which has been used to prepare short chain peptides and free amino acids (Marambe, Shand, & Wanasundara, 2008). Alcalase is an endoprotease composed of a mixture of different proteases, each with different specificities (Sukan & Andrews, 1982), thus it has a broad specificity toward peptide bonds. The extensive degradation of the 12S-A subunit can be explained by this broad specificity. In addition, Glu is an abundant amino acid in oat protein and especially in the acidic subunit of oat globulin (Brinegar & Peterson, 1982; Burgess et al., 1983). A Glu-specific endopeptidase has been isolated from a commercial preparation of alcalase (Svendsen & Breddam, 1992), therefore the presence of Glu in the 12S-A fraction favors its alcalase degradation.

From the enzymes selected in this study, trypsin is probably the most specific toward its substrate. Furthermore, it cleaves peptides on the C terminal side of Lys and Arg (Chen et al., 2012), thus the acidic polypeptides 12S-A was less susceptible to trypsin digestion. On the other hand, the 12S-B was fairly resistant to all enzymes tested and only a minor shift in the molecular weight was noticed. The resistance of the basic polypeptide to enzymatic hydrolysis could be explained by the fact that this subunit is buried at the interior of the structure, thus is not as readily accessible as acidic subunit (Plietz, Zirwer, Schlesier, Gast, & Damaschun, 1984; Yin et al., 2008).

The case of pepsin is an exception as only faint bands were observed after hydrolysis (Lane 5), indicating that both 12S-A and 12S-B were digested by pepsin. This might be related to the low pH required for pepsin treatment, under which oat protein could be partially unfolded and thus both acidic and basic polypeptides are accessible and susceptible to proteolysis (Brinegar & Peterson, 1982; Burgess et al., 1983). Therefore both units are rapidly digested during 30 min of pepsin treatment.

Figure 2:
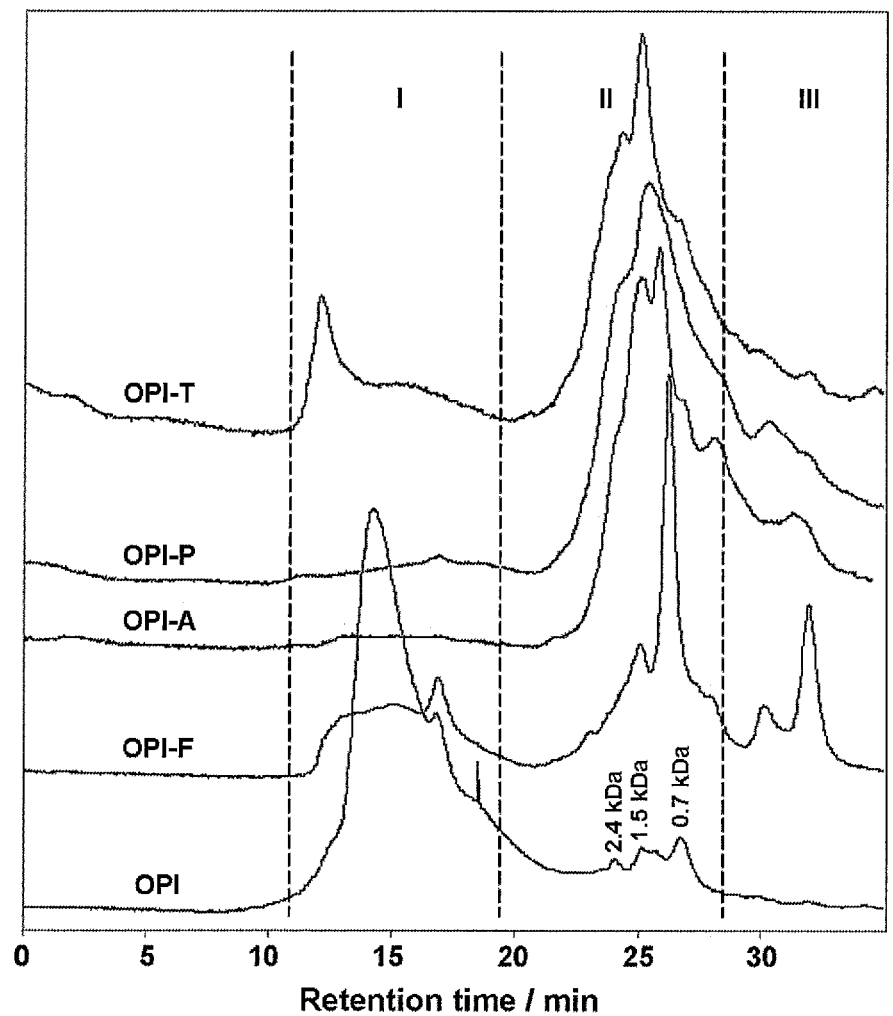
FIG. 2. Size exclusion chromatograms of oat protein and its hydrolysates.

SE-HPLC chromatograms of OPI and its hydrolysate samples are shown in FIG. 2, divided into three regions, comprising region I (656-22.4 kDa), region II (21.4-0.4 kDa) and region III (b0.4 kDa).

Untreated OPI shows a dominant peak in region I with molecular weight (Mw) of approximately 190 kDa. This peak almost disappeared in hydrolysates by alcalase and pepsin, meanwhile hydrolysates by flavourzyme and trypsin show a peak dramatically reduced in height, indicating that the oat protein was hydrolyzed by pepsin and alcalase, but only partially by flavourzyme and trypsin. In region II, OPI shows a group of small peaks with molecular weights ranging from 2.4 to 0.7 kDa, whereas this group of peaks dominated in all the oat protein hydrolysate samples, confirming hydrolysis of the oat protein.

Hydrolysates by trypsin, pepsin and alcalase showed a major peak at ~0.7 kDa and a shoulder with larger molecular weight. In contrast, the flavourzyme treated sample showed a different contour including a sharp peak with molecular weight of 0.9 kDa and a dramatically reduced shoulder peak, indicating that flavourzyme was more effective at producing low molecular weight polypeptides. Oat protein isolates did not show any peaks in region III. On the other hand, all hydrolysates contained small peptides, particularly those treated with flavourzyme as a sharp peak of approximately 70 Da was observed at the end of the chromatogram. This confirms the ability of flavourzyme to produce small peptides and even free amino acids. Peptides from this region are not likely to participate in the gel formation process due to their small molecular weight, thus the fractions of main interest are contained in regions I and II. Both SDS-PAGE and SE-HPLC observations confirmed that flavourzyme and trypsin hydrolysates maintained greater integrity of the original structure of oat protein, when compared to alcalase and pepsin hydrolysates.

TABLE 1

Amino acid composition of oat protein isolate and its hydrolysates.

| | % mol | | | | |
|---|---|---|---|---|---|
| Residue | OPI | OPI-F | OPI-A | OPI-P | OPI-T |
| Asx[a] | 5.5 | 6.5 | 10.0 | 7.1 | 6.4 |
| Serine | 4.2 | 4.9 | 4.4 | 4.8 | 4.9 |
| Glx[b] | 22.4 | 16.4 | 14.9 | 15.5 | 20.3 |
| Glycine | 7.7 | 8.4 | 8.7 | 9.4 | 9.2 |
| Histidine | nd. | 3.2 | nd. | nd. | n.d. |
| Arginine | 6.0 | 8.2 | 8.6 | 8.5 | 7.9 |
| Threonine | 3.5 | 3.7 | 3.5 | 4.3 | 3.5 |
| Alanine | 6.7 | 6.6 | 6.8 | 7.0 | 6.9 |
| Proline | 7.3 | 5.5 | 5.5 | 5.9 | 5.7 |
| Cysteine | 2.4 | 1.6 | 1.3 | 2.5 | 1.6 |
| Tyrosine | 2.9 | 2.9 | 3.2 | 2.7 | 3.1 |
| Valine | 7.7 | 7.3 | 7.7 | 7.4 | 6.8 |
| Methionine | 2.1 | 1.4 | 1.3 | 2.0 | 1.3 |
| Lysine | 3.3 | 4.3 | 3.7 | 4.8 | 3.9 |
| Isoleucine | 4.5 | 5.6 | 6.1 | 5.2 | 5.5 |
| Leucine | 8.5 | 8.2 | 8.5 | 8.1 | 7.9 | n.d. means not detectable.
[a]Asx(Asp + Asn).
[b]Glx (Glu + Gln).

Amino Acid Analysis

As shown in Table 1, oat protein and its hydrolysates contain high levels of Glx (Glu+Gln), since glutamic acid is the most abundant amino acid in oat protein (Brinegar & Peterson, 1982; Burgess et al., 1983; Liu et al., 2009). Other amino acids at high levels are Gly, Leu and Val. The amount of Glu+Gln was noticeably reduced in the hydrolysate samples. This is in agreement with the enzymatic susceptibility of the acidic polypeptide of oat globulin, considering the acidic polypeptide is rich in Glu. The amount of Asx (Asp+Asn) in the alcalase hydrolysate is significantly higher compared to the other hydrolysates. This confirms that the remaining unit is the basic polypeptide, considering that this polypeptide is rich in Asp (Burgess et al., 1983). If most of the Glx is considered as Glu, such amino acid composition modification could alter the charge of the polypeptide chains, and thus their functionalities in different pH environments. Reduced Pro residue was also observed in oat protein hydrolysates which could potentially impact the protein properties as this amino acid is believed to play an important role in the stabilization of protein structure due to hydrogen bonding with hydroxyl groups (Gómez-Guillén et al., 2002).

Differential Scanning Calorimetry (DSC)

As shown in Table 2 the extracted oat protein isolate had a denaturation temperature (Td) value of 112.4° C., which is in agreement with previous reports (Ma & Harwalkar, 1987; Ma et al., 1988). The highest Td values were observed at pH 7. Its Td and the enthalpy of denaturation (ΔH) value decreased slightly at pHs 5 and 9, possibly due to partial denaturation of oat protein under acidic or alkali conditions (Sun & Arntfield, 2011). It is interesting to notice that the oat protein hydrolysates showed significantly increased ΔH values although their Td values remained almost unchanged. It is possible to speculate that some oat protein fractions, such as 12S have a configuration composed of loosely arranged segments and tightly packed segments. Normally, these tightly packed segments are highly hydrophobic and are located at the interior of the structure, whereas the loose segments are at the exterior, being more accessible to hydrolysis. After enzymatic cleavage of the exterior loose part, most of the hydrophobic core structure remained in the hydrolysate samples, which could be much more stable against heat treatment. Thus higher energy is required to disrupt intramolecular bonds to achieve complete denaturation. This type of reaction is called a zipper reaction (Adler-Nissen, 1986) and it is not unusual to observe the formation of resistant polypeptides even after prolonged hydrolysis due to their compact structure.

TABLE 2

Effect of pH on the Denaturation temperature and enthalpy change of OPI and its hydrolysates

| | pH 5 | | pH 7 | | pH 9 | |
|---|---|---|---|---|---|---|
| | $T_d$ (° C.) | ΔH (J/g) | $T_d$ (° C.) | ΔH (J/g) | $T_d$ (° C.) | ΔH (J/g) |
| OPI | 109.4 | 0.7494 | 112.4 | 0.9826 | 107.94 | 0.5763 |
| OPI-F | 109.93 | 1.972 | 112.52 | 3.170 | 110.91 | 1.810 |
| OPI-T | 110.47 | 3.018 | 110.61 | 3.307 | 107.8 | 1.262 |

TABLE 3

Oat protein derived gels formed under different pH and temperature conditions.

| | pH 5 | | pH 7 | | pH 8 | |
|---|---|---|---|---|---|---|
| | 110° C. | 120° C. | 110° C. | 120° C. | 110° C. | 120° C. |
| OPI | ✓ | ✓ | ✓ | ✓ | ✓ | ✓ |
| OPI-F | x | ✓ | x | ✓ | ✓ | ✓ |
| OPI-A | x | x | x | x | ✓ | ✓ |
| OPI-P | x | x | x | x | x | x |
| OPI-T | x | ✓ | x | ✓ | ✓ | ✓ | x no gel.
✓ gel formation

Thermal Gelation of OPI and Derived Hydrolysates

In this work, the initial thermal gelation test was conducted at two temperatures near or above oat denaturation temperature (Td) (110 and 120° C.) at three different pHs (5, 7, 9). The purpose was to screen samples and conditions that allow gel network formation, which is defined for this work as the establishment of a self-supporting structure showing no flow upon inversion after thermal treatment and cooling.

As shown in Table 3, the oat protein formed gels under all tested conditions. Oat protein hydrolysed by flavourzyme and trypsin formed gels under almost all conditions, except at pHs 5 and 7 at 110° C. Possibly, this temperature was not sufficient to unfold the compact structure of these hydrolysates extensively enough to expose reactive groups that could participate in crosslinking and form a self-supporting structure; conversely at a higher temperature the gelation took place. At pH 9, the protein structure could be more readily opened to expose hydrophobic patches, due to disruption of hydrogen bonds and dissociation of hydrogen from carbonyl and sulfate groups at alkaline conditions, thus a lower energy input was required to favor protein interactions, allowing gel formation at 110° C. Oat protein hydrolysates by alcalase were able to form gels only at pH 9 while those by pepsin did not form gels under any conditions. Without restriction to a theory, it is believed that the 12S-A fraction of oat globulin exerts great influence over the gelling ability of oat protein, especially under acidic and neutral pH, as samples with well-preserved 12S-A subunits demonstrated good gelling properties in such pH ranges. This might be partially related to the larger molecular weight of the acidic fraction compared to the basic polypeptide, which allows exposure of more reactive sites on a single polypeptide chain for intermolecular interaction development.

Whereas smaller fractions expose little reactive sites limiting the aggregation step, essential for the gel network formation (Handa, Hayashi, Shidara, & Kuroda, 2001). The formation of gel for alcalase hydrolysate at pH 9 might be attributed to the low surface charge of the basic polypeptide under alkaline condition which has an isoelectric point of 8-9. Thus the limited net charge could favor network formation via hydrophobic interactions due to reduced repulsive forces compared to those at pHs 5 and 7 (Totosaus et al., 2002). The hydrolysate prepared with pepsin could not form gels due to loss of both acidic and basic subunits.

Gels prepared from oat protein and its hydrolysates by flavourzyme and trypsin may be preferred embodiments, as these samples were able to form gels under a broad range of conditions.

Textural Profile Analysis (TPA)

Figure 3A:
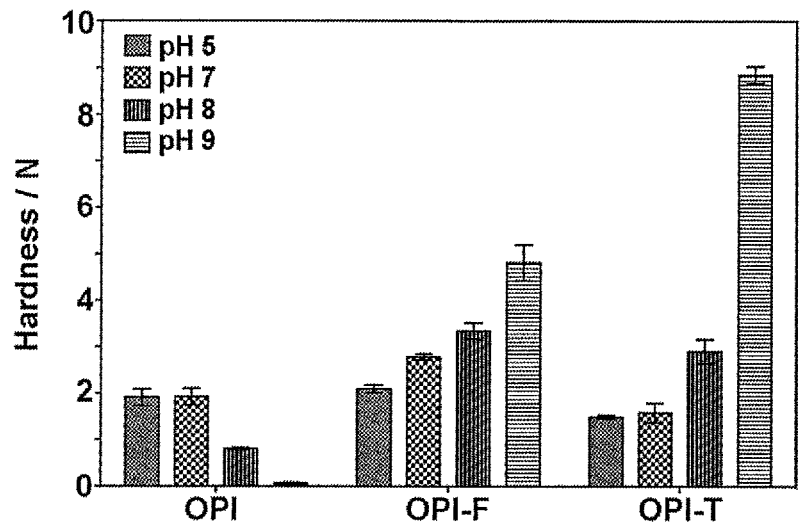
FIGS. 3A to 3C. Mechanical properties of oat protein derived gels prepared at 120° C.

The mechanical properties of the gels prepared with oat protein isolate and its hydrolysates at 120° C. were then studied, including hardness (force required to attain a given deformation), cohesiveness (work required to overcome the internal bonding of the material) and springiness (rate at which a deformed material recovers to its original condition after removal of deforming force) (Yuan & Chang, 2007). Results of TPA are shown in FIG. 3A. Oat protein isolate formed strong gels at pHs 5 (1.90N) and 7 (1.92N) at 120° C. In contrast, softer gels were observed at pH 8 (0.80N) and very weak gels were obtained at pH 9 (0.07N). The network structure of a heat-denatured globular protein gel depends greatly on the balance of attractive (hydrogen and hydrophobic interactions) and repulsive (electrostatic) forces among the protein molecules, as determined by pH and ionic strength (Bryant & McClements, 2000; Ma et al., 1988). Thus the right balance between the electrostatically repulsive force and the hydrophobic attractive force should explain the strong gels obtained at pH 5 and pH 7. However, beyond the optimal pH, disproportionate repulsive forces may have led to fewer protein interactions, since very weak gels were formed at pH 9 and intermediate hardness values were observed at pH 8. In one embodiment, flavourzyme hydrolysates formed stronger gels than oat protein isolate under comparable conditions. This improvement was especially significant at pHs 7-9 as the gel hardness increased from 2.80N to 4.80N.

Significant increases in gel hardness were not detected at pHs 5-7 for trypsin hydrolysates but hardness values increased to 3.03N at pH 8, then dramatically improved to 8.80N at pH 9. The fact that oat protein hydrolysates produced very strong gels at pHs 8-9 indicates that the balance between the electrostatically repulsive force and the hydrophobic attractive force changed as a result of enzymatic hydrolysis. Since enzymatic hydrolysis reduces the amount of Glu (acidic amino acid), the net charge of the hydrolysates at pHs 8-9 could be lower than that of the oat protein isolate, leading to decreased repulsive forces among polypeptide chains. In addition, the augmented hydrophobicity of the peptide chains after partial hydrolysis could contribute to the increased gel strength. A similar observation was reported by Ma (1985), in which both surface and exposed hydrophobicity of oat protein increased after trypsin hydrolysis. As mentioned earlier, the acidic polypeptide with hydrophilic character covers the basic polypeptide which has a more hydrophobic character, thus as hydrolysis progresses the acidic polypeptide is broken down and the overall hydrophobicity of the remaining fraction is increased (Kuipers & Gruppen, 2008). Thus, the reduced electrostatically repulsive forces and the increased hydrophobicity attractive force are equilibrated at this pH producing the right balance to develop a gel with enhanced hardness. It has been reported that soy protein gels had hardness values of around 2.1N-2.6N at neutral pH (Lamsal, Jung, & Johnson, 2007; Molina, Defaye, & Ledward, 2002). Gels prepared with oat protein isolate, showed a slightly lower value, but those gels prepared with flavourzyme and trypsin hydrolysates were comparable or higher than soy protein gels at the same pH. Gels prepared with flavourzyme and trypsin hydrolysates at pH 9 showed enhanced hardness, and the results corresponding to trypsin hydrolysate gels are even comparable to egg white protein gels (8.70N) under the same pH (Hammershøj & Larsen, 2001). It is understood that gels prepared at pH 9 could have a limited application as most food products have a pH value between 3 and 8. Nevertheless, egg white has a pH of 7.6-9.7 depending on the storage time and temperature (Banerjee, Keener, & Lukito, 2011), and yet it is commonly used in different applications. In addition, strong oat protein gels were also obtained at pHs 7 and 8 after limited flavourzyme hydrolysis, and at pH 8 after limited trypsin hydrolysis.

These gels can be more widely used in different food products. The effect of trypsin hydrolysis upon the gelling capacity of oat protein was previously studied by Ma and Wood (1986, 1987). The result indicated that trypsin treatment leads to a weak gel structure, probably due to reduction in the size of the protein molecules, which may no longer be able to associate to form a strong gel matrix. Whereas in this work, gels with significantly improved hardness were obtained at pHs 8 and 9 after limited trypsin hydrolysis due to maintenance of appropriate level of peptide size, allowing formation of good three-dimensional networks.

The detrimental effect of trypsin hydrolysis was also observed as part of the preliminary experiments for this work (data not shown), in which those hydrolysates produced after long periods of enzymatic treatment would not form a gel at all. Gelling conditions also significantly affect the properties of the resulting gels. The protein concentration and temperature selected for this study were higher than those applied in the work reported by Ma and Wood (1986, 1987).

Figure 3B:
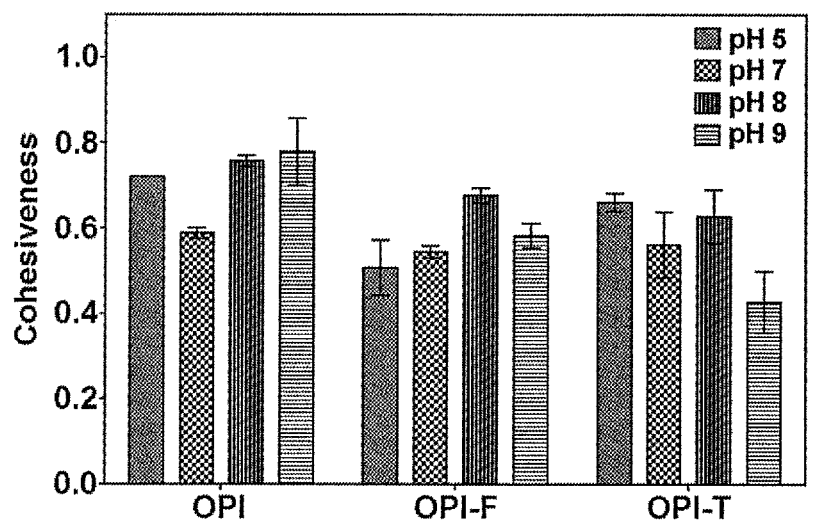

Oat protein isolate gels displayed good cohesiveness (FIG. 3B) with values of 0.6-0.8 at pHs 5-9. Similar values have been reported for soy protein isolate gels (Molina et al., 2002). Gels prepared with flavourzyme and trypsin hydrolysates also presented good cohesiveness, although slightly lower values were observed ranging from 0.7 to 0.4. The cohesiveness values reported in this study indicate that the gels maintained the integrity of their internal bonds when compressive forces were applied. A low cohesiveness value indicates damage to the internal bonds and thus a tendency to fracture under stress. Most of gels prepared in this study showed good resistance to disintegration due to compression.

Figure 3C:
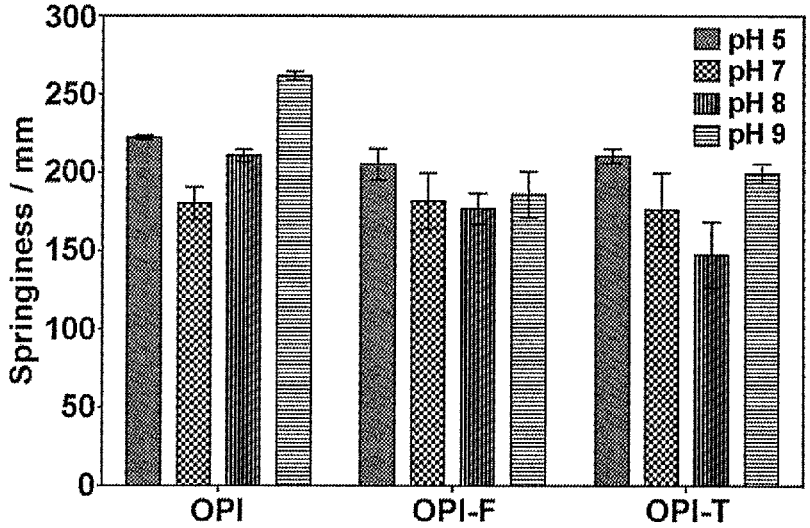
Figure 4A:
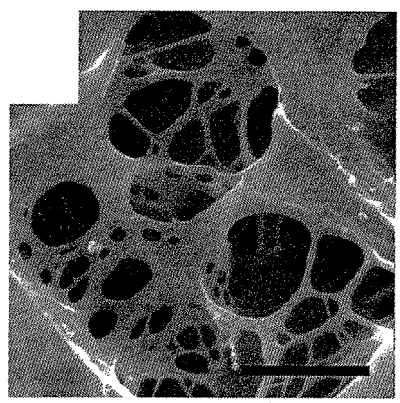
FIGS. 4A to 4E. SEM images of the cross section of oat protein derived gels prepared at 120° C. Scale bar represents 5 μm.
Figure 4B:
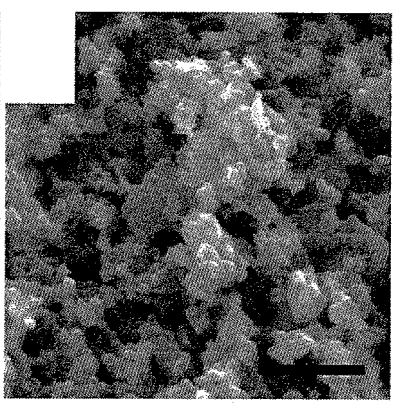
Figure 4C:
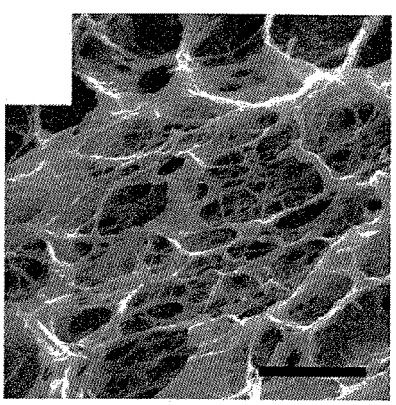
Figures 4D, 4E:
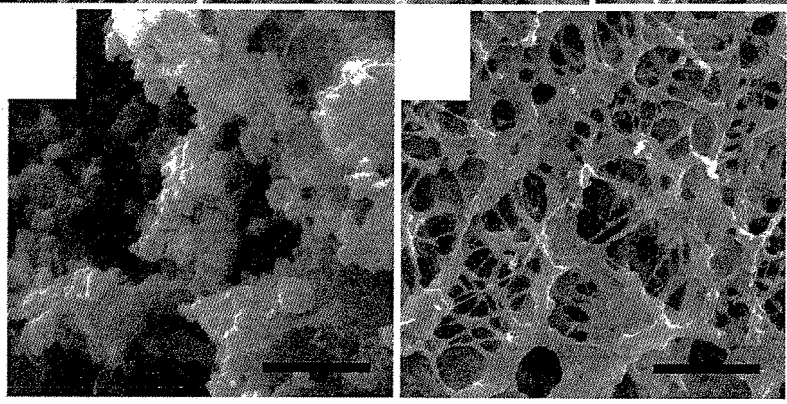

Both oat protein isolate and its hydrolysate gels showed good springiness (FIG. 3C) under the conditions tested. The impact of pH on gel springiness did not show an obvious trend.

Gel Morphology

The gel morphology observed using SEM shows the effect of pH on the gel microstructure (FIGS. 4A to 4E). It was expected that two types of structures would be observed, either fine-stranded or particulate gels, however the SEM micrographs showed a polymer gel structure for oat protein at pH 7 and for its hydrolysates at pH 9. Typical particulate gels were formed for both oat protein and its hydrolysate gels at pH 5 (SEM micrograph not shown) and for hydrolysate gels at pH 7. Only some specific protein gels, such as gelatin, can be considered polymer gels. Oat protein may have relatively flexible molecular chains, which allow formation of bridges between the interaction points when the balance between electrostatic repulsive forces and hydrophobic forces among polypeptide chains is achieved. This explains the strong mechanical property of oat protein gel at neutral pH and the significantly enhanced hardness of gels made from hydrolysates in mild alkaline pH. The gel morphology also clearly shows the effect of partial enzymatic hydrolysis on the gel microstructure. Since enzymatic hydrolysis reduces the amount of Glu (acidic amino acid), the net charge of the hydrolysates at pH 7 could be lower than that of the oat protein isolate, leading to decreased repulsive forces among polypeptide chains. Therefore these polypeptide chains could aggregate rapidly via hydrophobic interactions during heating treatment. Later, these aggregates associated to form particulate networks. Whereas at pH 9, the increased charge on the polypeptide chains led to strong repulsive force to prevent rapid protein aggregation, thus allowed formation of bridges between the interaction points on the polypeptide chains to create polymer gel.

Water Holding Capacity (WHC)

Water holding capacity is another important property of food gels and the separation of liquid from the gel network can produce physical modifications such as shrinking or alterations in the palatability of the product due to reduced moisture (Mao, Tang, & Swanson, 2001).

Figure 5:
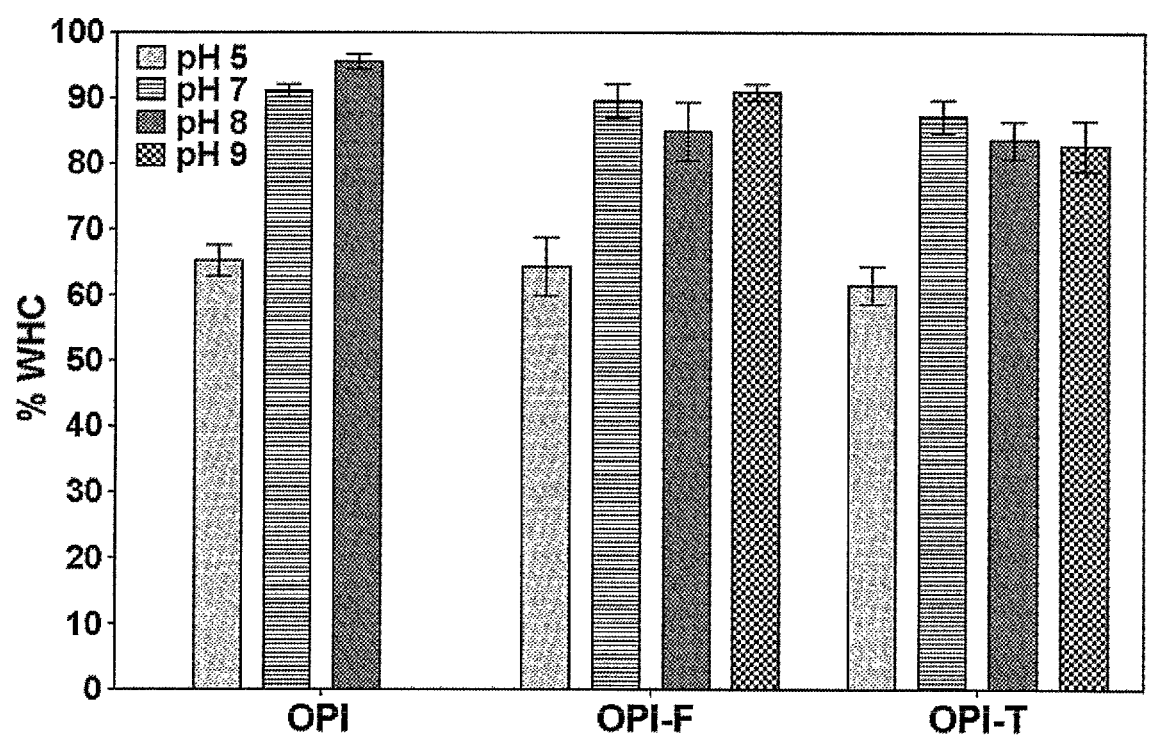
FIG. 5. Water holding capacity of oat protein derived gels prepared at 120° C.

These changes can reduce the quality and acceptability of the product and for this reason a high WHC is required in gels destined for food applications. All gels demonstrated excellent WHC (82.8-95.5%) at pHs 7-9 as shown in FIG. 5. Significantly reduced WHC values (61.5-65.2%) were observed at pH 5. According to previous literature, particulate gels formed at pH near the isoelectric point are characterized by an increased pore size that leads to a decrease in capillary forces and therefore a higher water loss (Chantrapornchai & McClements, 2002).

The WHC of gels prepared with oat protein isolate at pH 9 could not be determined as they were very weak. The WHC values reported in this work are comparable to soy protein (82.2%) (Wu, Hua, Lin & Xiao, 2011) and whey protein (~88%) (Yamul & Lupano, 2003).

Embodiments of the present invention are based on the demonstration that partially hydrolyzed oat protein could form gels with similar mechanical strength and water-holding capacity as those from animal proteins such as egg white. Thus oat protein gels may replace those derived from animal proteins to provide texture and structure in food products.

Section 2 Cold Gelation

Unlike typical particulate or filamentous gel network structure of globular protein, oat protein gels resulting from heat treatment exhibited a polymer-like network structure at pH 7 and 9, which was similar to gelatin gels and explained their strong mechanical properties. Strong plant protein gels are interesting for applications in providing texture and structure for food products, or acting as carrier of bioactive compounds to resist deformation during processing, so as to potentially replace animal protein gels. It may be desirable to produce such strong gels by cold-gelation. However, cold-set gelation of oat protein has never been reported, and the formation mechanism at molecular and/or supramolecular levels of its unique polymer-like network structure is unclear.

Embodiments of the present invention are based on investigations into the structure, properties and formation mechanism of cold-set oat protein gels prepared with an organic acid or acidulant (preferably glucono-δ-lactone (GDL)). Molecular basis of oat protein aggregation was examined using Fourier transform infrared (FTIR), dynamic light scattering (DLS), and atomic force microscopy (AFM). Oat protein gel supramolecular characterization was then conducted using rheological measurement and a scaling model, which linked gel macroscopic elastic properties to microscopic structural parameters to determine the gel fractal dimension (Hagiwara, Kumagai, & Matsunaga, 1997, Renkema, & van Vliet, 2004).

Materials

Naked oat grains (*Avena nuda*) (crude protein 17.2%) were purchased from Wedge Farms Ltd., Manitoba, Canada. Glucono-δ-lactone (GDL) was obtained from Sigma-Aldrich Canada (Oakville, ON, Canada). Other chemicals used in the experiment were all analytical grade and from Fisher Scientific (Whitby, ON, Canada). Milli-Q water was used in all experiments. Oat protein isolate (OPI) was extracted from defatted oat flour using alkaline and isoelectric point precipitation method according to our previous work (Nieto-Nieto, et al., 2014). The protein content of OPI was 91.2%±2.4 determined by Leco nitrogen analyzer (FP-428, Leco Corporation, St Joseph, Mich.) and a nitrogen to crude protein conversion factor of 6.25 was used.

Rheological Properties and pH Value of OPI Solutions with GDL

Dynamic rheology experiment was carried out on a DHR-3rheometer (TA Instruments, DE, USA) to study the gelation process of OPI solutions with the addition of GDL. Parallel plate geometry with a gap of 1 mm was used to measure dynamic viscoelastic parameters (shear storage modulus G' and loss modulus G"). The value of the strain amplitude for all samples was set as 1%, which was within a linear viscoelastic regime. The preheated OPI (5 and 7%, w/v) solutions with different amount GDL (3, 5, 10, and 15%, w/w, based on the dry weight of protein) were placed on the plate immediately after the addition of GDL and the dynamic time sweep measurements were performed at an angular frequency of 1 Hz at 25° C. over a period of 20 h. A frequency sweep was subsequently conducted as a function of angular frequency (ω) from 0.1 to 100 rad s-1 at 25 C to study gel shear strength. A thin layer of low-viscosity silicone oil was applied to prevent dehydration during the test. The change of pH value during OPI gelation was monitored simultaneously after GDL addition using pH meter (Thermo Scientific Orion 3 Star pH Meter, MA, USA) and the pH value did not change after aging for 20 h.

Gel Preparation

Gels were prepared by mixing preheated low concentration (less than about 10% OPI w/v) OPI solutions with varying amounts of GDL.OPI (5% and 7%, w/v) was dissolved in distilled water and stirred overnight. The solution pH was adjusted to 8 using 1 M NaOH before heating. Then the OPI solution was tightly sealed in glass vial and heated at 115° C. (above denaturation temperature) in oil bath for 15 min, followed by cooling down to room temperature and addition of different amount of GDL (3, 5, 10, 15% w/w, based on the dry weight of protein). Then, the suspensions were stored at 4° C. for 20 h to form OPI gels. The obtained gels were coded as OG5-3, OG5-5, OG5-10, OG5-15, OG7-3, OG7-5, OG7-10, and OG7-15, corresponding to the different OPI and GDL concentrations, respectively.

Gel Properties

Mechanical properties of the obtained gels with about 10 mm in length and 12 mm in diameter were determined using an Instron 5967 Universal testing instrument (Instron Corp., Norwood, Mass., USA) equipped with a 50N load cell. All gel samples were compressed twice to 50% of their original height at room temperature and the constant crosshead speed of 1 mm/min. Two texture parameters including compressive stress and springiness were computed by software (Bule Hill 2). These parameters were determined from the typical Instron force-time curve. Compressive stress indicates the gel firmness calculated as the compressive force (hardness, N) over the cross-sectional area of the gel. Springiness indicates how well a gel physically springs back after the first compression, which is measured by the distance of down stroke of the second compression (Bourne, 2002).

Water holding capacity (WHC) of OPI gels was measured according to the method of Kocher and Foegeding (1993) with modifications. Gel samples (0.8-1.0 g) were placed into Vivaspin 20 centrifugal filter unit (GE Healthcare Bio-Sciences AB, Uppsala, Sweden) with 5 μm filter membrane and then centrifuged at 2000 rpm for 5 min at room temperature. The weight of the gels was recorded before (Wt) and after (Wc) centrifugation. The centrifuged gel was dried in oven at 60° C. overnight and weighted (Wd). WHC was calculated using equation (1).

$$WHC \% = \frac{Wc - Wd}{Wt - Wd} \times 100\% \qquad (1)$$

Gel Morphology

The morphology observation of OPI gels was carried out with a Philips XL-30 scanning electron microscope (SEM) at an acceleration voltage of 6 kV. The samples were frozen in liquid nitrogen and then freeze-dried. The surface of the gels was then sputter-coated with gold, observed and photographed.

Controlled Release

Riboflavin was selected as a bioactive molecule model to investigate the in vitro release properties of GDL-induced OPI gels. Drug-loaded OG7-10 gels were prepared by dispersing riboflavin in pre-heated OPI solutions before adding GDL, and the riboflavin content was 7.1% (w/w) based on the dry weight of protein. The drug-loaded gels were cut into small pieces (2×2×2 mm) and dried at room temperature for 48 h. The release kinetics was then assessed with a 2100C dissolution system (Distek Inc., NJ, USA) in four dissolution mediums: HCl-saline solution (pH 1.2); phosphate-buffered saline (PBS, pH 7.4); simulated gastric fluid (SGF, pH 1.2) with 0.1% pepsin (w/v); and simulated intestinal fluid (SIF, pH 7.4) with 1.0% pancreatin (w/v). One piece of drug-loaded gel was placed in 50 mL HCl-saline solution or SGF at 37° C. and stirred at 100 rmp.

After 2 h, the gel was washed and transferred into 50 mL PBS or SIF for another 15 h at the same conditions. The riboflavin content in the release mediums was monitored with S-3100 UV-vis spectrophotometer (Scinco Co. Ltd., Japan) at a wavelength of 445 nm.

Protein Structures in OPI Gels

The conformational changes of unheated, preheated OPI and acid-induced OPI gels were characterized by FTIR. OPI (1%, w/v) were dispersed in H2O and adjusted to pH 8 using 1% NaOH. The OPI solution was heated at 115° C. for 15 min, followed by cooling it down. Then, different amount of GDL (3, 5, 10, 15%, w/w) was added into OPI solutions, respectively, and stored for 20 h. The samples were placed between two CaF2 windows separated by 25 μm polyethylene terephthalate film spacer for FTIR measurement. H2O with or without GDL was used as background. The spectra of samples were recorded using a Nicolet 6700 spectrophotometer (Thermal Fisher Scientific Inc., Pittsburgh, Pa., USA) in the range of wavenumber from 400 to 4000 cm-1 during 128 scans with 2 cm-1 resolution. The spectrophotometer was continuously purged with dry air from a lab gas generator (Parker Hannifin Corp., USA). For amide I band region (1700-1600 cm-1), Fourier self-deconvolution was performed using Omnic 8.1 software at a bandwidth of 24 cm-1 and an enhancement factor of 2.5. The established wavenumber ranges reported by Byler, and Susi (1986) were used as reference to assign the amide I band components to secondary structure motifs.

Dynamic light scattering measurement was performed using a Zetasizer Nano-ZS (Malvern Instruments Ltd., UK) equipped with a 633 nm He—Ne laser to determine the size change of OPI. A total of three averaged sub-runs were analyzed at a fixed 90o scattering angle. Unheated, preheated, and GDL added OPI suspensions (1%, w/v) were diluted to 0.25 mg/mL in Milli-Q water before analysis. The apparent particle size was obtained by CONTIN mode analysis.

The morphology of unheated, preheated, and GDL added OPI suspensions were determined by atomic force microscopy (AFM). OPI suspensions were diluted to 0.025 mg/mL. Then, 20 μL sample solution was deposited onto freshly cleaved mica and dried at room temperature. Tapping mode AFM images were collected by AFM MPF-3D (Asylum research, Oxford Instrument Company, Santa Barbara, Calif., USA) and Inverted Optical Microscope Olympus 70/71 (Olympus Co., USA) under ambient conditions. The system was installed in an acoustic hood to minimize vibrational noise. A silicon-etched cantilever with a tip radius of 20-30 nm was driven at oscillation frequencies in the range of 580-600 kHz. The collected images were flattened using AS software for further analysis.

Determination of Fractal Dimension

Strain sweep measurements for 5-8% (w/v) cold-set OPI gels formed at various GDL concentrations (3, 5, 10, 15%, w/w) were carried out on a DHR-3 rheometer (TA Instruments, DE, USA). Each gel was cut into 10 mm height before test. The gel was compressed to 80% of original height (8 mm) using parallel plate geometry. The G' value of each gel was evaluated as a function of strain from 0.1 to 100% with an angular frequency of 1 Hz. Initial G' value, G0, was calculated as the average value of G' at the strain range from 0.1 to 1%. Over a certain strain, G' decreased corresponding to the breakdown of the gels. The critical strain (γ0) was calculated as the critical point of strain at 95% of G0. The calculated G0 and γ0 were then used for fractal analysis of OPI gels.

The scaling model modified by Wu and Morbidelli (2001) was selected to determine the elastic contributions of both inter- and intra-floc links using a microscopic elastic constant (α, 0≤α≤1). It allows the identification of gelation regime prevailing in the system and indicates the importance of inter- and intra-floc links. The expressions of scaling model dependence of G' and γ0 are as follows:

$$G' \sim \varphi^{\beta/(d-D_f)} \quad (2)$$

$$\gamma_0 \sim \varphi^{(d-\beta-1)/(d-D_f)} \quad (3)$$

$$\beta = (d-2) + (2+x)(1-\alpha) \quad (4)$$

Where d is the Euclidean dimension (d=3 in three-dimensional systems); Df is the fractal dimension of the system; β is an auxiliary parameter; x is the fractal dimension of the floc backbone or tortuosity of the network range of [1, 1.3]. Based on the equations (2) and (3), Df and β can be directly calculated through the slopes (power-law exponents) of the log-log plots (G' vs ø and γ0 vs ø).

The values of α will be determined through subsequent substitution of the β value to equation (4) with the assumed backbone fractal dimension x=1 and x=1.3, respectively, to identify the prevalent gelation regime in the system.

Statistical Analysis

All experiments were performed at least in triplicate. Results were expressed as mean±standard deviation. Statistical analysis was conducted using the Statistical Analysis System (SAS for windows, Release 9.0, SAS Institute Inc., Cary, N.C.). Analysis of variance (ANOVA) was chosen to analyze the effects of GDL concentration on gel mechanical properties. Tukey test was used to compare multiple means. A probability of p<0.05 was considered to be statistically significant.

Cold-Set OPI Gel Characterization

Relatively low concentrations of OPI (less than about 10%, preferably between about 5 and about 7%, w/v) and high electronic repulsion condition (pH 8) were chosen to achieve the cold-set gelation rather than higher concentrations of OPI (greater than about 10% w/v) used in the thermally induced gelation. The addition of GDL to the pre-heated OPI solutions resulted in the decrease of pH and neutralization of the negatively charged OPI molecules. The gradually weakened repulsive force allowed the establishment of connections among OPI molecules to form a continuous three-dimensional network.

Figure 6A:
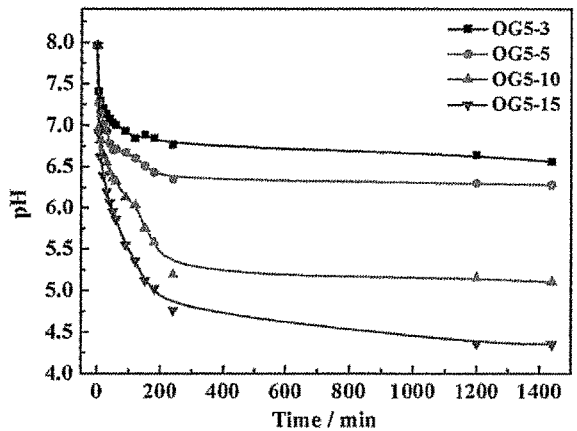
FIGS. 6A to 6F show time dependence of pH value and storage modulus (G') of OPI gels prepared at different GDL concentrations.
Figure 6B:
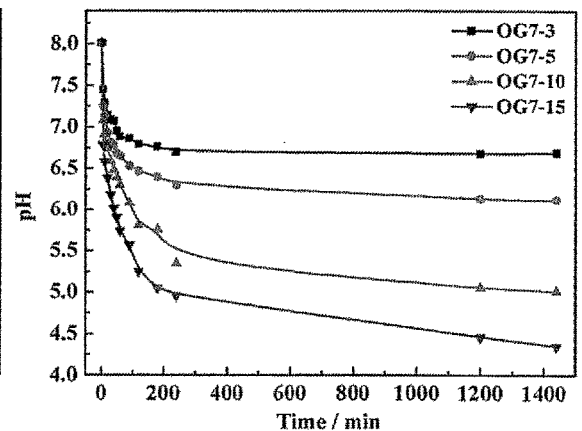

The pH changes during acidification of preheated OPI solutions at various GDL concentrations as a function of time are shown in FIGS. 6A and 6B. For OPI solutions with low GDL concentrations (3 and 5% GDL), pH decreased rapidly in first 100 min; while for the samples with relatively high GDL concentrations (10 and 15% GDL), fast pH reduction was found during first 210 min, followed by slow pH decrease. After 1200 min, steady-state pH values were achieved, indicating that the GDL hydrolysis reached equilibrium situation. Thus, an aging time of 1200 min (20 h) was selected for the formation of GDL-induced OPT gels. Increasing GDL content led to faster pH reducing rate and lower final pH values due to the high level of gluconic acid production. Both 5 and 7% OPI solutions had similar pH alteration trends and final pH values, suggesting that the GDL content was an important key to control the final pH of the system, as a consequence impacted the gel structure and properties. The final pH values of OPI solutions were set as 6.75, 6.25 (higher than IEP), 5.15 (around IEP) and 4.35 (lower than IEP) by adding different concentrations of GDL (3, 5, 10, and 15%, w/w), respectively.

Figure 6C:
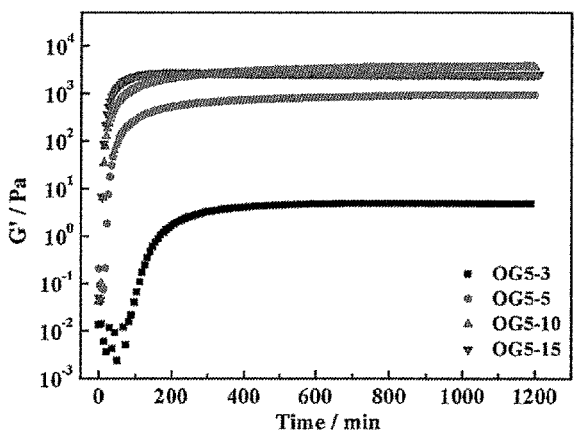
Figure 6D:
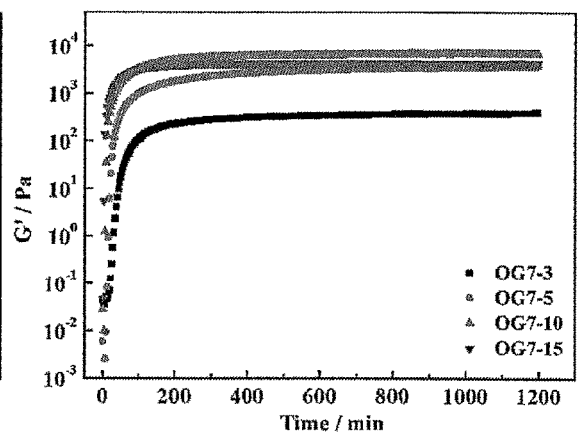
Figure 6E:
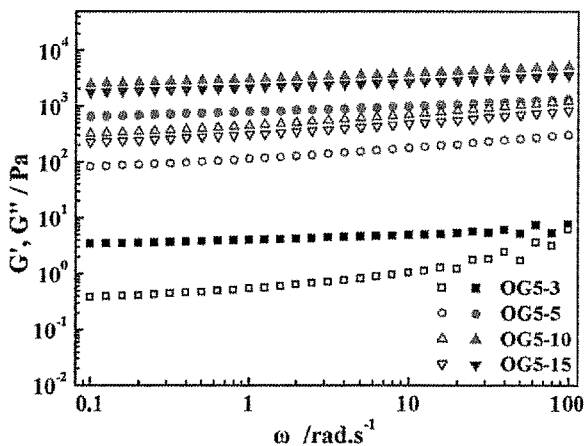
Figure 6F:
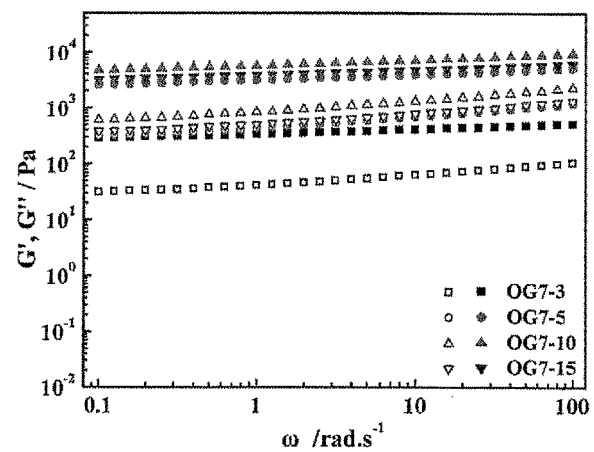

The OPI gelation process triggered by GDL hydrolysis was monitored by advanced rheometer. FIGS. 6C and 6D illustrate the evolution of storage modulus (G') of OPI solutions with different GDL concentration as a function of time. G' and G" values indicate the evolution of the solid elements and viscous elements in the system, respectively. The initial G' was always higher than G" for oat protein, suggesting that an elastic modulus predominated the system (Tunick, 2010). In this case, only G' was chosen as the indicator to display the OPI gelation process at different GDL concentrations. For all samples, G' significantly increased after the addition of GDL within a certain time, then presented a plateau-like behavior which indicated the transition from a viscoelastic fluid to a viscoelastic solid (Barbut, & Foegeding, 1993). Comparing FIG. 6A with 6C or 6B with 6D, the development of G' was correlated to the gradual decrease of pH value, and the points where G' researched plateau were found at pH≈6.80 for all the samples. The suspensions reached these points faster at higher amount of GDL. However, the highest final G' values (1200 min) were observed when GDL content was 10% and the final pH value was around IEP. It could be supposed that the final pH of the system as modulated by GDL amount played an important role in determining the structure and properties of OPI gels.

Gel Mechanical Properties and Water Holding Capacity

Figure 7A:
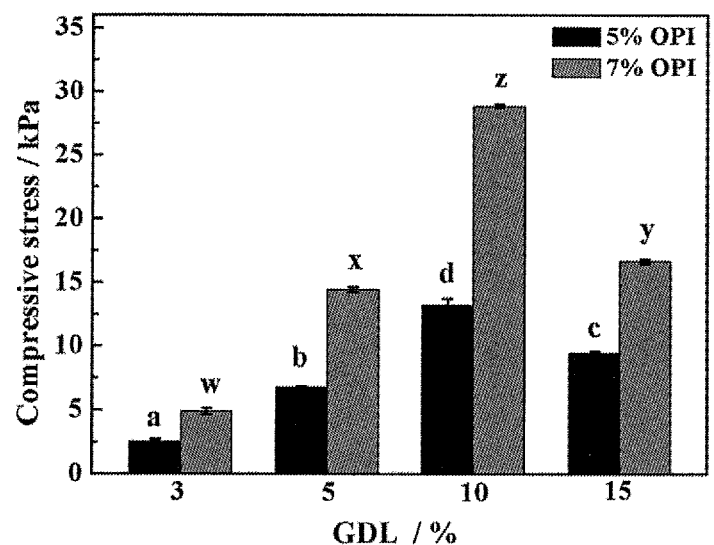
FIGS. 7A and 7B. Frequency dependence of storage modulus (G', solid) and loss modulus (G", open), (FIG. 7A) compressive stress and (FIG. 7B) springiness of OPI gels prepared at different GDL concentrations. Different letters on the top of the columns indicate the significant difference ($p<0.05$) due to GDL concentration.
Figure 7B:
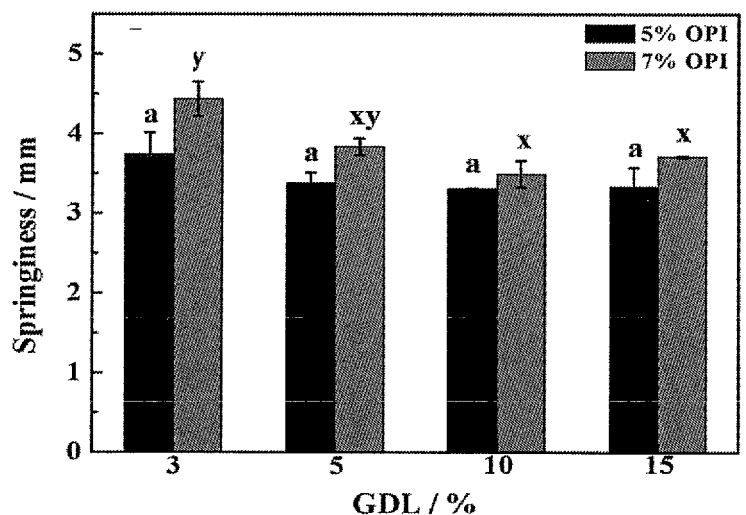

FIGS. 7A and 7B show the frequency dependence of G' and G" curves of OPI gels prepared with different GDL concentrations. For all the samples, G' was higher than G". The lowest G' values for both 5% and 7% OPI gels were found at 3% GDL. The G' and G" curves of OG5-3 were frequency dependent and even had crossover at high frequency, which indicated the weak gel shear strength (Nunes, Raymundo, Sousa, 2006. Savadkoohi, Farahnaky, 2012). G' values of other gels formed at 5, 10, and 15% GDL were frequency independent, indicating strong gel shear strength (Zhang, Jiang, Wang, 2007). The highest gel shearing strength was observed at the GDL concentration of 10%. In addition, gels formed with higher protein concentration (7%, w/v) exhibited stronger shear strength.

Compressive stress of OPI gels is shown in FIG. 7C, which indicates the gel firmness. None of the gels broke when compressed to 50% of their original height. GDL contents significantly impacted gel compressive stress. As shown in FIG. 7C, the weakest gel was observed at 3% GDL concentration, where the final gel pH was 6.75. With increasing GDL concentration to 10%, the compressive stress of OPI gels dramatically raised from 2.5 kPa to 12.5 kPa where the final pH value decreased to around 5.15. Further increase of GDL concentration to 15% led to the decrease of compressive stress to 9.0 kPa and a lower pH value of 4.35. Gels prepared with 7% protein exhibited significantly higher compress stress than those prepared with 5% protein when the GDL content was same. This trend was in accordance to the result of frequency sweep test. Similar phenomenon was also reported for fish protein gels (Hamaguchi, & Tanaka, 2003, Fretheim, et al. 1985) and diary protein gels (Jacob, M, Nöbel, S., Jaros, D., & Rohm, H. 2011). The gel springiness, which indicates how well a gel physically springs back after the first compression, is shown in FIG. 2D. All the gels exhibited good springiness, since they could spring back to 3.4-4.3 mm after first compression of 5 mm. GDL amounts did not significantly impact the gel springiness when gels were prepared with 5% OPI. However, when prepared with 7% OPI, the gel with 10% GDL showed lowest springiness (~3.5 mm).

Figure 8:
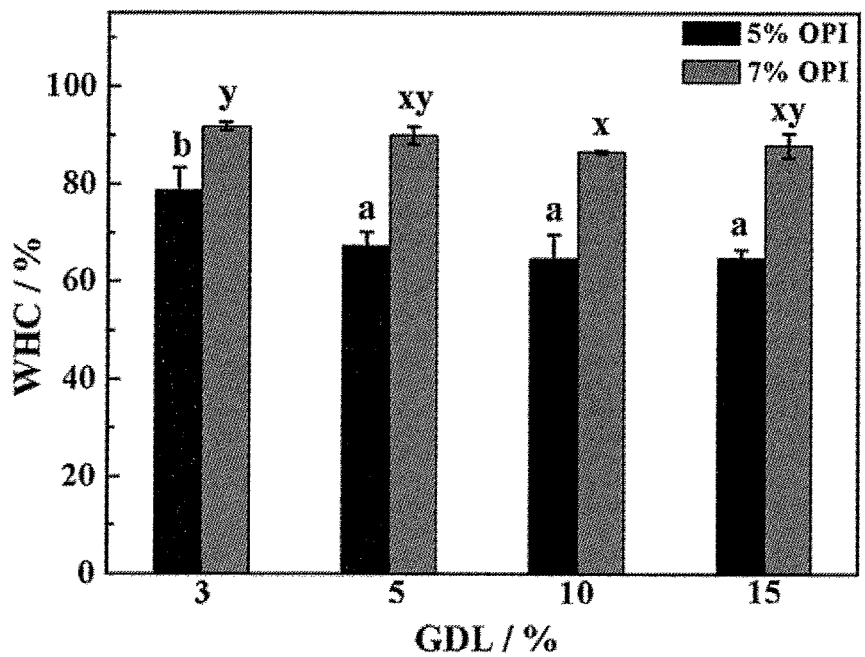
FIG. 8. Water holding capacity of OPI gels prepared at different GDL concentrations. Different letters on the top of the columns indicate the significant difference (p<0.05) due to GDL concentration.
Figure 9A:
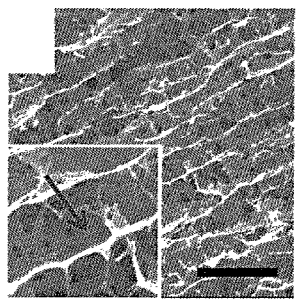
FIGS. 9A to 9H. SEM images of OPI gels prepared at different GDL concentrations.
Figure 9B:
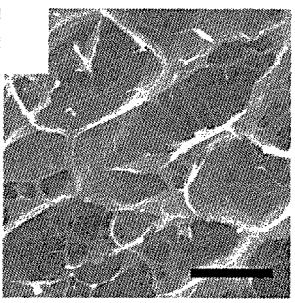
Figure 9C:
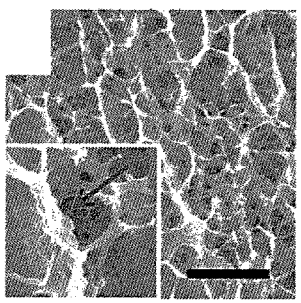
Figure 9D:
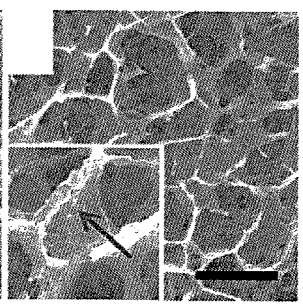
Figure 9E:
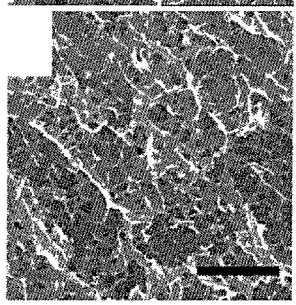
Figure 9F:
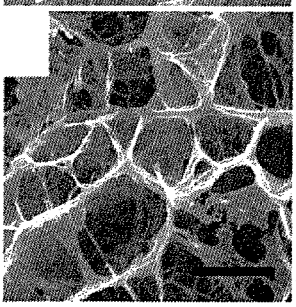
Figure 9G:
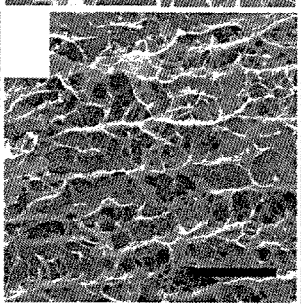
Figure 9H:
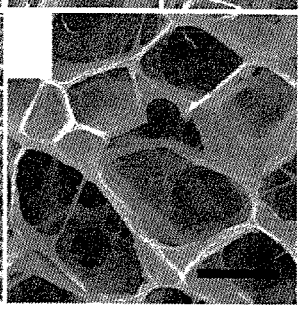

Water holding capacity (WHC) is another important property of gel to evaluate its acceptability. Losing water caused by intrinsic instability, external forces, or temperature fluctuation may result in the shrinkage of gels, changing texture and reducing quality (Mao, Tang, & Swanson, 2001). Thus, the gels with high WHC are usually required for food and non-food applications. As shown in FIG. 8, all the gels prepared with 7% OPI demonstrated excellent WHC of around 89-92%, which were generally higher than those prepared with 5% OPI (68-80%). Moreover, the gel with 3% GDL exhibited higher WHC compared to the gel with 10% GDL.

It was worth noting that OG7-10 gel showed the highest compressive stress of 30 kPa, which is comparable to that of egg white protein gels (22-32 kPa) (Hammershøj & Larsen, 2001). In addition, these cold-set OPI gels were prepared at relatively low protein concentration, but most of them possessed superior gel strength comparing with many other plant protein gels. For example, thermal-induced oat protein gels (15% w/v) had hardness values of around 13 kPa at pH 7 and 5 (Nieto-Nieto, et al. 2014); legume protein isolate gels (20 wt %) showed the compressive stress of approximate 5.0-8.0 kPa when compressed to 70% deformation (Makri, Papalamprou, & Doxastakis 2006); the stress at rupture for cold-set whey protein (8%)/flaxseed gum (0.3%) bi-polymeric gel and soy protein (3%) gellan gum (0.7%) bi-polymeric gel was around 25 and 20 kPa, respectively, when compressed to 80% of iteir original height (Kuhn, Cavallieri, & Cunha, 2011; Vilela, Cavallieri, & Cunha, 2011); the GDL-induced 7% whey protein isolate gel had stress of around 22 kPa at rupture when compressed to 80% of its original height (Cavallieri, & Cunha, 2008,). GDL-induced OPI gels also exhibited excellent WHC, which were comparable not only to thermal-induced oat protein gels (~90%) and soy protein gels (~82%) (Nieto-Nieto, et al. 2014, Wu, Hua, Lin, & Xiao, 2011), but also to the cold-set whey protein gels (~92%) (Vilela, et al., 2011). The gels maintain their good mechanical properties and water-holding capacity after microwave treatment.

Gel Morphology

In general, globular protein forms gels with particulate or filamentous microstructures depending on processing conditions, such as pH, ionic strength, etc. As shown in FIGS. 9A to 9H, polymer-like network structure was observed for all cold-induced OPI gels, which could be the reason of their strong mechanical properties. However, various pore size and wall thickness were observed depending on the final pH value modulated by different GDL contents. Network structure with large pores was observed at pH 6.25 and 4.35 when 5% and 15% GDL were added into the system, whereas the pore size was much smaller at pH 6.75 and 5.15 with addition of 3% and 10% GDL. Especially, the walls were obviously thicker when prepared at 10% GDL compared to those at 3% GDL (insets of FIGS. 9A and 9C). The alteration of gel network structure well explained the change of their mechanical properties. The most compact network structure with small pore size and thick walls formed at 10% GDL resulted in the strongest gel, while the moderate mechanical properties were observed for those with 5 and 15% GDL due to the relatively loose network structure. Although 3% GDL gels also had small pore size, the thickness of wall was much thinner. Thus, OPI gels formed at 3% GDL exhibited the weakest gel strength. The same trend was observed for both systems with protein concentration of 5% and 7%. But in general, more solid and compact structure was observed at 7% protein due to stronger protein-protein interactions, thus the gels with 7% OPI contents were stronger than 5% OPI gels.

Environmental pH value impacts the balance between attractive force (hydrogen bonding and hydrophobic interaction) and repulsive force (electrostatic) in the gel system. As a consequence, it influences the gel network structure and gel strength (Bryant & McClement, 2000; Ma, Khanzada, Harwalkar, 1988). When the final pH of gel was far from IEP (pH 5) of oat protein, such as OG5-3 and OG7-3 (pH 6.75), the high repulsive forces between protein molecules which might resist the development of protein molecular attractive interactions resulted in gel network structure with small pores and thinnest walls. Thus, the gels prepared with 3% GDL exhibited the lowest gel strength. As the pH decreased to 6.25 at 5% GDL, the reduced repulsive forces between protein molecules caused the increase of pore size and wall thickness, which accounted for higher gel shear strength and compressive stress compare to the one prepared with 3% GDL. When the pH was near oat protein IEP, the electrostatic repulsive forces reached a minimum value which facilitated development of protein attractive interactions to reinforce the gel networks (Denis Renard, Fred vandeVelde, & Visscher, 2006, Totosaus, Montejano, Salazar, & Guerrero, 2002). Therefore, OPI gels induced by 10% GDL, where the final pH was around 5.15, showed dense OPI gel network structure with rough wall consisted of high level of protein aggregates (internal figure of FIGS. 9A and 9C) and small pores, resulting in the highest shear strength and compressive stress. In addition, as a consequence of reduced electrostatic repulsions at this condition, the protein-protein interactions increased and protein-water interactions decreased (Puppo, Lupano, & Añón, 1995, Chantrapornchai, & McClements, 2002), so that the weaken of capillary forces between protein and water molecules was responsible for the relatively low WHC value of OPI gels with 10% GDL. Likewise, the stronger interactions or cross-links within OG7-10 gel restricted the flexibility of the protein aggregates, and caused the less springiness and more rigid structure (Ngapo, et al, 1996). While at pH lower than IEP (gel formed with 15% GDL, pH 4.35), the pore size of gel network became large again due to the regained electrostatic repulsive forces. Thus, the gel shear strength and compressive stress decreased again. In addition to GDL content, protein concentration also significantly influenced the gel mechanical properties and water holding capacities. The stronger gels with better water holding capacities were obtained in system with higher protein concentration, where more protein molecules were involved to build up the gel network structure and had capacity to interact with water. Unlike soy protein and whey protein gels, cold-set OPI gels formed the expected polymer-like structure, which largely contributed to the enhanced gel properties.

3.1.4 In Vitro Release Behavior

Gels have been extensively studied in food and nutraceutical applications, due to their ability to protect and deliver bioactive compounds (Chen, et al, 2006; Buwalda, Noere, Dijkstra, Feijen, Vermonden, and Hennink, 2014). The porous gel network structure along with retaining high water content allows gels to encapsulate water-soluble molecules with high drug loading efficiency (Kashyap, Kumar, Ravi Kumar, 2005; Gangyly, Chaturvedi, More, Nadagouda, Aminabhavi, 2014).

Figure 10:
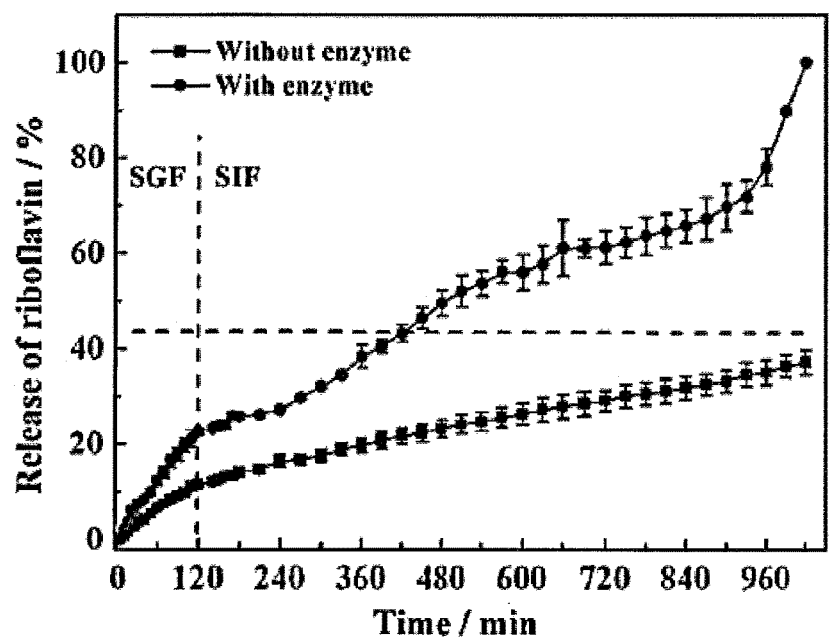
FIG. 10. Release profiles of riboflavin from drug-loaded OG7-10 gels at 37° C. in HCl-saline buffer (pH 1.2) for 2 h and then in PBS buffer (pH 7.4) for 15 h with or without digestive enzymes.

To investigate the controlled release property of GDL-induced OPI gels, the strongest gel OG7-10 with small pores and dense wall was chosen as the matrix and riboflavin was selected as the model bioactive molecule. As shown in FIG. 10, OG7-10 gel exhibited a slow release rate in the mediums without digestion enzymes, where only 11.4% and 37.2% riboflavin was detected in HCl-saline after 120 min and in PBS after 1020 min, respectively. Understanding of the release mechanisms is important to design nutraceutical delivery system efficiently. In general, the mechanisms of drug release from a polymer matrix can be categorized in three ways (Arifin, Lee, & Wang, 2006): (1) diffusion from the non-degraded polymer (diffusion-controlled system); (2) enhanced drug diffusion due to polymer swelling (swelling-controlled system); and (3) release by polymer degradation and erosion (erosion-controlled system). The Korsmeye-Peppas semi-empirical equation was applied to identify the mechanism of riboflavin release from OG7-10 gel (Chen, Remondetto, Rouabhia, & Subirade, 2008; Wang, & Chen, 2012; Wang, & Chen, 2014):

$$M_t/M_\infty = kt^n \tag{5}$$

Where $M_t/M\infty$ is the fraction of the model molecule released after time t relative to the amount of model molecule released at infinite time, k is a constant and n is the diffusional exponent. Inferences about the release mechanism are based on the fit of this equation to the model molecule release data through 60% dissolution and comparison of the value of n to the semi-empirical values for slab geometry reported by Peppas, where n=0.43 indicates Fickian diffusion, 0.45<n<0.89 indicates non-Fickian transport, and n=0.89 or higher indicates case II transport. The OG7-10 gel in HCl-saline buffer (before 120 min) had a n value of 0.23 ($R^2$=0.93), while in PBS (after 120 min) the n value was 0.68 ($R^2$=0.98). This result revealed that riboflavin release followed a diffusion-controlled mechanism in the acid condition at first, while the enhanced riboflavin diffusion happened due to the swelling of the gel in PBS.

The release behavior of riboflavin from OG7-10 gel in the simulated gastro-intestinal tract with the presence of digestive enzymes was also evaluated. Drug-loaded gels were immersed in SGF for 120 min and then in SIF for another 900 min. As shown in FIG. 5, the release of riboflavin was only 22.6% after the incubation in SGF, demonstrating a good barrier property of OPI gel. When transfer to SIF, the remaining riboflavin was released slowly and completed after 960 min due to the gel matrix degradation. The controlled release of riboflavin in PBS or simulated gastro-intestinal fluids could be due to the well-established polymer-like network structure with dense wall and small pores, which inhibited the penetration of PBS and/or digestive enzymes and slowed down the leaching out of bioactive molecules. Thus, it could be concluded that the GDL-induced OPI gels had the ability to protect and deliver bioactive molecules to the small intestine.

Cold-Set OPI Gel Formation Mechanism

Unlike many other globular proteins, oat protein formed polymer-like structure. Such unique structure endowed the OPI gels with strong mechanical properties, high water holding capacity and controlled release behavior, which suggested wide food and non-food applications. Especially, because they were formed at mild conditions. A better understanding of the correlation of gel structure and functional properties will allow designing gel with desirable applications at molecular and/or supramolecular level.

A Molecular Study—Protein Conformational Changes

Amide I band, which corresponds mainly to the C=O stretching vibration of the peptide backbone, is sensitive to the alterations in protein secondary structures (Byler & Susi, 1986 Surewicz & mantsch, 1988, Renugopalakrishnan, Chandrakasan, Moore, Hutson, Berney, & Bhatnagar, 1989). Four main components relate to particular secondary structure including α-helix, β-sheet, β-turn, and random coil (Surewica, Mantsch, & Chapman, 1993, Arrondo, Muga, Castresana, & Coni, 1993). These individual component peaks can be achieved through Fourier self-deconvolution within a range of 1600-1700 cm-1.

Figure 11A:
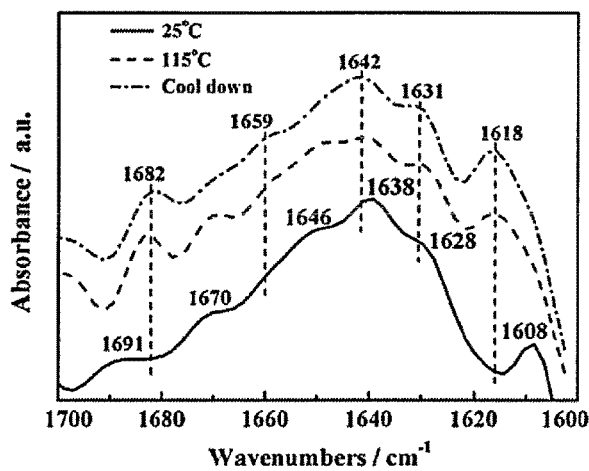
FIGS. 11A to 11B. Fourier-deconvoluted FTIR spectra of (FIG. 11A) oat protein solutions (1% w/v in $D_2O$) upon heating and cooling.

The deconvoluted spectrum in the amide I band region of 1% (w/v) OPI solutions without heating treatment is shown in FIG. 11A. Unheated OPI exhibited several bands which had been previously assigned to protein secondary structures: 1691 cm-1 (β-sheets/turns), 1670 cm-1 (β-sheets/turns), 1646 cm-1 (α-helix and random coil), 1638 and 1628 cm-1 (β-sheets), and 1608 cm-1 (vibration of amino acid residues) (Byler et al., 1986; Boye, Ma, Ismail, & Alli, 1996; Liu, Li, Shi, Wang, Chen, Liu, et al., 2009). The deconvoluted spectrum of OPI solution heated to 115° C. (FIG. 6A) significantly differed from the native one. It should be noticed that two new peaks appeared at 1682 and 1618 cm-1. The band of 1618 cm-1 corresponded to intermolecular β-sheets caused by aggregation via hydrogen bonding (Clark, Saunderson, & Suggett, 1981), while the one at 1682 cm-1 indicated the antiparallel β-sheets (Bandekar, 1992). Moreover, the high intensity at the wavenumbers ranged from 1625 to 1675 cm-1 could be observed. Within this range, the band at 1631 cm-1 was corresponded to disordered β-strands, the high intensity at the wavenumbers of 1642 cm-1 was attributed to polypeptide segments in random coil configuration, and the weak peak at 1659 cm-1 could be associated with the segments of α-helix. After cooling the preheated solutions (FIG. 11A), the peak at 1670 cm-1 disappeared and the intensity of peaks at 1659, 1642, and 1618 cm-1 increased.

Figure 11B:
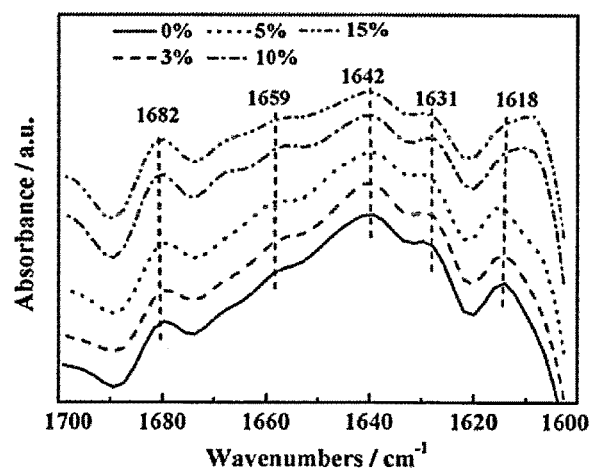

The increase of intermolecular and antiparallel β-sheets structures and the changes of α-helix, β-strands, and random coils contents suggested the conformation rearrangement and realignment of molecular segments within the network during heating and cooling process. FIG. 11B presents the deconvoluted spectra of OPI solutions with various GDL concentrations. Interestingly, the spectra of OPI solution with 3% GDL was very similar to that of preheated OPI solution without GDL (FIG. 6B), suggesting that the molecular structure of OPI did not significantly change after the addition of 3% GDL. With the further increase of GDL concentration, the significant decrease of intensity between wavenumbers of 1625 to 1675 cm-1 could be found, and the aggregation peak at 1618 cm-1 became larger and broader which even shifted to 1610 cm-1.

Based on these results, it was understood that oat protein got denatured and then aggregated during heating. Through cooling process, more aggregation was observed since the peak at 1618 cm-1 became larger. Similar to the conformational changes of whey protein, intermolecular and antiparallel β-sheets increased during heating and cooling (Painter, and Koenig, 1976; Ma, Rout, Philips, 2003; Remondetto, G. E., Subirade, M. 2003). Nevertheless, in spite of aggregation structures, the considerable amount of secondary structures still existed. It was different from BSA, soy and whey proteins, which exhibited most aggregates after heating and cooling (Murayama, & Tomida, 2004; Lefevre, & Subirade, 2000; Remondetto, G. E., Subirade, M. 2003). This difference might relate to the amino acid composition of oat protein, which contained high level of Glx (Glu+Gln). Such amino acid composition could alter the charge of the polypeptide chains, so that prevent protein severe aggregation at pH far from its IEP. After adding GDL, obvious aggregation between protein molecules was monitored by FTIR. However, because of the existence of secondary components, the association might also occur between the polypeptide segments at supramolecular level in addition to small aggregates.

Supramolecular Study—Size and Microstructure Analysis

Figure 12A:
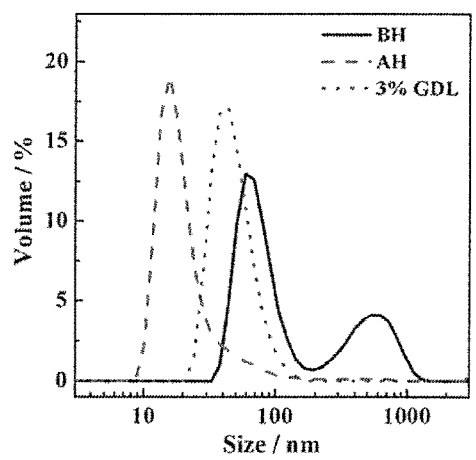
FIGS. 12A to 12D.
Figure 12B:
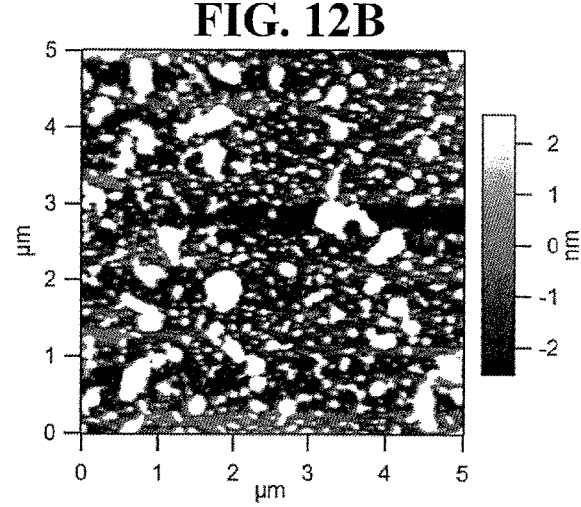
Figure 12C:
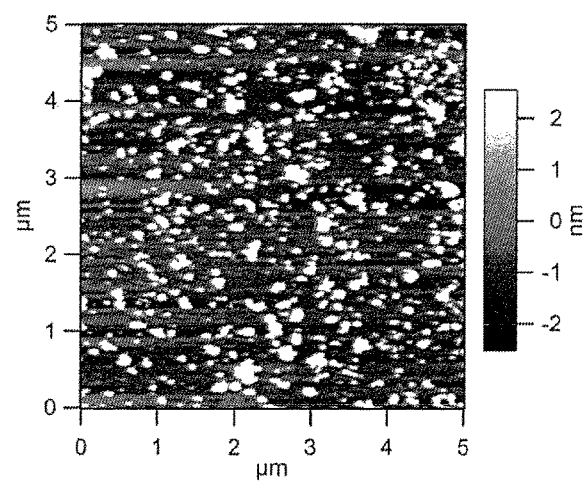
Figure 12D:
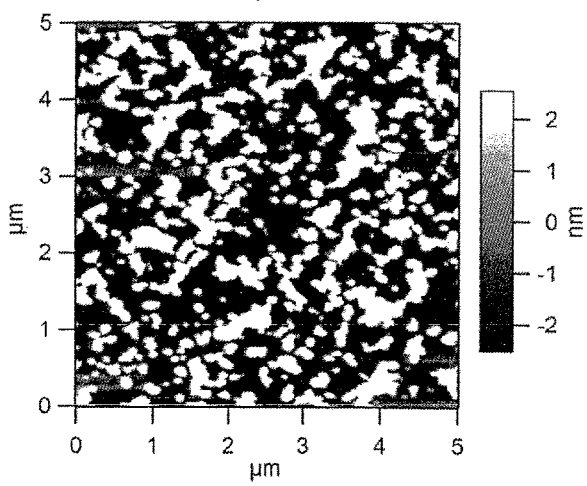

FIG. 12A illustrates the size distribution of native, preheated, and GDL added OPI suspensions using dynamic lighter scattering technique. The native (FIG. 12A, BH) OPI displayed two peaks, which indicated the approximate hydrodynamic radius of 59.59 and 620.40 nm, respectively. After heating at 115' C for 15 min, only one peak was observed and the hydrodynamic radius of OPI significantly decreased to around 15.12 nm. Addition of GDL caused OPI hydrodynamic radius increased again to 43.85 nm. The changes of particle size of native, preheated, and GDL added OPI suspensions were further determined by atomic force microscopy. As shown in FIG. 12B, the native OPI displayed the heterogeneous aggregates with disordered structures on the mica slide. Notable differences were found in preheated oat proteins (FIG. 12C) that those large aggregates dissociated into small ones with size range from approximately 20 to 300 nm. It should be noticed that the size of these particles observed by AFM was larger than that determined by DLS. It was due to the air drying process during sample preparation, which aroused aggregation of the protein molecules or association of the aggregates. The addition of GDL into preheated OPI solution significantly increased the particle size (FIG. 12D). Although no continuous network structure was observed due to the dilute protein concentration, these large aggregates could be considered as precursors of gel network. It was interesting that the size of OPI decreased after heating at 115° C. for 15 min, which was contrary to soy protein and whey protein that their hydrodynamic radius increased after heating due to the thermal-induced molecular aggregation (Jones, Adamcik, Handschin, Bolisetty, & Mezzenga, 2010; Maltais, Remondetto, & Subirade, 2008). The significantly decreased hydrodynamic radius of preheated OPI was attributed to the dissociation of OPI hexamers (Zhao, Mine, & Ma, 2004; Runyon, Nilsson, Alftrén, & Bergenstahl, 2013). When heating at high temperature (100 or 110° C.), the monomers even existed as extended conformation, which has similar size with trimmers of around 5.9 nm. In this work, the size of preheated OPI was in the range of 7 to 20 nm, so it might consist of extended monomers, oligomers, and small aggregates. This could explain the result of FTIR that considerable amount of secondary structures mainly with random coil polypeptide segments still existed in addition to aggregates after heating and cooling process. After adding GDL, these polypeptide segments could be observed as revealed by FTIR, but the particle size significantly increased as shown in DLS and AFM results. Thus these monomers and oligomers should directly associate to form gel structure at supramolecular level, which confirmed the assumption proposed in FTIR test.

According to the above results, it could be deduced that both association of OPI oligomers and aggregates occurred at the same time after adding GDL. Normally, globular protein forms soluble aggregates first, followed by association into insoluble aggregates and thus a three-dimensional network. However, the three-dimensional network of oat protein was formed through the link of monomers, oligomers and small aggregates. It was worth noting that the association was initiated at pH 8, where relatively strong electrostatic repulsive forces existed between OPI. Thus, the monomers and oligomers could have high potential to grow in an orderly way into polymer-like microstructures following the nucleation-dependent polymerization process, similar to protein fibril formation. The first step was the initial slow nucleation phase, in which the nuclei (oligomers and/or small aggregates) were formed from extend monomers. Then the elongation stage began with addition or condensation in an orderly fashion of monomers and oligomers to form protofibrils, and finally, the association of protofribils led to polymer-like network microstructure (Harper, & Lansbury, 1997; Lee, Culyba, Powers, & Kelly, 2011; Benseny-Cases, Klementieva, & Cladera, 2012).

A Supramolecular Study—Scaling Behavior and Fractal Analysis

Rheological test was then applied for fractal analysis, since it provides another insight into the microstructure of gel based on the macro-mechanical properties. The scaling model developed by Wu et al. (2001) was chosen in this study which relates the structure of gels to the rheological properties. Using this model, the fractal dimensions (Df) and gelation regime prevailing in the system could be estimated and identified. Calculation of the Df and determination of the gelation regime using this model closely relies on the double logarithmic plot of elastic modulus (G') and critical strain ($\gamma 0$) versus protein concentration ($\varphi$).

Figure 13A:
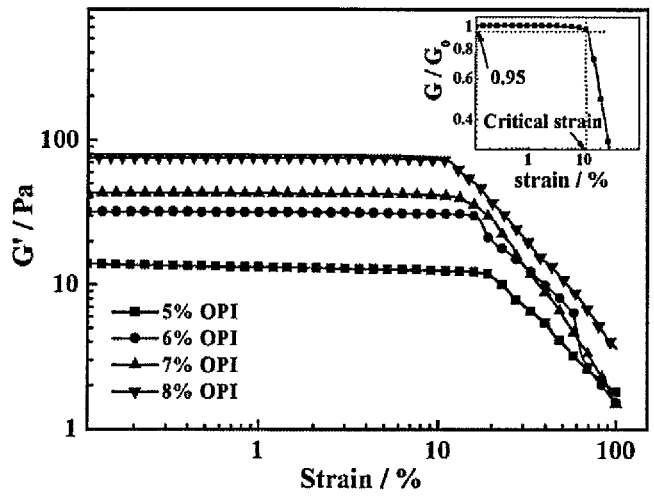
FIGS. 13A to 13C.
Figure 13B:
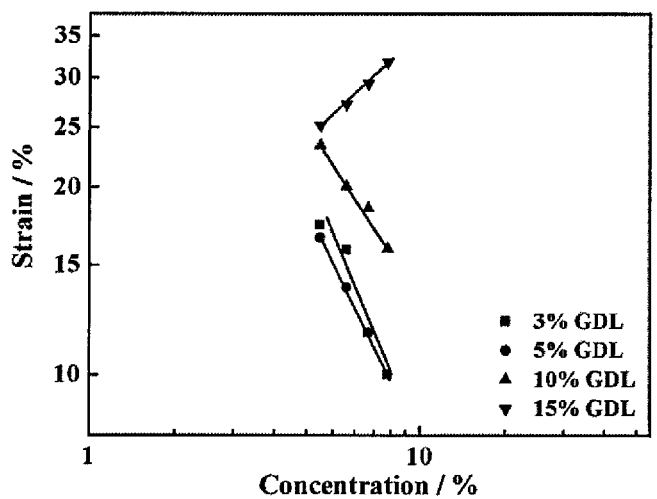
Figure 13C:
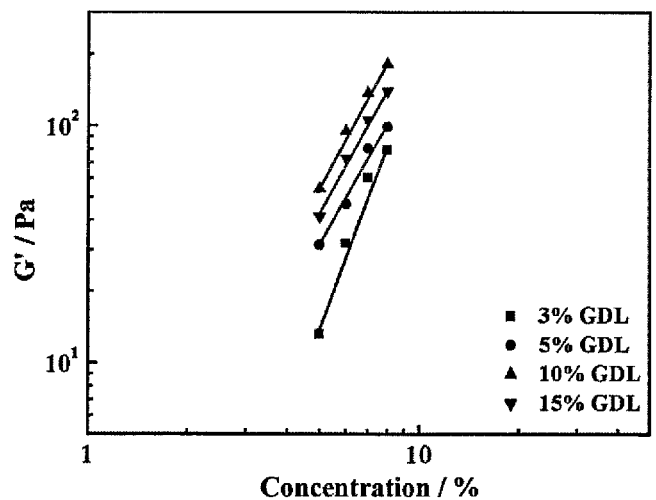

FIG. 13A shows the modulus-strain profile of 3% GDL-induced OPI gels. At all protein concentrations, G' values remained almost constant as strain increased and then suddenly decreased beyond a certain strain value, which indicated a breakdown of bonds within the gel network and a transition from linear to non-linear behavior (Ould Eleya, & Gunasekaran, 2004). The strain amplitude at which G' began to decrease by 5% from its maximum value, as shown in the inset of FIG. 13A, was taken as a measurement of the limit of linearity or critical strain $\gamma 0$ of the gel (Rueb & Zukoski, 1997; Shih, Shih, Kim, Liu, & Aksay, 1990). The gels formed with 5 and 10% GDL had similar transition trends where the critical strain decreased with the increase of protein concentration, while gel produced by 15% GDL had an opposite transition trend. According to the obtained critical strain, scaling behaviors of $\gamma 0$ versus $\varphi$ for gels prepared with different amount of GDL were plotted in FIG. 13B. The average G' values in the linear region of strain sweep measurements were calculated and plotted as a function of protein concentration in FIG. 13C. As shown in FIGS. 13B and 13C, both $\gamma 0$ vs $\varphi$ and G' vs $\varphi$ for all the gels exhibited power-law relationship and the slopes which indicated as the exponents (Table 1, A and B) were applied to obtain Df and a values through equations (2), (3) and (4). Aggregation of protein particles behaves as stochastic mass-fractal on a length scale larger than the size of primary particles (Hagiwara, kumagai, & Nakamura, 1998; Marangoni, Barbut, McGauley, Marcone, & Narine, 2000). Then these highly disordered fractal aggregates grow to form three-dimensional continuous network or gel when protein concentration is large enough. The Df value is used to quantify the disordered structure of aggregated particles, which indicates the relation between the number of particles in the aggregates and their typical size (Jullien and Botet, 1987; Vreeker, Hoekstra, den Boer, and Agterof, 1992). The estimated Df values of OPI gels are listed in Table 1, ranging from 1.99 to 2.31, which agree well within the range of Df (~1.5-2.8) of other protein gels (Bremer, et al. 1990; Hagiwara, et al. 1998, Marangoni, et al, 2000; Bi, Li, Wang, & Adhikari, 2013; Ould Eleya, et al., 2004). Normally, the higher Df value means more compact and dense aggregate structure (Vreeker, Hoekstra, den Boer, and Agterof, 1992; Kontogiorgos, Vaikousi, Lazaridou, and Biliaderis, 2006). It was necessary to note that the gel induced by 3% GDL had higher Df value of 2.23 comparing to 5% GDL (Df=1.99), which meant the structure of 3% GDL induced gel was more compact and dense. However, the high-energy barrier caused by strong electrostatic repulsion forces due to the pH far from protein IEP at 3% GDL condition could result in the high Df values (Lin, Lindsay, Weitz, Ball, Klein, & meakin, 1990). Thus, the high Df value of 3% GDL induced gel overestimated relationships between OPI molecules. With raising GDL concentration from 5 to 15%, Df values increased from 1.99 to 2.31, which implied that the protein aggregates became more compact and denser. As GDL induced pH reduction from pH 8 and Df value growth, micro- and macro-syneresis within the system might occur. For the gel induced by 5% GDL (pH 6.25), small amount of repulsive charges among OPI molecules were existed. Thus the rearrangement of protein aggregates was believed to happen, also known as micro-syneresis, which was initiated at molecular level by binding of the flexible branches of the clusters (Mellema, Walstra, van Opheusden, & van Vliet, 2002). This process resulted in bigger cluster and larger pores, leading to a gradual coarsening of the structure and a change in the firmness of gels, which well explained the network structure of 5% GDL induced OPI gel and gel strength revealed in SEM image and mechanical test. At 10% GDL, the pH was around oat protein IEP where the repulsive forces were almost diminished and higher Df value was observed. Accordingly, macro-syneresis occurred, which behaved as compacting and shrinking gel, inducing denser aggregates, and forcing out liquid (Maltais, et al. 2008, Mellema, et al, 2002). As a consequence, the walls of OG5-10 and OG7-10 gel network structure became denser and rougher, and the pore size became smaller than 5% GDL induced gel (internal figures of FIGS. 9A and 9C), which eventually resulted in the improved gel strength as revealed by the mechanical test. For 15% GDL gel, the highest Df value 2.31 was estimated, indicating the most compact and densest system structure. This was revealed by the internal images of SEM result (FIGS. 9C and 9D) that 15% GDL had thicker and rougher walls.

However, at 15% GDL condition, the final pH of system was around 4.35, the pore size of gel network structure became larger due to the existence of repulsive forces, as shown in SEM result, so that the gel strength of 15% GDL induced gel was weaker than 10% GDL gel. The micro-elastic parameter, $\alpha$, of the model is also presented in Table 1, which distinguishes the type of the gel and implies the relative contribution of inter- and intra-flock links in the gel network. When $\alpha=0$, it indicates strong inter-floc link gel; when $\alpha=1$, it indicates a weak inter-floc link gel (stronger intra-flock link); when $0<\alpha<1$, it suggests a transition regime with comparable contributions from inter- and intra-floc links to the gel. The value of a is estimated using two x values, 1 and 1.3, which are commonly used to provide approximation of fractal dimension of the backbone of colloidal aggregates (Ould Eleya, & Gunasekaran, 2004, Wu, et al. 2001). In this work, gelation of OPI solution induced by GDL was initiated at pH 8, followed by decrease of pH to form gel network structure. The pH of the initial network formation was around 6.80 as indicated by the result of time sweep (FIGS. 6A to 6F) where the point that G' almost reached plateaus. Thus, gel formed with 3% GDL, where the pH was around 6.75, could be considered as gel with initial network structure. The $\alpha$ values of 3% GDL induced gel, 0.34 (x=1) and 0.40 (x=1.3), were in the transition regime, suggesting a comparable contributions of inter- and intra-floc bonding. These comparable links allowed flocs approach to each other and linked in a linear way due to the gradual neutralization of charges between protein aggregates (Maltais, et al. 2008). Eventually, this linear link of flocs contributed to the formation of polymer-like network structures. With increase GDL concentration to 10%, a value increased slightly to 0.42 (x=1) or 0.47 (x=1.3) due to the reduced pH and repulsive forces, which still in the transition regime. It should be noted that a value was raised to 0.81/0.83 at the GDL concentration of 15%. The change of a values indicated that the aggregation of protein molecules at supramolecular level was toward weak inter-floc link regime as GDL concentration increasing. A dramatic decrease in repulsion forces on the surface of structural units of 15% GDL one, as indicated by the fast pH decreasing in FIGS. 6A and 6B, allowed the energy barrier to be lowered enough to increase the probability of interaction between two units (Lin et al, 1990), which increased the possibility for strong intra-floc link. Consequently, the protein aggregates were prone to associate in a random way in all directions, resulting thicker and rough walls as shown in the SEM images (inset figure of FIG. 9D). Undoubtedly, decreasing rate of pH value was an important factor to influence intra- and inter-floc links and thus impacted gel network structure. Nevertheless, in this work, OPI gelation was initiated at pH 8, and formed initial network structure at pH 6.80 at any GDL concentration. Although the rapid decreasing rate of pH at higher GDL concentration might enhance the potential of OPI molecules associate randomly, oat protein molecules approached one another in an ordered way to form a structure at first during the pH decreasing process. This association approach contributed to the polymer-like structure formation instead of particulate structure.

Figure 14:
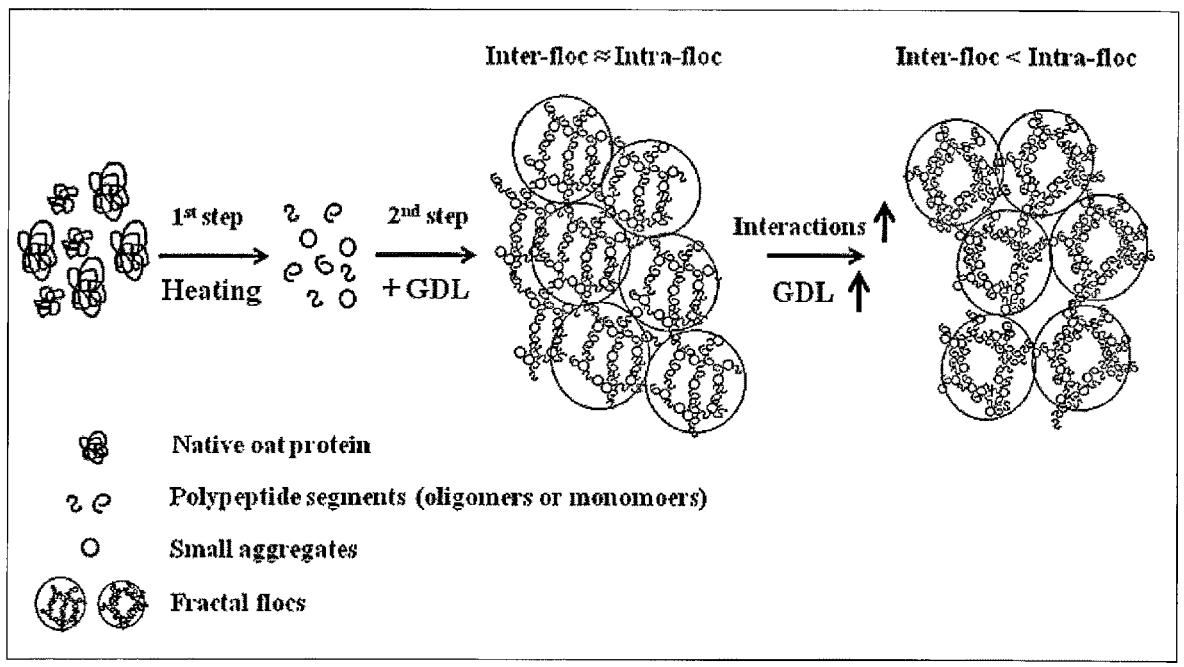
FIG. 14. Schematic illustration of formation mechanism of cold-set OPI gels with polymer-like network structure induced by GDL.

Therefore, all the OPI gels exhibited polymer-like network structures, but the one prepared with higher GDL concentration had thicker and denser walls. FIG. 14 summarizes the steps involved in the formation mechanism of cold-set OPI gels. In the first step, heating treatment caused oat protein dissociated from hexamers to trimers and monomers. Only partial trimers and extended monomers associated into oligomers and small aggregate and the others retained the structure during heating and cooling. In the second step, the addition of GDL caused pH decrease gradually, so that the reduction of repulsive forces between protein molecules promoted the non-covalent interactions, mainly based on hydrophobic interaction and hydrogen bonding, which resulted in the association of monomers, oligomers and small aggregates at both molecular and supramolecular levels with an ordered way because of comparable inter- and intra-floc interactions. Consequently, a three-dimensional polymer-like network could be fabricated rather than particulate and filamentous structure. Specifically, at the 3% GDL concentration where the final pH was 6.75, the repulsive forces between OPI molecules were relatively high, promoting the association of monomers, oligomoers (polypeptide segments) and small aggregates to form both the nucleated confonnrmation phase and the "protofibrils" backbone at elongation phase. Then protein molecular aggregation occurred preferentially and the comparable inter and intra-floc interactions allowed the association mainly along an ordered approach. Eventually, a polymer-like network structure with thin walls and small pores was fabricated. Such kind of structure resulted in a relatively weak gel strength, but high water holding capacity. This structure was considered as the initial OPI gel network structure. Since the gel induced by 5, 10, and 15% GDL concentration started at pH 8 and went through pH 6.75, the development of network structure of 5, 10, and 15% GDL induced gel based on this initial structure. When increasing GDL concentration, non-covalent interactions developed between OPI molecules after the initial structure formation as the further reduction of repulsive forces due to the final pH reaching/near oat protein IEP. At the same time, micro- and/or macro-syneresis of OPI molecules occurred due to various GDL concentration.

Micro-syneresis of OPI aggregates at 5% GDL concentration caused the pore size of gel network structures larger than 3% GDL induced gel, so that the gel strength was improved and has excellent water holding capacity as well. While at 10% GDL concentration, the micro- and macro-syneresis occurred at the same time, resulting in a polymer-like structure with thicker and rougher walls and small pore size. This kind of structure largely improved the gel strength, and maintained the good water holding capacity. For the gel induced by 15% GDL, the final pH was apart from OPI IEP.

Therefore, even the thick and rough walls was formed, the pore size of gel network structure was larger than 10% GDL induced gel, which resulted in decreased gel strength. According to the results discussed above, a schematic description of the formation mechanism of cold-set OPI gels is proposed. The addition of GDL in OPI solution allowed it to form a polymer-like gel network structure with differ mechanical properties and water holding capacities.

TABLE 1

Experimentally measured rheological data and derived microscopic structural parameters of OPI gels prepared at different GDL concentrations.

| [GDL] | Power-law exponents | | Model of Wu and Morbidelli (2001) | | | |
|---|---|---|---|---|---|---|
| % (w/w) | $A^a$ | $B^b$ | $D_f^c$ | $\beta^c$ | $\alpha^c$ at x = 1.0 | $\alpha^c$ at x = 1.3 | Regime |
| 3 | 3.86 | −1.24 | 2.23 | 2.97 | 0.34 | 0.40 | Transition gel |
| 5 | 2.92 | −0.93 | 1.99 | 2.94 | 0.35 | 0.41 | Transition gel |
| 10 | 2.87 | −0.77 | 2.04 | 2.73 | 0.42 | 0.47 | Transition gel |
| 15 | 2.28 | 0.65 | 2.31 | 1.56 | 0.81 | 0.83 | Transition gel |

$^a$Slope from log-log plot of G' vs Concentration.
$^b$Slope from log-log plot of strain vs Concentration.
$^c$Values of $D_f$, $\beta$ and $\alpha$ based on the model of Wu and Morbidelli (2001).

4. Conclusion

Cold-set OPI gels at 5 and 7% (w/v) protein concentrations were prepared with the addition of GDL. These gels were formed at mild conditions (room temperature and pH 8) and low protein concentration, but exhibited strong mechanical properties and great water holding capacity. Moreover, all the gels exhibited polymer-like microstructures. Heating and cooling process, gel final pH, and pH decreasing rate were responsible for such network structures. Firstly, heating and cooling process caused OPI hexamers dissociation, followed by the association of OPI monomers and oligomers to form "protofibrils" backbone at elongation phase. Then the addition of GDL resulted in the further association of small aggregates and oligomers orderly at the same time due to comparable intra- and inter-floc interactions. Depending on the different GDL concentrations and the final pH values, gels with polymer-like structure exhibited various pore size and wall thickness. At 3% GDL concentration, where the final pH was higher than OPI IEP and the pH decreased slowly, oat protein fabricated a polymer-like structure with small pore size and thin wall and relatively weak gel strength.

With increasing GDL concentration, micro- and macro-syneresis occurred which resulted in compact network structures with large pore size and thick wall and stronger gel strength. The strongest gel, OG7-10, was even comparable to egg white protein gel. This gel with good strength, elasticity and water holding capacity demonstrated the capacity to controlled release riboflavin in buffers and simulated gastro-intestinal fluids. Thus, such cold-set gels using plant resource could be developed for food and non-food applications, especially in terms of delivery vehicle for heat sensitive compounds, development of food texture, design as facial mask, scaffolds in tissue engineering, and dressings for wound healing, etc.

Section 3—OPI and Inulin

As described above, oat protein is suitable as a gelling agent. Oat protein forms strong gels at alkaline conditions, for example, trypsin-treated oat protein could form gels with comparable mechanical strength to egg white protein at pH 9. However, oat protein gels are relatively weak when formed under acidic and neutral pH. This could be a limiting factor in the application of oat protein in food systems that normally have pH values in the range of 2.5 to 7. Therefore alternative approaches to enable formation of stronger oat gels within a more appropriate pH for food processing are desirable to promote the utilization of oat protein as a gelling agent.

Inulin is a non-digestible polysaccharide naturally occurring in several edible fruits and vegetables. It is formed by fructose molecules linked by $\beta$-(2-1) glycosidic bonds, generally with a terminal glucose unit connected to the last fructose by an $\alpha$-(1-2) bond. Due to the unique nature of inulin bonds, digestive enzymes in the human gut cannot hydrolyze this polysaccharide. Inulin reaches the colon undigested and produces a prebiotic effect since it is fermented by lactic acid bacteria. Additionally, inulin has other interesting biological properties such as enhancing mineral absorption, and reducing both lipid levels and the risk of colon cancer. The utilization of inulin in the food industry is not limited to its biological properties; it is also incorporated in food formulations as a fat replacer or bulking agent, such as in table spreads, baked goods, sauces and yogurt. Such a wide range of applications are related to its capacity to form microcrystals that interact with each other forming small aggregates, which immobilize a great amount of water, creating a fine creamy texture that provides a mouth sensation similar to that of fat. Previous reports have investigated the influence of inulin, soy protein gels, yogurt and cheese, finding that the protein-inulin system had improved gelling properties. Nonetheless the effect of inulin addition on the gelation properties of oat protein has never been reported.

One embodiment of the present invention arises from investigations of the effect of oat protein and inulin interactions on the gelation properties of oat protein isolate. Mechanical and rheological properties of oat protein gels were determined as were their microstructures. Improvement of the gelling properties of oat protein at acidic and/or neutral pH may create broad applications of this plant-sourced gelling ingredient in foods. These value-added opportunities may represent very significant sources of revenue to oat producers and processors to enhance their sustainability.

Materials

Naked oat grains (*Avena nuda*) were purchased from Wedge Farms Ltd., Manitoba, Canada. The protein content was 16.6%±0.64 as determined by Leco nitrogen analyzer (FP-428, Leco Corporation, St Joseph, Mich.) using a protein calculation factor of 6.25. Oat protein isolate (OPI) was extracted according to our previous work and the protein content was determined to be 90.40%±0.59 using the same Leco nitrogen analyzer. Inulin was extracted from chicory root with an average degree of polymerization of according to product specifications; 2-mercaptoethanol, urea, sodium dodecyl sulfate, fluorescein isothiocyanate (FITC), Rhodamine B and dimethyl sulfoxide (DMSO) were obtained from Sigma-Aldrich Canada (Oakville, ON, Canada).

Gel Preparation

To study the effect of inulin addition upon gel properties, gels were prepared by heating the protein-inulin suspensions at pH 2.5, 5 and 7 adjusted with 0.1N NaOH or HCl. The concentration of OPI in the mixtures was kept constant at 15% (w/v), which was revealed to be the optimized oat protein concentration for gel formation (Nieto-Nieto et al. 2014). The concentration of inulin varied from 0 to 0.5% (w/v) in the mixture, these values were selected based in preliminary trials. Samples were labeled as OPI, OPI-I 0.1%, OPI-I 0.25% and OPI-I 0.5%, representing inulin content of 0%, 0.1%, 0.25% and 0.5% respectively. Test tubes containing the suspension were tightly closed and placed in an oil bath at 100° C. for 30 min. Once the heat treatment was completed, the tubes were cooled in an ice bath and stored in the refrigerator overnight.

Textural Profile Analysis (TPA)

The mechanical properties of the gels were evaluated using an Instron 5967 universal testing machine (Instron Corp., Norwood, Mass., USA). Gels were dismounted from test tubes and cut into cylindrical pieces (~10 mm height, ~14 mm diameter). A two cycle compression test using a 50N load cell was performed at room temperature at a rate of 1 mm/min and 50% compression to evaluate their mechanical properties. The textural profile parameters were determined from the typical Instron force-time curve in which compressive stress was calculated as the peak compression force in the 1st bite cycle, divided by the initial cross-section area of the gel sample, and cohesiveness is the ratio of the area under the first and second compression peaks. Springiness is the distance calculated from the area under the second compression peak and gumminess is the product of peak compression force in the 1st bite cycle multiplied by cohesiveness.

Water Holding Capacity (WHC)

A gel sample (0.9-1.2 g) was placed into a Vivaspin 20 centrifugal filter unit (GE Healthcare Bio-Sciences AB, Uppsala, Sweden) and centrifuged at 290×g for 5 min at 15° C. The weight of the gel was recorded before (Wi) and after (W) centrifugation to the nearest 0.0001 mg and the percentage of water loss after centrifugation was expressed as:

$$\% WHC = 100 - \frac{(1-W_f)}{W_1} \times 100$$

Scanning Electron Microscopy (SEM)

The morphology observation of the gels was carried out with a Phillips XL-30 scanning electron microscope (FEI Company, Oregon, USA) at an acceleration voltage of 6 kV. The samples were frozen in liquid nitrogen and freeze-dried before observations. The cross-section and surfaces of the dry gels were sputtered with gold and platinum, observed and photographed.

Rheological Measurements

The rheological measurements were done with a TA Discovery HR-3 rheometer (TA instruments, New Castle, Del., USA). Approximately 1 mL sample was loaded in the bottom plate of the parallel plate geometry; the upper plate was lower to the appropriate geometry gap. To avoid evaporation during heating a solvent trap was used and a thin layer of silicone oil was applied. The temperature of the bottom plate was controlled with a Peltier system. To study the changes in viscoelastic properties as a function of temperature, OPI and OPI-inulin suspensions were subject to a temperature ramp from 25 to 95° C., then cooled down to 25° C. at a rate of 1.5° C./min. Sample conditioning took place before and after each temperature ramp for a period of 3 min. The temperature ramp was not run up to the gelling temperature used in other experiments described in this paper (100° C.) as preliminary experiments reaching 100° C. produced readings with intense disparities due to water boiling, thus the maximum temperature used was 95° C. All rheological measurements were done within a predetermined linear viscoelastic region, which was determined in preliminary experiments, setting the strain value at 0.05%.

To evaluate the molecular interactions involved in the formation of OPI and OPI-inulin gels, a frequency sweep analysis was conducted. Gels were prepared as previously described in the gel preparation section at pH 2.5, 5 and 7 and cut into approximately 1 cm (height) sections. The resulting gel disk were submerged for 48 h in solutions of 2-mercapthoethanol (2-ME) (0.2 M), urea (6 M) and 109 sodium dodecyl sulfate (SDS) (1% w/v), which could disrupt disulfide bonds, hydrogen bonds and hydrophobic interactions respectively. A frequency sweep test was done to evaluate the dependence of G' to frequency (0.1-100 rad/s) on gels compressed to 80% of its original height.

Confocal Laser Scanning Microscopy (CSLM)

CSLM was used to observe the distribution of inulin within the protein network. A laser scanning confocal microscope Zeiss LSM710 (Carl Zeiss Microscopy, Jena, Germany) was used with a 63× oil immersion objective. Inulin was labeled covalently with FITC. For this, 0.5 g of inulin and 10 mL of DMSO were stirred overnight. Later, 7 mg of FITC were added to the inulin-DMSO mixture. The reaction mixture was protected from the light, heated at 90° C. for 2 hours and dialyzed extensively against distilled water in the dark and freeze-dried. Rhodamine B was used for non-covalent labeling of oat protein. A 15% protein suspension was prepared, and 40 μL of Rhodamine B (5 mg/mL) were added to 1 ml of protein suspension. The mixture was stirred for 2 h at room temperature, dialyzed against distilled water in the dark and freeze-dried. Once protein and inulin were labeled, OPI-inulin suspensions were prepared as described previously in the gel preparation section. Samples were place into a concave microscope glass slide, covered with a lamella, which was sealed with nail polish and heated for 15 min at 40, 60, 80, and 100° C. Once the heat treatment was completed samples were cooled in an ice bath and store in the refrigerator overnight. Measurements at 25° C. referred to unheated sample. The fluorescent images were analyzed simultaneously at wavelengths of 488 nm and 516 nm.

Images were processed with ZEN 2009 LE software (Carl Zeiss AG, Oberkochen, Germany).

Particle Size Measurements

A Zetasizer Nano ZS ZEN1600 system (Malvern Instruments, U.K.) was used to study the evolution of particle size distribution as a function of increasing temperature. For particle size measurements the OPI and OPI-inulin suspensions were heated at 40, 60, 80 and 100° C. for 30 min. Measurements at 25° C. referred to unheated samples. Samples were immediately cooled in an ice bath to room temperature, after completing the heating period. Samples were then diluted to a total concentration of 0.1% (w/v) 134 and passed through a 0.45 μm pore size filter prior to measurement. Number-based particle size distribution was measured to identify the total number of particles of a given size.

Fourier Transform Infrared (FTIR) Spectroscopy

In order to observed changes in protein conformation during heating, the infrared spectra of OPI and OPI-inulin suspensions was recorded using a Nicolet 6700 spectrometer (Thermo Fisher Scientific Inc., MA, USA). OPI and OPI-inulin suspensions (5%, v/w) were dissolved in $D_2O$. To ensure complete H/D exchange, samples were prepared 48 h before infrared measurements. Suspensions were placed in between two CaF2 windows separated by a 25 μM polyethylene terephthalate spacer in a temperature controlled infrared transmission cell. Temperature was regulated by a Peltier controller (Thermo Fisher Scientific Inc., MA, USA). Samples were heated from 20 to 80° C., and every 10° C., the sample was 144 equilibrated and the spectra were automatically recorded. As the Peltier controller was not able to reach 100° C., samples heated at 100° C. were prepared by the KBr-disk method. For this, the gels were prepared as previously described and freeze-dried. The dried gel was crush into powder, vacuum-dried at 40° C. overnight and mixed with KBr powder (1:100 w/w), the mixtures was compressed to 13 mm discs and used for spectroscopy measurements. To study the amide I region of the protein (1700-1600 cm Fourier self-deconvolutions were performed using the software provided with the spectrometer (Omnic 8.1.210 software). Each spectrum was the result of 128 scans; band narrowing was achieved with a full width at half maximum of 20-25 $cm^1$ and with resolution enhancement factor of 2.0-2.5 $cm^{-1}$. During measurements Nitrogen was continuously run through the spectrometer. Band assignment in the amide I region was made based on previous literature reports.

Statistical Analysis

All data were analyzed for significant differences, with minimum significance test set at the 5% level (p<0.05). Tukey's multiple comparison test was used to establish statistical significance using GraphPad Prism 5 (GraphPad Software, La Jolla, Calif., USA). All experiments were performed at least in three independent batches and the results were reported as the mean±standard deviation.

Gel Formation and Textural Profile Analysis

The mechanical properties of the gels including compressive stress, cohesiveness, springiness and gumminess are summarized in Table 1. Compressive stress indicates the capacity of the material to withstand a given deformation. In the case of OPI, the compressive stress values of the gels were the highest at pH 5 and 7 (10.19 and 11.29 kPa), these values dropped at pH 2.5 (1.53 kPa). At pH 5 and 7, oat protein gels show a good balance between electrostatic repulsive forces and hydrophobic attractive forces allows formation of strong gel networks, which could withstand higher compression force applied. Hydrogen and disulfide bonds can also participate in addition to hydrophobic forces in the stabilization of the protein network by balancing the electrostatic repulsive forces. Under acidic conditions, cysteine shows low reactivity, and thus, disulfide bonds are unlikely to take form, explaining why gels prepared at pH 2.5 showed lower compressive stress values. Moreover, it is possible that at pH 2.5 fewer interactions were developed, as attractive forces could not counterbalance the strong electrostatic repulsive forces produced by positively charge amino acid residues.

TABLE 1

Mechanical properties of OPI and OPI-inulin gels prepared at 100° C.

| | pH 2.5 | pH 5 | pH 7 |
|---|---|---|---|
| | Compressive stress (kPa) | | |
| OPI | 1.53 ± 0.27 | 10.19 ± 1.32 | 11.29 ± 3.49 |
| OPI-I | 1.47 ± 0.11 | 9.63 ± 1.03 | 13.93 ± 1.95 |
| OPI-I | 2.07 ± 0.31 | 10.92 ± 2.12 | 14.41 ± 1.39 |
| OPI-I | 2.19 ± 0.38 | 14.16 ± 2.85 | 22.98 ± 1.12 |
| | Cohesiveness | | |
| OPI | 0.41 ± 0.03 | 0.67 ± 0.01 | 0.55 ± 0.04 |
| OPI-I | 0.47 ± 0.06 | 0.63 ± 0.07 | 0.56 ± 0.05 |
| OPI-I | 0.39 ± 0.04 | 0.70 ± 0.02 | 0.55 ± 0.06 |
| OPI-I | 0.26 ± 0.03 | 0.68 ± 0.05 | 0.55 ± 0.08 |
| | Springiness (mm) | | |
| OPI | 130.20 ± 5.37 | 211.13 ± 7.74 | 163.05 ± 15.4 |
| OPI-I | 159.83 ± 21.4 | 193.13 ± 6.14 | 228.21 ± 20.4 |
| OPI-I | 143.73 ± 21.1 | 208.16 ± 4.76 | 220.73 ± 9.85 |
| OPI-I | 197.82 ± 17.6 | 208.88 ± 12.7 | 217.81 ± 17.4 |
| | Gumminess (N) | | |
| OPI | 0.08 ± 0.01 | 0.90 ± 0.09 | 0.73 ± 0.12 |
| OPI-I | 0.09 ± 0.02 | 0.80 ± 0.10 | 0.90 ± 0.14 |
| OPI-I | 0.10 ± 0.02 | 0.94 ± 0.15 | 1.03 ± 0.10 |
| OPI-I | 0.08 ± 0.01 | 1.16 ± 0.13 | 1.68 ± 0.18 |

Values are means ± standard deviation

At pH 7, addition of a small amount of inulin (less than about 5%, preferably in the range of about 0.67%-3.33%, based on dry weight of protein) greatly increased the compressive stress. This effect is especially strong at the highest level of inulin addition as compressive stress values increased from 13.93 kPa to 14.41 kPa and 22.98 kPa (OPI-I 0.1%, OPI-I 0.25% and OPI-I 0.5% respectively). Since inulin is incapable of forming a gel on its own under any of the concentration utilized in this experiment, any improvement on the mechanical properties was the result of a synergistic effect of inulin and OPI. Inulin addition may have produced a more densely cross-linked network, leading to higher compressive stress. At pH 5 the addition of inulin produced a slight increment of the compressive stress values, however this change was not a significant improvement (p<0.05). Gels prepared at pH 5 with and without inulin were prone to syneresis (once the heating step was completed, a water layer on the top of the gel was observed). The compressive stress values reported for gels at pH 5 could be overestimated, since the exudation of water resulted in a higher solid content in the actual gel network. Moreover, water release was observed after the compression cycle was completed for these samples. At pH 2.5, the addition of inulin did not produce a significant improvement (p<0.05) of the compressive stress value either, which ranged from 1.53 to 2.19 kPa. Earlier research reported the effect of pH and temperature over the chemical stability of inulin, showing that heating of inulin under acidic conditions caused intensive hydrolysis, whereas, heating of inulin under neutral or alkaline conditions produced very little change in the content of reducing sugars. Thus the stability of inulin could be lost at acidic pH, explaining why at pH 2.5 the improvement of the compressive stress did not take place. Gels prepared with OPI and OPI-inulin mixtures at pH 7 had higher or comparable compressive stress values to gels obtained with soy protein/gellan gum (~12.5 kPa) and soy protein/loctus bean gum (~20 kPa). The cohesiveness value indicates the integrity of the internal bonds after a compressive force was applied. Cohesiveness values close to 1 indicate little damage to the internal bonds of the structure and thus high resistance to deformation. The highest value (0.67) was obtained at pH 5, followed by that at pH 7 (0.55). The lowest value of cohesiveness (0.41) was recorded at pH 2.5. The addition of inulin did not significantly influence the cohesiveness of the oat protein gels. Springiness relates to how fast the structure can recover from the deforming force. A higher springiness value indicates that the sample can quickly recover from the deformation. Gumminess represents the energy required to disintegrate semisolid food to a ready for swallowing state. The gels prepares at pH 2.5 had the lowest springiness values among all samples, indicating these gels were more affected by the compressive force and took longer to recover. Gels prepared at pH 5 and 7 showed similar springiness values (193-228 mm). Gels prepared at pH 7 had the highest gumminess values, suggesting that these gels require more energy to be disintegrated. Gels prepared at pH 2.5 had the lowest gumminess values and gels prepared at pH 5 were at an intermediate level. The addition of inulin led to significant increase in springiness and gumminess for gels formed at pH 7 ($p<0.05$) and the gumminess value in the presence of 0.5% inulin was 2.3 fold of the value observed for OPI gel alone. Thus, the addition of a small amount of inulin also provides the opportunity to tailor other properties of oat protein gels such as springiness and gumminess to meet different sensory requirements.

Water Holding Capacity (WHC)

Figure 15:
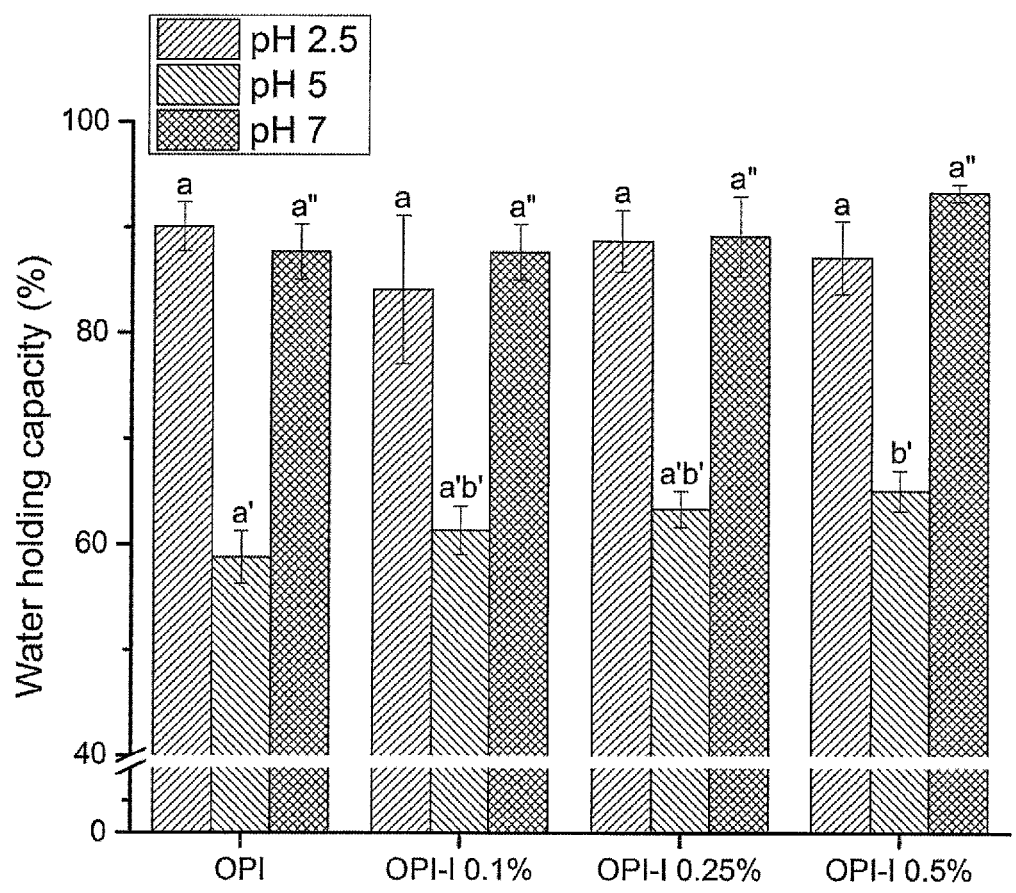
FIG. 15. Water holding capacity of OPI and OPI-inulin gels prepared at 100° C.

WHC is a key property of gels and low values often result in dry products and thus low texture stability. As shown in FIG. 15, WHC values ranging from 85.09 to 93.29% were recorded for all gels except for those prepared at pH 5 with values around 60%. This is in agreement with the syneresis and observation of water released after the compressive tests at pH 5. With increase of inulin, a slight increasing trend was observed for WHC value at pH 5. At pH 2.5 and 7 the addition of inulin did not significantly impact ($p<0.05$) the gel WHC. The OPI and OPI-inulin gels exhibited higher or comparable WHC values to those of soy protein/loctus bean gum (>60%), whey protein/cassava starch (>85%), and egg white protein/konjac glucomannan (90.2%), previously reported. The gels maintain their strength and water-holding capacity after freeze-thaw cycle treatment and microwave heating.

Scanning Electron Microscopy (SEM)

Figures 16A, 16B, 16C:
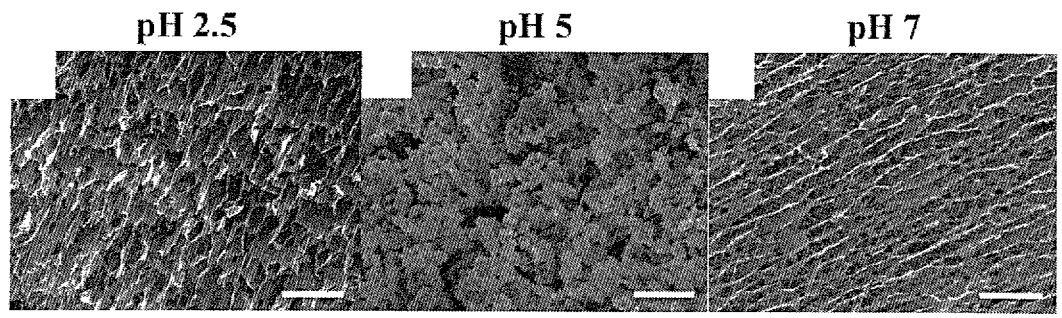
FIGS. 16A to 16I. SEM images of the cross section of gels prepared with OPI (FIGS. 16A to 16C), OPI-I 0.1% (FIGS. 16D to 16F) and OPI-I 0.5% (FIGS. 16G to 16I) at different pH. Scale bar represents 20 μm.
Figures 16D, 16E, 16F:
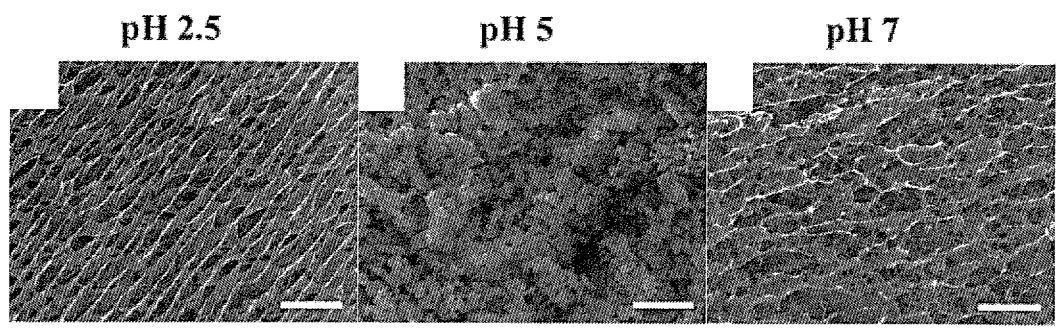
Figures 16G, 16H, 16I:
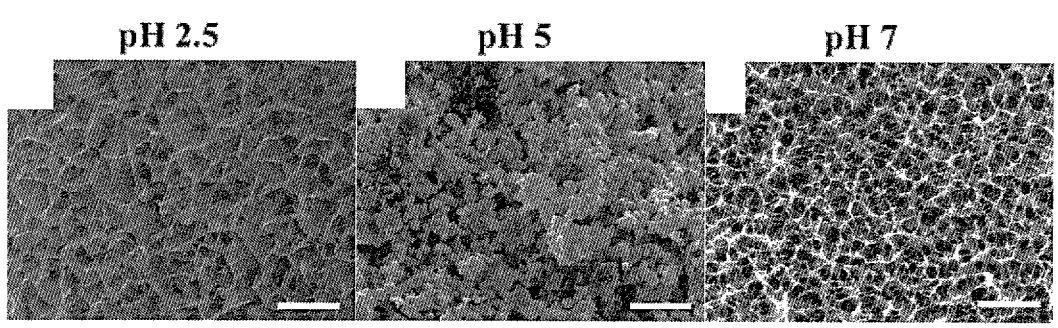
Figures 17A, 17B, 17C:
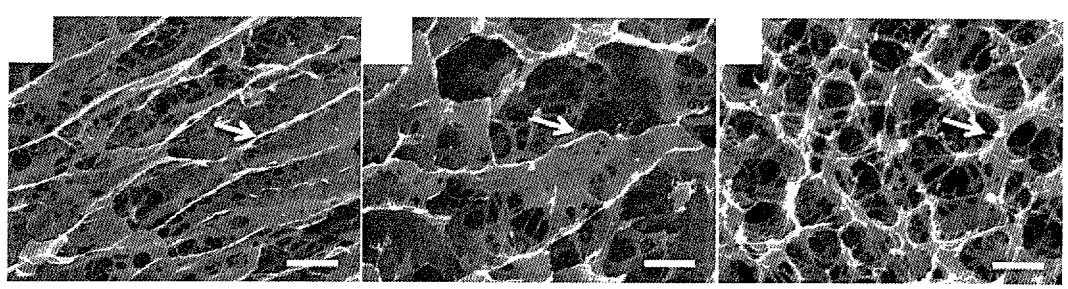
FIGS. 17A to 17C. SEM image of the cross section of gels prepared with OPI (FIG. 17A), OPI-I 0.1% (FIG. 17B) and OPI-I 0.5% (FIG. 17C) at pH 7. Scale bar represents 5 μm. Arrows indicate cell walls.

A clear distinction has been established in the morphology of particulate or fine-stranded gels, as protein gels are expected to form one of these structures depending on the pH and ionic strength of the medium. At pH 5 (FIGS. 16B, 16E, 16H) bundles of large spheroid aggregates are randomly distributed along the network forming a characteristic particulate gel. The characteristic morphology of this type of gels is related to the restricted intermolecular repulsion that protein molecules exhibit when the pH is near the isoelectric point. Thus, the low net charge of the protein produced minimal repulsion and protein molecules unsystematically aggregate to favor the development of protein-protein interactions, whereas protein-water interactions are limited which results into a gel network with low WHC due to increased pore size and decreased capillary forces, and consequently a higher water loss. In contrast, fine-stranded gels are generally stronger and have higher water holding capacity, as these gels are formed at pHs far from the isoelectric point of the protein. However, SEM micrographs of oat protein gels (FIGS. 16A, 16D, 16G; and FIGS. 16C, 16F, 16I) show a unique structure at pH 2.5 and 7, similar to that formed by gelatin. At pH 2.5, protein aggregates array in such fashion that hollow cells are formed between thin vertical walls. These cells are almost tubular in shape. The cell walls at this pH (FIG. 17A) seem to be thin and flaky and the presence of inulin does not apparently alter the structure. At pH 7, a similar structure to that formed at pH 2.5 was produced, except that in this case cell walls seem thicker, smoother and highly interconnected. Such thicker walls were probably developed by stronger interactions that resulted in a reinforced structure. The addition of inulin at pH 7 led to thicker walls and increased junction zones, as the gel formed with 0.5% inulin showed a highly cross-linked network (FIG. 17C.). This could explain the greatly improved mechanical strength and gumminess for the gel OPI-I 0.5%. The polymer-like network structure maintained after freeze-thaw cycle treatment and microwave heating.

This unique gel structure may have specific gelling applications in a variety of foods. Accordingly, the molecular mechanism by which oat protein forms such structures is of interest, as well as knowledge about how small amounts of inulin could greatly improve the gel properties especially at neutral pH, an environmental condition highly convenient for food applications. Further investigations into the gels with experiments using rheological measurements, Fourier transformed infrared spectroscopy and laser light scattering to study the molecular events taking place during the gel formation process itself.

Rheological Measurements

Figure 18A:
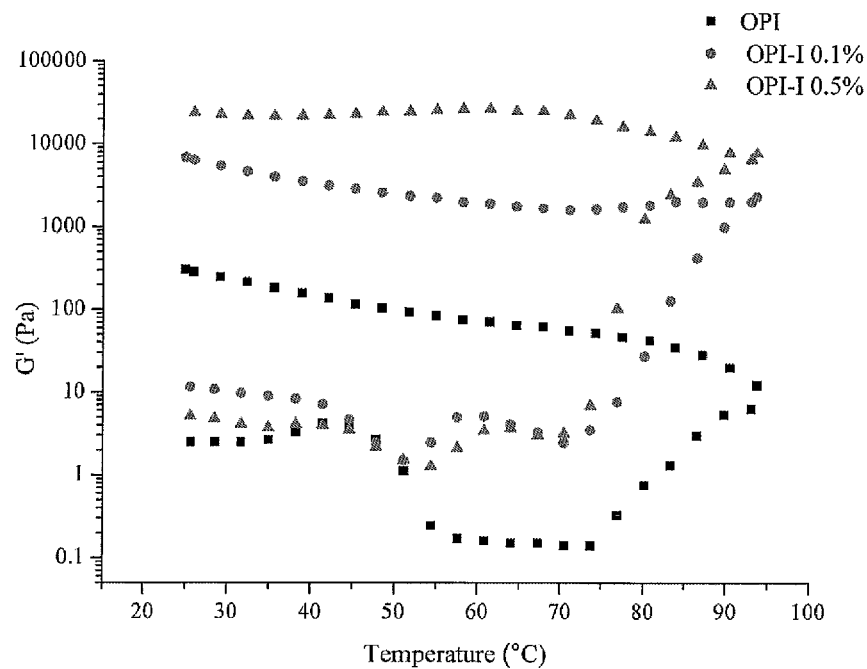
FIGS. 18A to 18C. Storage modulus (G') of OPI and OPI-inulin mixtures (0.1 and 0.5%), during heat-induced gelation.
Figure 18B:
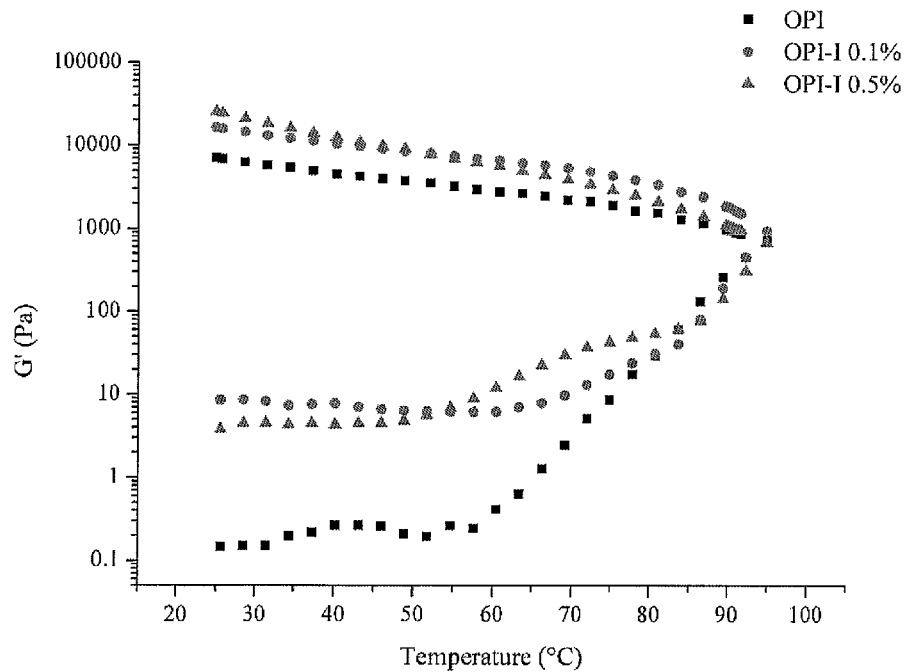
Figure 18C:
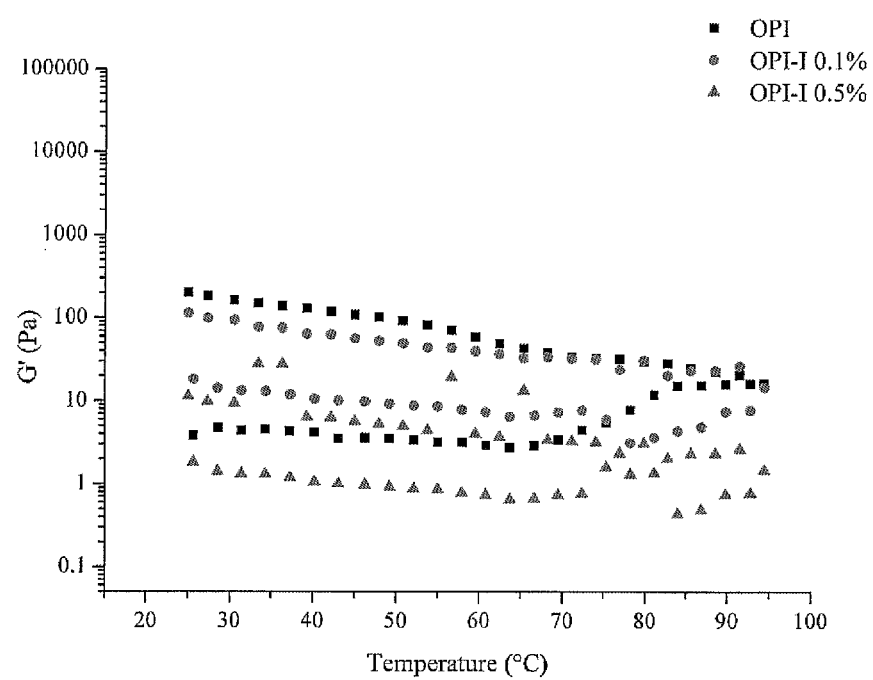

In order to further investigate the development of the gel network as a function of heating, a temperature ramp was run for OPI (15% protein) and OPI-inulin suspensions with addition of 0.1 and 0.5% inulin. Both G' and G" were examined upon heating and cooling, however only G' values are shown as G" always showed lower values than G', even as a solution. This means that the elastic behavior dominated at all stages of the network development. A similar phenomenon has been observed on egg white, which showed gel-like properties (G'>G") over the entire temperature range probed and even at low temperature the native protein already forms a weak network that can propagate stress. At pH 7 (FIG. 18A) the G' value for OPI was initially stable then decreased at around 50° C. and a plateau was formed until the temperature reached ~75° C. This decrement could be attributed to weakened hydrogen bonding, since heat disrupts hydrogen bonds and electrostatic interactions but enhances hydrophobic interaction and accelerates molecular motion. From ~75° C. onward, G' increased with increasing temperature and then further increased during the cooling stage, reaching a maximum of 304.57 Pa. In the case of OPI-I 0.1% and OPI-I 0.5% the G' value increased abruptly at ~70° C. until the maximum temperature was reached. During the cooling stage G' further increased to reach a maximum value of 6,823.96 Pa and 24,758.65 Pa for OPI-I 0.1% and OPI-I 0.5%, respectively. The sharp increase of G' from ~70 to 95° C. indicates that the formation of a rigid gel network occurred, as heat prompts protein unfolding, exposing reactive groups of the molecule that enable the molecular interactions such as hydrophobic forces and disulfide bonds to reinforce the gel network. It is clear that part of the development of the gel network also took place during the cooling stage. The addition of inulin also produced two phases in the development of the gel network. According to previous reports, the first stage (~50° C.) could be related to the development of an inulin network by entanglement of molecules through hydrogen bonds and van der Waals forces. The second stage (~70° C.) could be related to the development of the protein network. Apparently the development of the gel network started at a lower temperature for samples containing inulin (~70° C.) compared to OPI gels (~75° C.). A sharper increase of G' can also be observed in the case of OPI-inulin mixtures and the more inulin the higher the G' value, confirming that inulin had a synergistic effect on the development of the gel network.

At pH 2.5 OPI showed (FIG. 19B) a low G' value (0.15 Pa) at 25° C., but increased to 8.55 Pa and 3.80 Pa after addition of 0.1% and 0.5% inulin, respectively. A decrease in G' value was also observed for OPI at 45-60° C., but was less evident and prolonged as at pH 7. Possibly less hydrogen bonds were present in oat protein at pH 2.5 due to partial protein unfolding and/or dissociation caused by the acidic environment. A sharp increase of G' was observed at around 60° C. until the maximum temperature was reached. The two-phase network development was also observed at pH 2.5 in OPI-inulin mixtures, but not, as well defined as at pH 7. In the case of OPI-I 0.1%, G' increased sharply from 60° C. to ~85° C. then G' increased once again until the end of the heating stage. For OPI-I 0.5%, the first enlargement of G' occurred at a slightly lower temperature (~55° C.), then a sharper increment was observed at ~85° C. up to the maximum temperature. Additional enlargement of G' values was observed during the cooling stage for all samples. As discussed earlier, at this acidic pH the stability of inulin is low, in addition heat treatment could further break down inulin into shorter inulin chains at such pH. The strengthening effect of inulin was limited compared to the effect produced at pH 7. Nonetheless addition of inulin produced gels with higher G' values. The final G' value for OPI was 7,113.13 Pa, whereas the values for OPI-I 0.1% and OPI-I 0.5% were 16,422.62 Pa and 25,350.60 Pa, respectively. At pH 5 (FIG. 19C) the initial G' value was 3.79 Pa for OPI but increased to 18.12 Pa for OPI-I 0.1% and 10.95 Pa for OPI-I 0.5%. A slight increase in G' was observed during the heating and cooling stages. The inclusion of inulin did not produce a significant improvement in the final G' values which were 200.57 Pa, 113.13 Pa, 294 and 156.85 Pa for OPI, OPI-I 0.1% and OPI-I 0.5%, respectively. These values were much lower than the corresponding values of gels prepared at pH 2.5 and 7. Considering the low G' value observed for gels formed at pH 5 it was confirmed that the high compressive stress values reported for gels at pH 5 were overestimated since the exudation of water produced a higher solid content in the actual gel network.

Figure 19A:
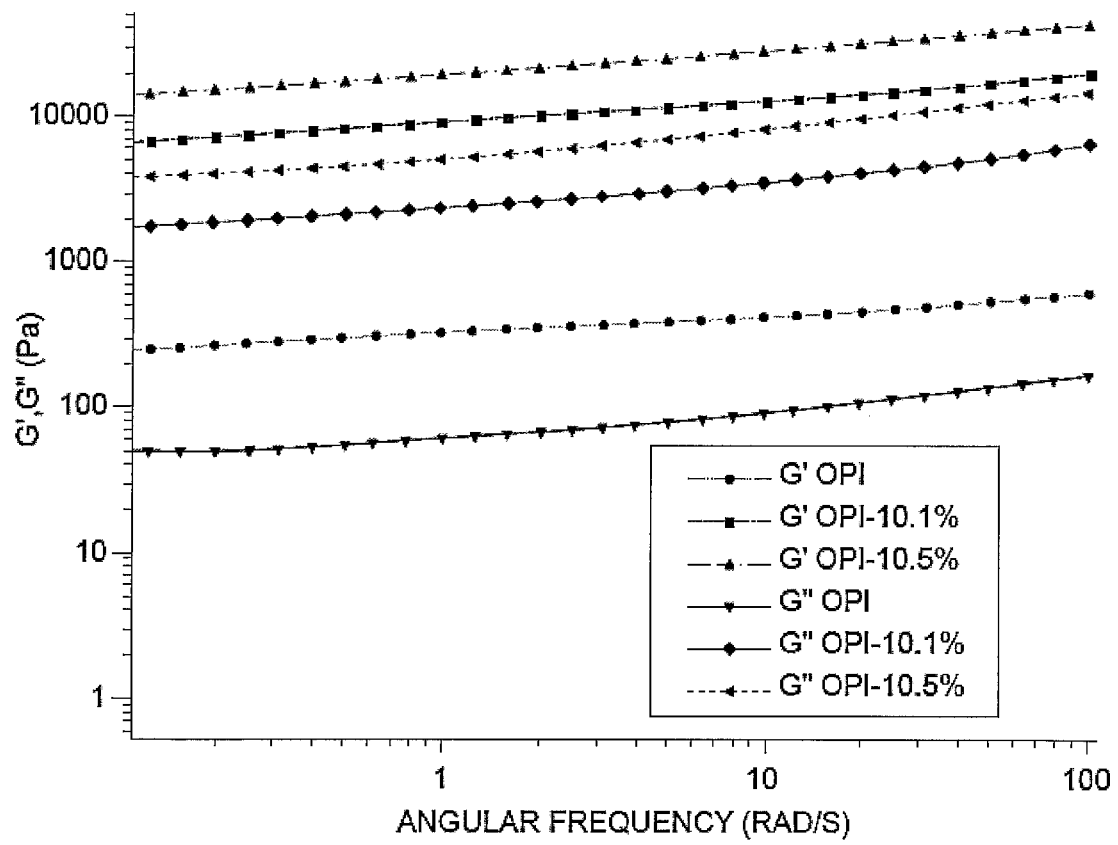
FIGS. 19A to 19C. Storage modulus (G') and loss modulus (G") of OPI and OPI-inulin mixtures (0.1 and 0.5%) as a function of angular frequency after heating and cooling cycle.
Figure 19B:
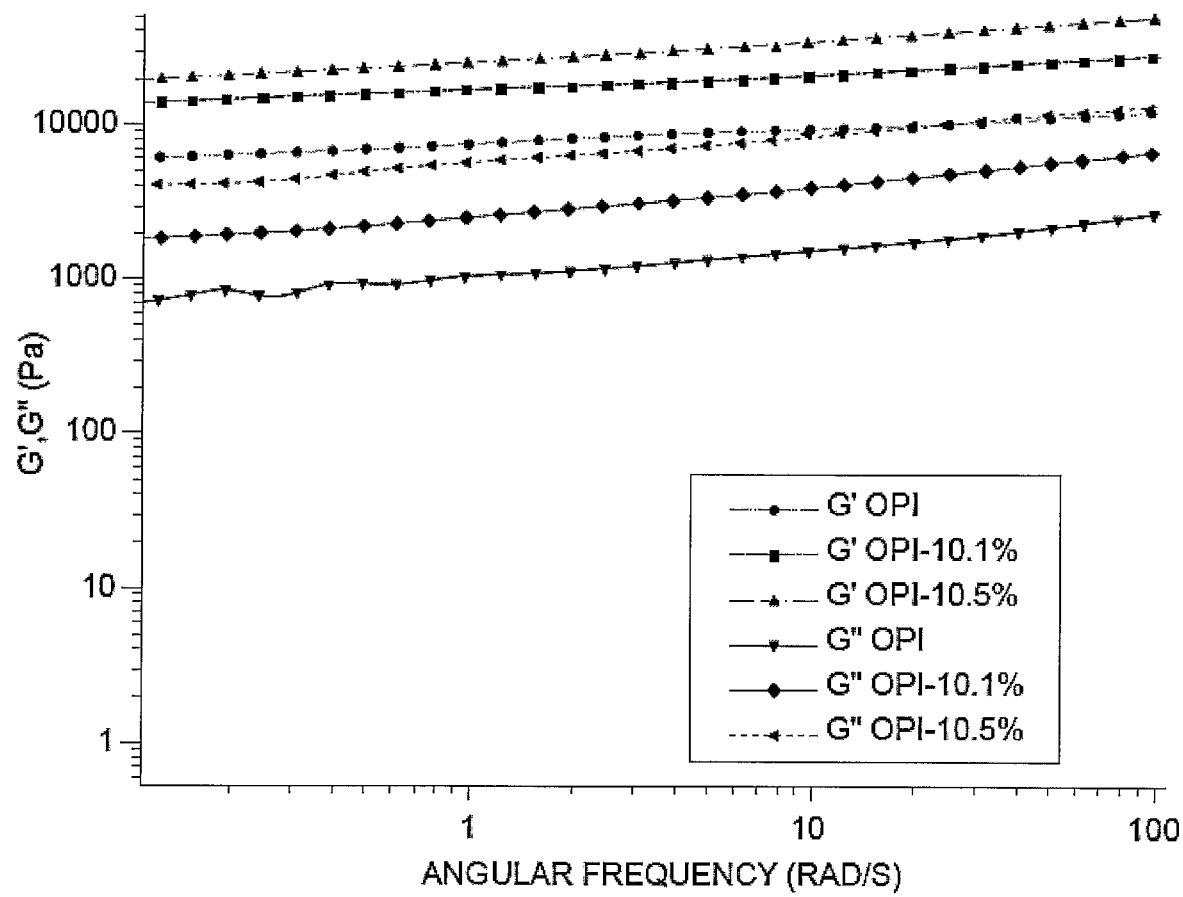
Figure 19C:
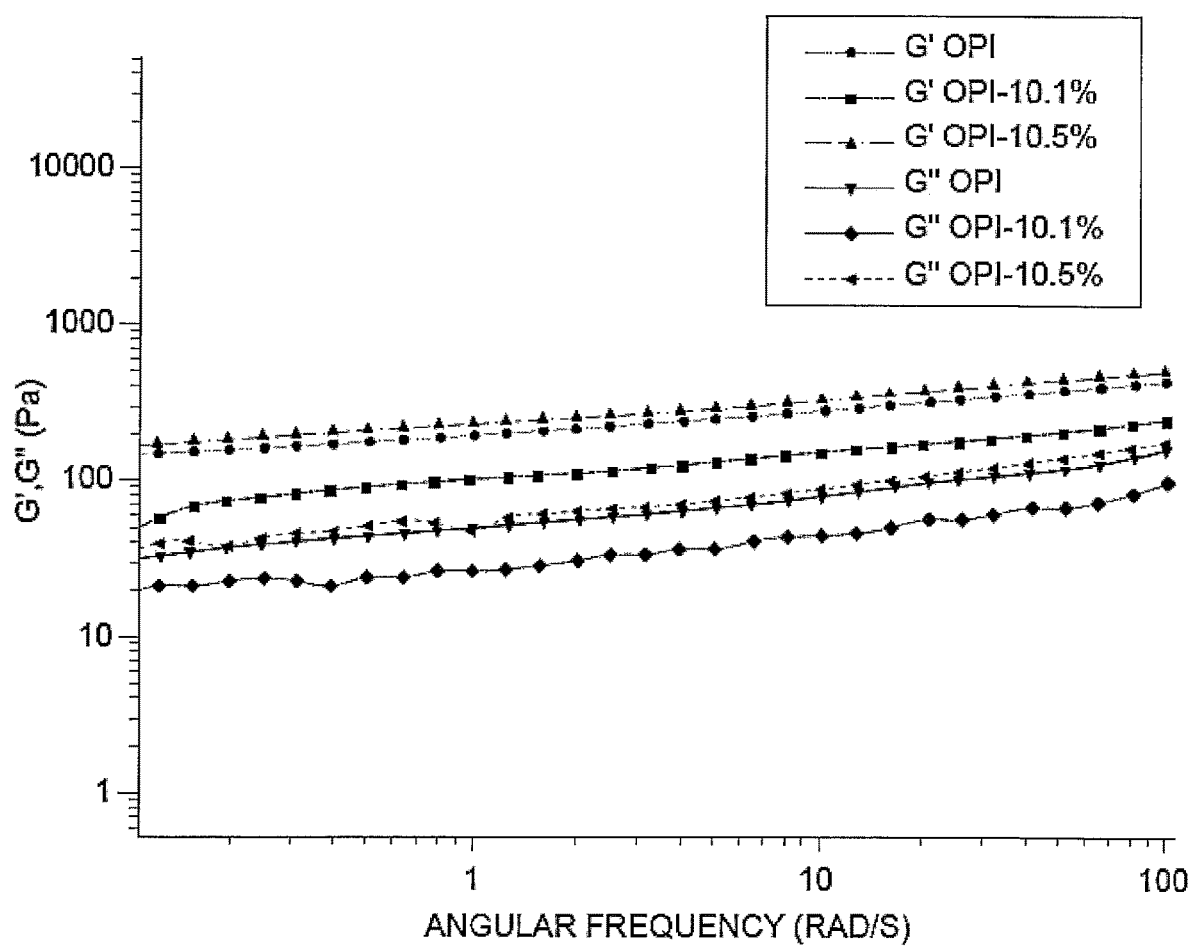
Figure 20A:
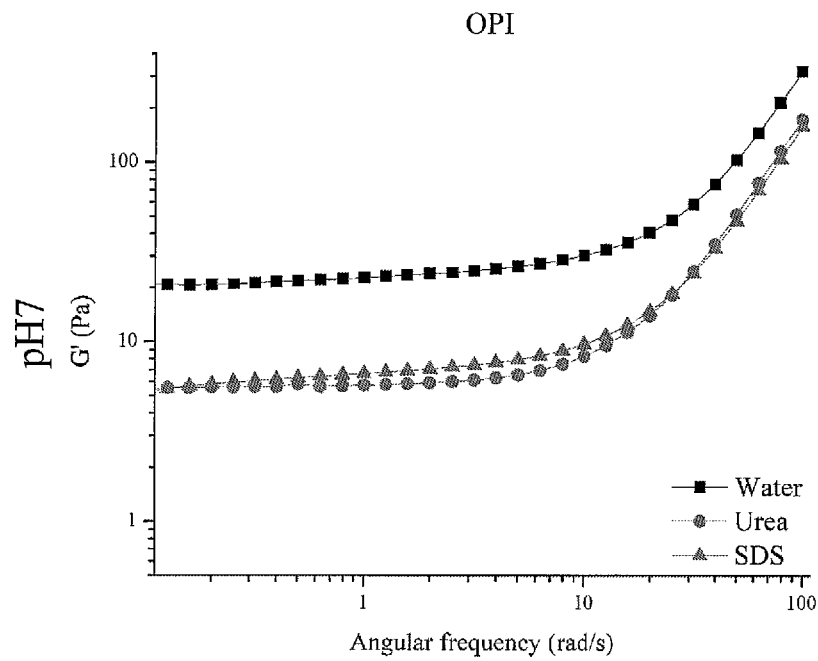
FIGS. 20A-20D. Storage modulus (G') of OPI at pH 7 (FIG. 20A) and pH 5 (FIG. 20B) as a function of angular frequency. Storage modulus (G') of OPI—0.5%) at pH 7 (FIG. 20C) and pH 5 (FIG. 20D).
Figure 20B:
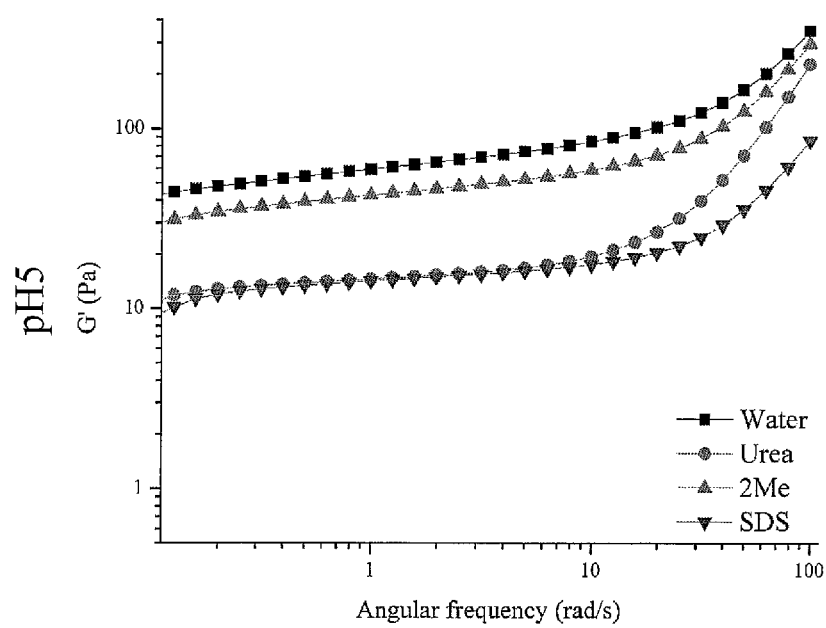
Figure 20C:
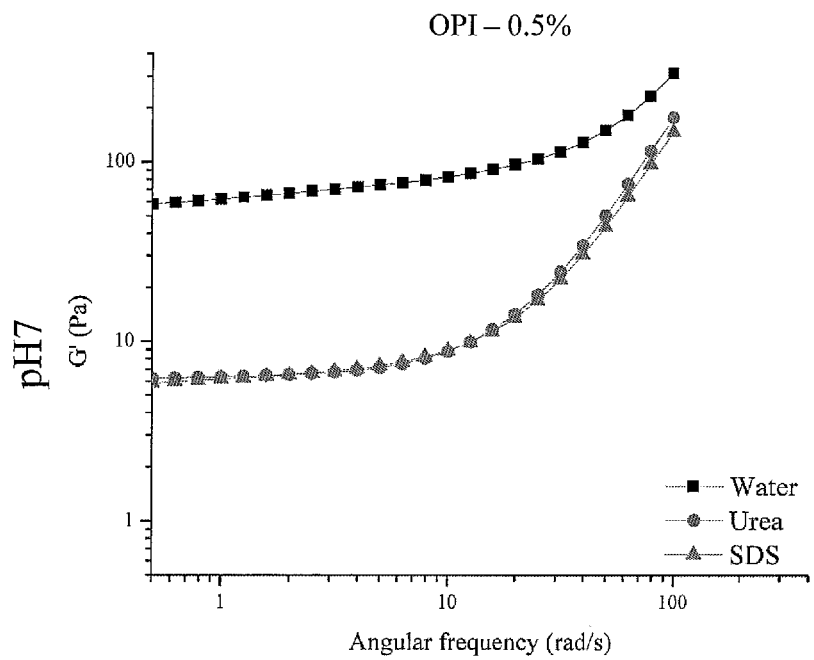
Figure 20D:
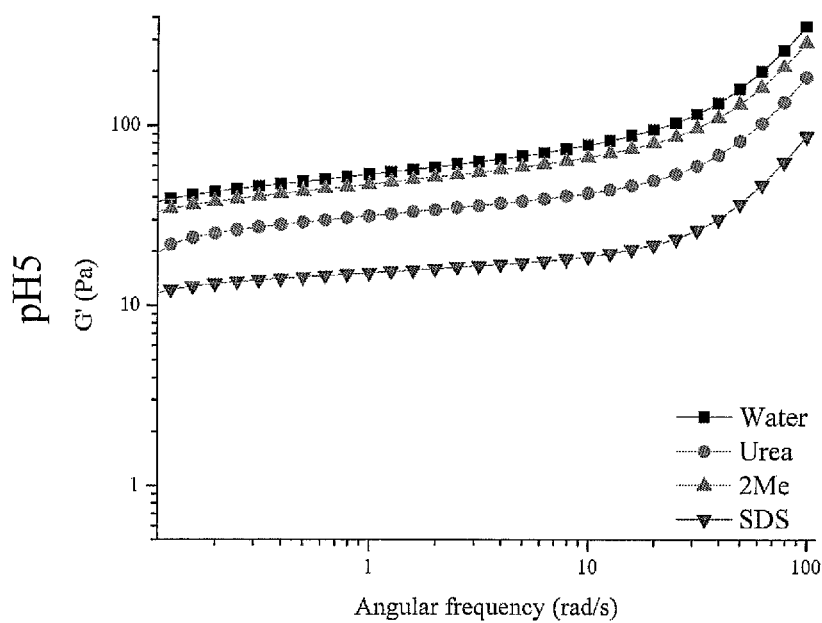

In order to determine the type of interactions involved in the development the gel network, a frequency sweep test was conducted on gels treated with different dissociating reagents including urea to interrupt hydrogen bonding, 2-ME to dissociate disulfide bonds and SDS to destroy hydrophobic interactions. The frequency sweep test on gels prepared at pH 2.5 was not performed as these gels swelled severely, then ruptured in the presence of dissociating reagents, which did not permit an appropriate measurement. This observation also confirms that the strength of the interactions formed at pH 2.5 were inferior in comparison to those present in gels formed at pH 5 and 7. FIGS. 19A to 19C shows the response of G' to the variations in frequency of OPI and OPI-I 0.5% gels. At pH 7, OPI gels were strongly affected by 2-ME as the integrity of the gels was lost, which did not allow the appropriate measurement of the G' response to frequency. This indicates that disulfide bonds performed an essential role for development of the gel network. Gels in contact with urea and SDS, showed very similar response and in both cases G' values were reduced significantly, suggesting that hydrogen bonds and hydrophobic interactions also contribute to the development of the three-dimensional network structure. In the case of OPI-I 0.5%, gels were affected by 2-ME in the same way as the gels prepared with OPI. Thus, disulfide bonds also play an important role in the gel network formation. In presence of urea and SDS the gel structure was affected to a greater extent as a significant drop of the G' value was observed. This indicates that addition of inulin may strengthen hydrogen bonding and hydrophobic interactions to further improve the gel network structure and mechanical properties. In the case of OPI at pH 5 there was not a significant contribution of disulfide bonds since the frequency response of the gel submerged in 2-ME showed very similar trend compared to the control sample. On the other hand, samples submerged in urea and SDS had lower G' values. This suggests that hydrogen bonds and hydrophobic interactions played important roles in the maintenance of the gel structure at pH 5. OPI-I 0.5% at pH 5 showed a similar outcome. Disulfide bonds had very little contribution to the development of the protein network. The gel submerged in SDS had a comparable response to the gel prepared with OPI alone. But the gel submerged in urea was apparently less affected as the G' value reduced to a lower extent. Therefore, both hydrogen bonds and hydrophobic interactions are the ruling forces in the establishment of the OPI-inulin gel structure at pH 5, whereas disulfide bonds are not developed probably due to the compact structure of the protein near its isoelectric point, where the sulfur hydroxyl groups are hidden inside the protein structure.

Confocal Laser Scanning Microscopy (CSLM)

Figures 21A, 21B, 21C, 21D, 21E:
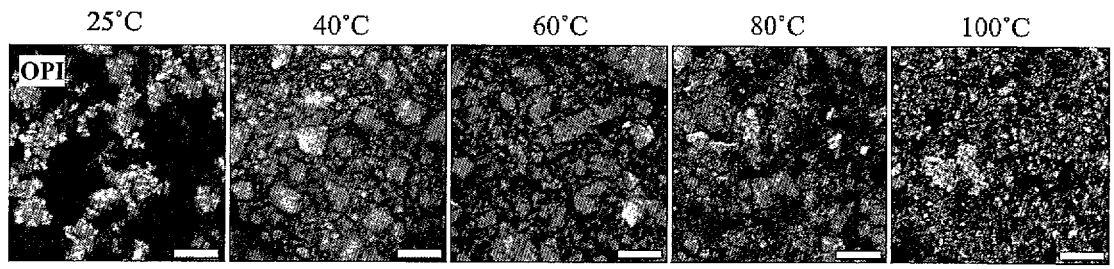
FIGS. 21A to 21O. Confocal microscopic photographs of OPI (FIGS. 21A to 21E) and OPI-inulin (0.1%) (FIGS. 21F to 21J) and OPI-insulin (0.5%) (FIGS. 21K to 21O), at pH 7 as a function of temperature. Scale bar represents 10 μm.
Figures 21F, 21G, 21H, 21I, 21J:
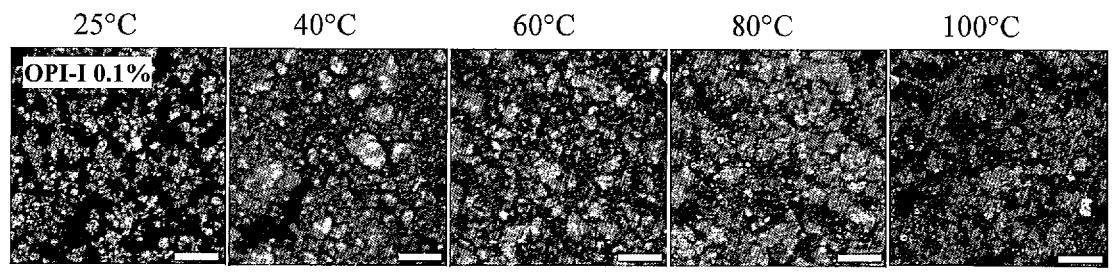
Figures 21K, 21L, 21M, 21N, 21O:
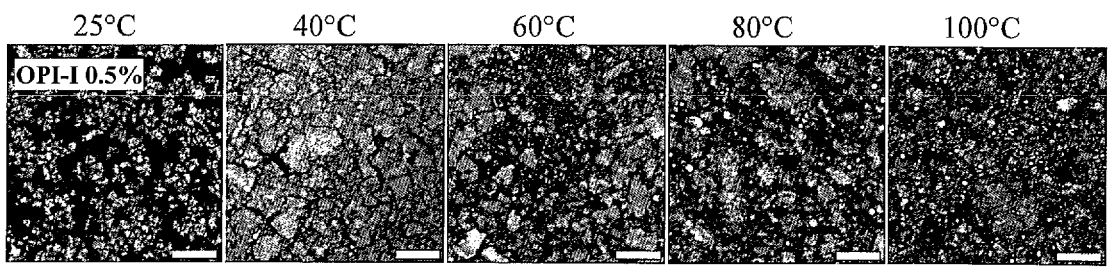
Figures 22A, 22B, 22C, 22D, 22E:
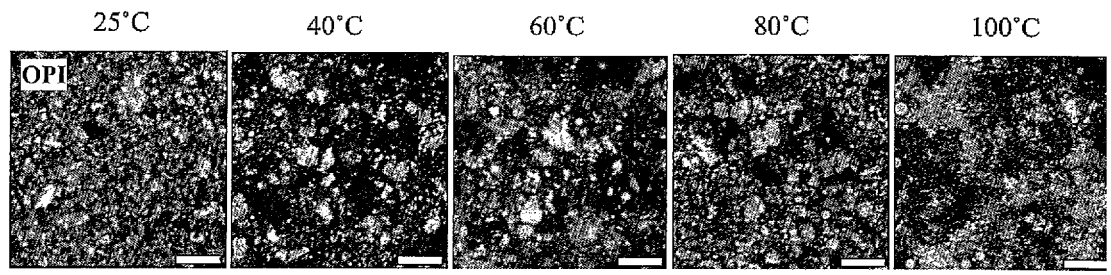
FIGS. 22A to 22O. Confocal microscopic photographs of OPI (FIGS. 22A to 22E) and OPI-inulin (0.1%) (FIGS. 22F to 22J) and OPI-insulin (0.5%) (FIGS. 22K to 22O), at pH 2.5 as a function of temperature. Scale bar represents 10 μm.
Figures 22F, 22G, 22H, 22I, 22J:
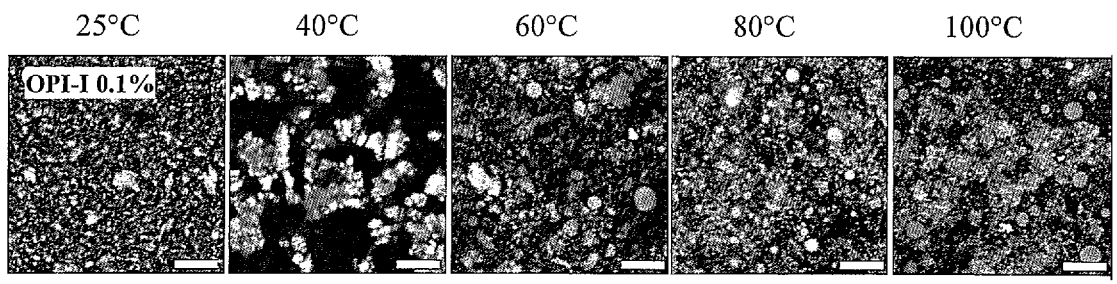
Figures 22K, 22L, 22M, 22N, 22O:
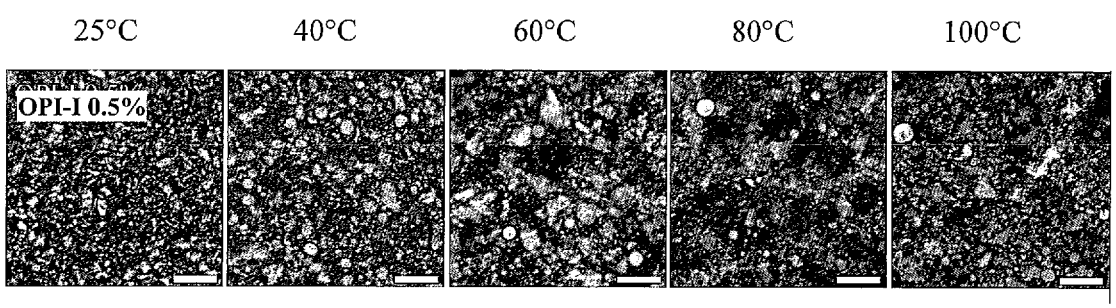

The microstructure of OPI and OPI-inulin gels was also observed with CSLM. Red color in the micrographs correspond to rhodamine-B labeled protein, whereas, bright green regions indicate FITC labeled inulin. Thus the distribution of oat protein and inulin in the gel system could be observed. Under the conditions tested in this work, only protein could form a gel, as the amount of inulin included in the system was under its minimum concentration required for gel formation, which has been reported to be 10% homogeneous, conceivably due to the low concentration of inulin compared to the protein concentration, thus at this protein/polysaccharide ratio the rate of de-mixing could be very low. As temperature increased the protein aggregates grew gradually, and around 60° C. phase separation began. This suggests increased thermodynamic incompatibility of the components probably due to the excluded volume effect when the protein started to unfold or change conformation at an elevated temperature temperature onward it was possible to see two phases, in which the protein network formed a continuous phase comprised of solid inulin particles ranging in size from several hundreds nanometers to ~1 µm distributed within the network. In the case of OPI-I 0.5%, early signs of phase separation were noted at 40° C. since a small green dot was observed among the expanded protein aggregates. The development of the protein network in OPI suspensions was similar to that of OPI-inulin mixtures, indicating that inulin did not interfere with the development of the protein network; nonetheless it did reinforce the structure. At pH 2.5 (FIGS. 21A to 21O), less inulin particles were observed through the heating stage as well as at the final gel. Inulin has poor stability under acidic conditions and high temperature, which causes it to break down into shorter inulin chains or reducing sugars. Only a few reinforcement sections or junction zones were formed, explaining the limited improvement observed in the reported compressive stress values. Perhaps the inulin rich sections observed were formed by some inulin chains that were more resistant to the acidic conditions. In the case of the gels prepared at pH 5, larger aggregates with larger void spaces were formed (FIGS. 22A to 22O). At this pH, no phase separation was seen, not even with increasing temperature. In this case the net charge of the protein was close to zero, therefore both protein and polysaccharide might form a compatible system and no phase-separation was produced. Apparently, a main protein network was formed and inulin was covered inside the protein structure. Guggisberg et al. (2009) evaluated the effect of inulin addition as a fat replacer in yogurt and their CLSM images suggested that an inulin system could be built in the protein network, since inulin was not visible by CSLM. The larger void spaces indicates large pores, which led to the release of water from the network, a phenomenon consistent with the low water holding capacity of the gels prepared at this pH.

Gels prepared at pH 7 showed promising application potential due to their excellent mechanical strength and very unique structure. Samples prepared at this pH were selected to further investigate the effect of inulin addition in the gel formation mechanism.

Size Distribution Measurement

Figures 23A, 23B, 23C, 23D, 23E:
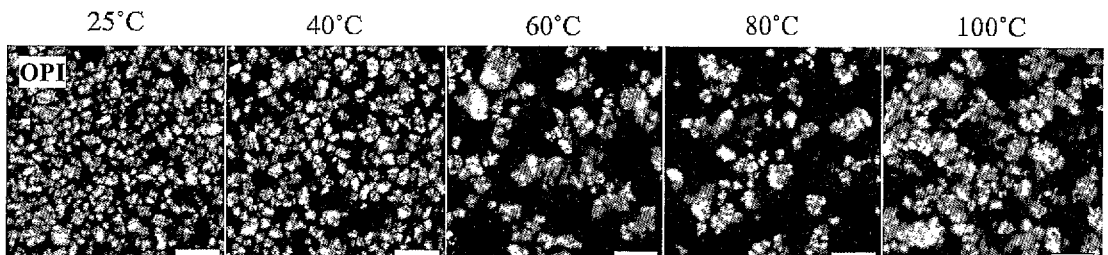
FIGS. 23A to 23O. Confocal microscopic photographs of OPI (FIGS. 23A to 23E) and OPI-inulin (0.1%) (FIGS. 23F to 23J) and OPI-insulin (0.5%) (FIGS. 23K to 23O), at pH 5 as a function of temperature. Scale bar represents 10 μm.
Figures 23F, 23G, 23H, 23I, 23J:
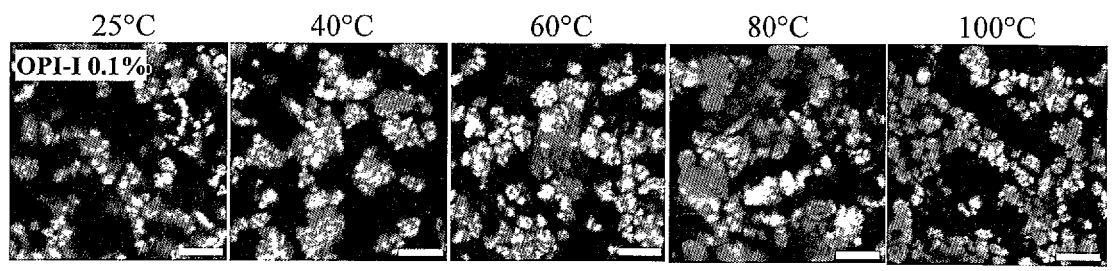
Figures 23K, 23L, 23M, 23N, 23O:
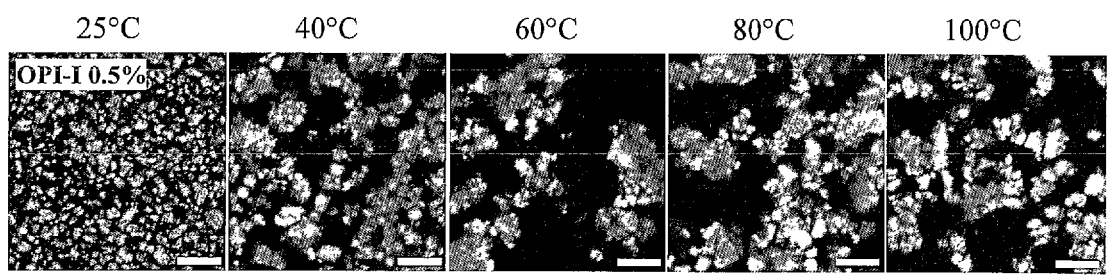

The changes in the size distribution of protein molecules were studied as a function of heating temperature. As shown in FIGS. 23A to 23O, progressive reduction of the mean particle size occurred during heating with the same trend for all samples, regardless of the inulin level added. The main peak of the native protein gradually shifted towards a lower particle size with increasing temperature. At 100° C. the peak value (diameter) detected for OPI gels was 10.1 nm, and 8.72 nm and 11.7 nm for OPI-I 0.1% and 369 OPI-I 0.5% respectively. According to previous literature, a diameter value of 11.8 nm was estimated for oat globulin monomers with an extended conformation. Thus the recorded peak values in the current study suggest dissociation of oat protein hexamers down to monomers. The thermal aggregation of oat globulin has been previously studied and the changes produced by heat have been described globulin hexamers dissociating first into trimmers and then into monomers that are highly reactive. These then rapidly associate to larger and more stable molecules. It is hypothesized that the monomers formed after the heating treatment serve as building blocks in the establishment of the three-dimensional network.

Fourier Transform Infrared (FTIR) Spectroscopy

Figure 24A:
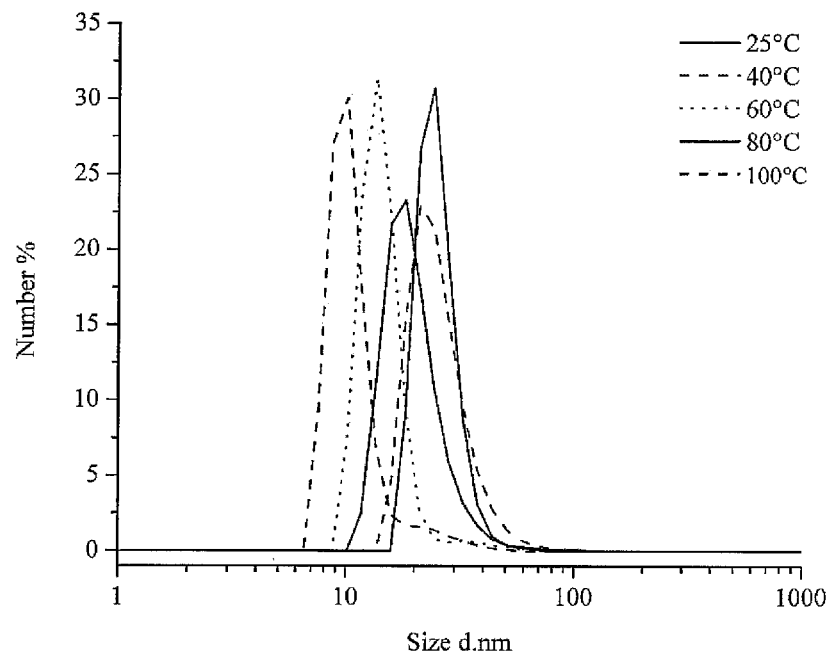
FIGS. 24A to 24C. Number based particle size distribution of (FIG. 24A) OPI, (FIG. 24B) OPI-I 0.1% and (FIG. 24C) OPI-I 0.5% as a function of heating temperature at pH7.
Figure 24B:
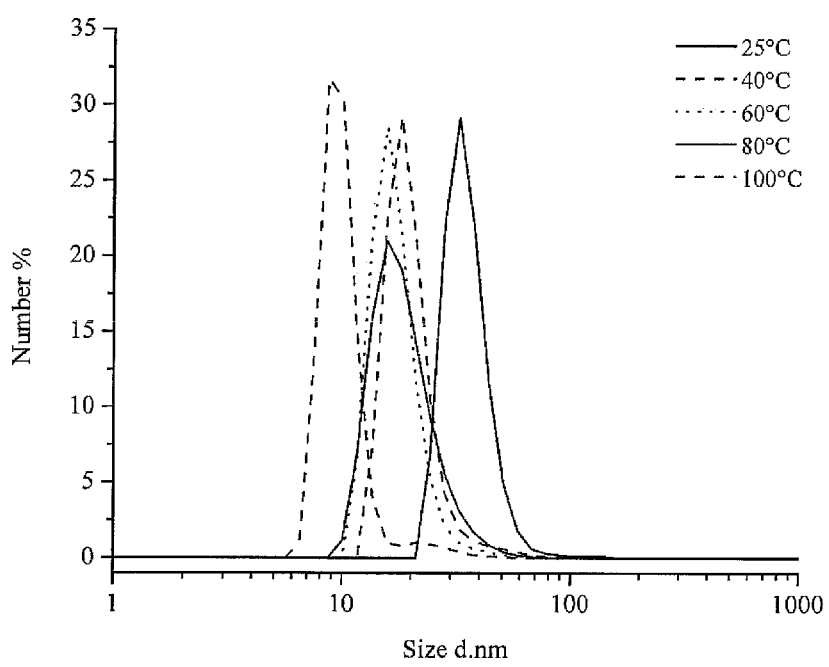
Figure 24C:
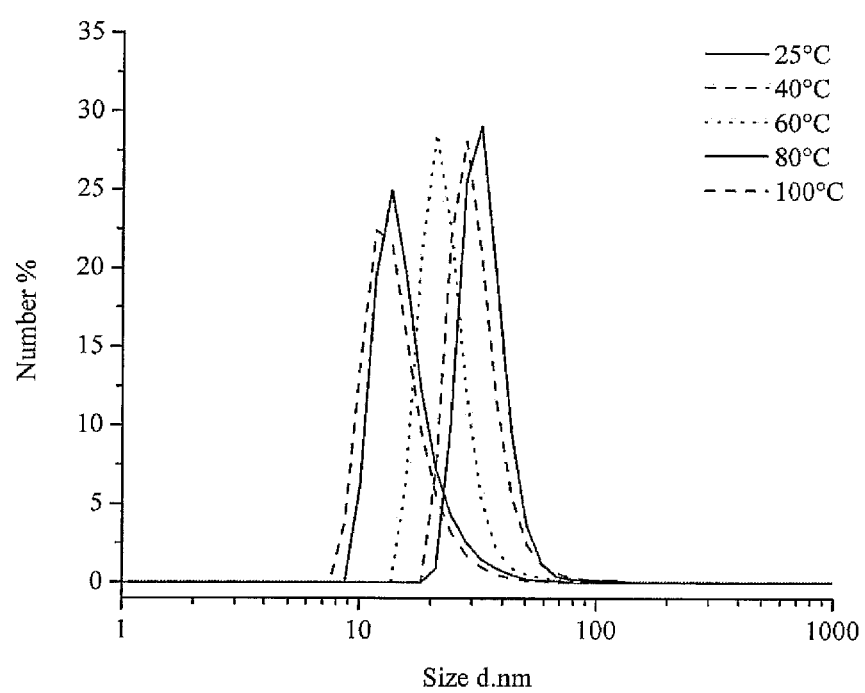
Figure 25A:
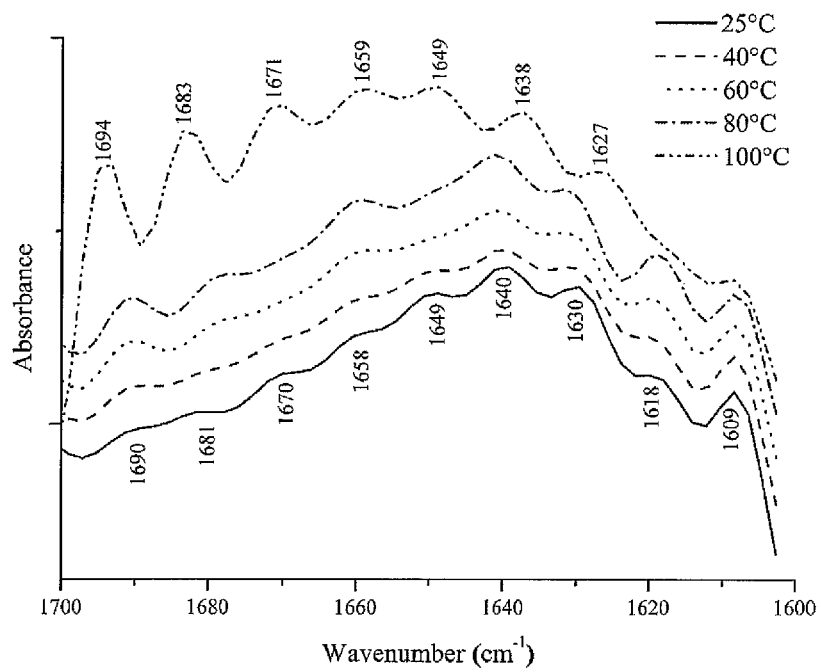
FIGS. 25A to 25C. Deconvoluted spectra of OPI (FIG. 25A), OPI-inulin mixture (0.1%) (FIG. 25B) and OPI-insulin mixture (0.5%) (FIG. 25C), at pH 7, as a function of temperature.
Figure 25B:
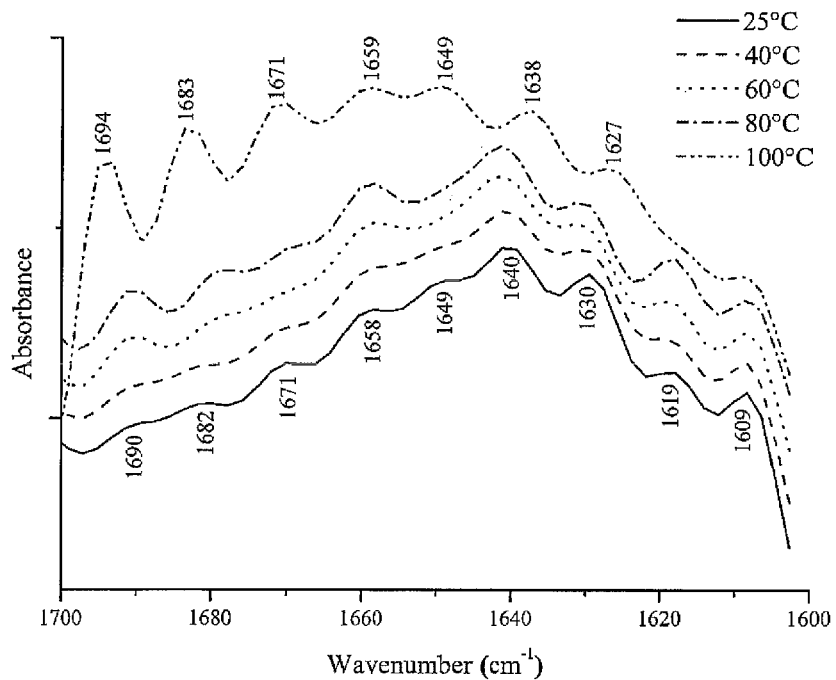
Figure 25C:
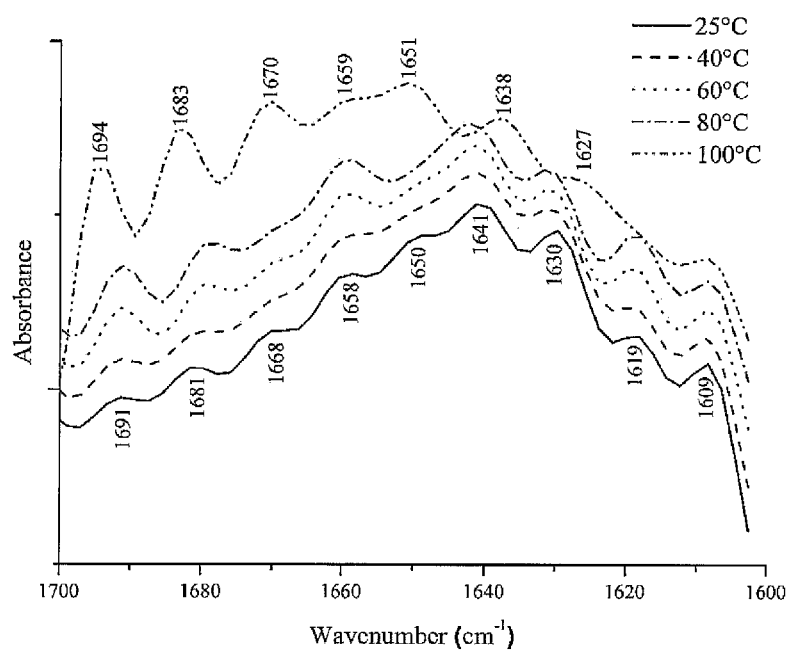

A FTIR study was performed to study how changes in the protein conformation are influenced by the heating process and the presence of inulin. Amide I (1700-1600 $cm^{-1}$) band components were assigned to protein secondary structure according to previous reports in literature. FIGS. 24A to 24C show the de-convoluted spectra of OPI and OPI-inulin mixtures (0.1 and 0.5%) at different temperatures when pD was set at 7, including the gel sample prepared at 100° C. In the case of OPI, the amide I band at 25° C. showed five clear components with strong absorption, including β-turn (1670 and 1658 $cm^{-1}$), α-helix (1649 $cm^{-1}$), random coil (1640 $cm^{-1}$), β-sheet (1630 $cm^{-1}$) and vibration of amino acid residues (1609 $cm^{-1}$). This is in agreement with a previous report that indicated the α-helix and random coils are the major secondary structures in oat globulin, followed by β-sheet and β-turn. A small peak was also observed at 1618 $cm^1$ which was assigned to intermolecular β-sheet and is believed to be related to protein aggregation via the exposed reactive groups. As temperature increased from 25 to 80° C., no major changes in the secondary structure were detected; this could be related to the high heat stability of oat protein with a denaturation temperature of 112.4° C. as revealed by differential scanning calorimetry in our previous work. The absorption at 1690 (β-sheet), 1660 (turns) and 1619 $cm^{-1}$ (intermolecular β-sheet) increased gradually with temperature, suggesting more aggregates were formed probably due to some exposure of the reactive sites. The amide I band was significantly altered when the OPI was heated to 100° C. In order to test whether the aggregation caused by the dry process impacted the protein secondary structure, the dried gel powder formed at temperatures below 100° C. were tested. The results indicated that the dried gels formed at these conditions had similar peaks with the heated suspensions. Thus the protein secondary changes can be attributed to heating at 100° C. The absorption at 1619 cm-1 vanished, whereas a peak appeared at 1627 $cm^{-1}$. A similar transition (from 1623 to 1630 $cm^{-1}$) has been related to the dissociation of the dimeric form of β-lactoglobulin into monomers. This transition agrees with previous particle size results in which a progressive reduction of the mean particle size was observed as function of temperature, implying the dissociation of oligomers down to the monomeric form. Increased absorption intensity was observed at 1694, 1683, 1671 and 1659 cm-1 and two peaks appeared at 1649 and 1638 cm-1 Such changes suggest partial protein unfolding during heating at 100° C. followed by re-organization of protein secondary structure during gel formation process. Heating of OPI-I 0.1% and 0.5% from 80 to 100° C. showed similar elements in the final spectrum at 100° C. as well as the transition related to the oligomer-monomer dissociation. In all cases, shifts in wavenumber compared to the sample at 25° C. were observed, implying reorganization of the polypeptide chain within the protein. This indicates that addition of inulin did not significantly interfere or alter the protein network construction. The FTIR images show very similar heat associated transition at the secondary structural level of the protein.

Proposed Formation Mechanism of OPI-Inulin Gels at Neutral pH

Based on fractal theory, protein particles form a fractal structure, ultimately leading to a gel network built of fractal clusters. Three factors have been found relevant to the type of structure formed: 1) the effective size of the building block of the fractal structure, 2) the amount of protein incorporated in the fractal clusters at the moment of the gel is formed, and 3) the way in which the fractal clusters are linked together. For globular proteins in general such as whey and soy protein the formation of heat-induced globular protein gels, involves unfolding of the protein molecules by heating, leading to the exposure of active amino acid residues. This is then followed by protein aggregation and dissociation of these aggregates to form either filament or particulate gels depending on pH and ionic strength. The unique structure formed by oat protein gels at neutral pH may be associated with monomers as the predominant basic building blocks of the gel network. These smaller units are highly reactive, which would allow the development of the protein gel network at a near molecular level, resulting in development of strong interaction in oat protein gels with high mechanical strength. The formation of fibril network structures of oat protein gels can be described in two stages; in the first stage or nucleation phase, monomers aggregate into larger particles or oligomers, which increase their size as the nucleation stage comes to an end. Then the elongation stage begins with addition or condensation in an orderly fashion of monomers and oligomers to form protofibrils, and finally, the association of protofribils leads to fibril formation. At pH 7, heat caused the dissociation of oat globulin hexamers by breaking disulfide bonds linking the acidic and basic subunits. This allowed the re-formation of disulfide bonds possibly during the heating process. Hence disulfide bonds contributed to the stabilization of the gel network as a major supporting force, which could further strengthen the gel network and mechanical properties.

Figures 26A, 26B, 26C:
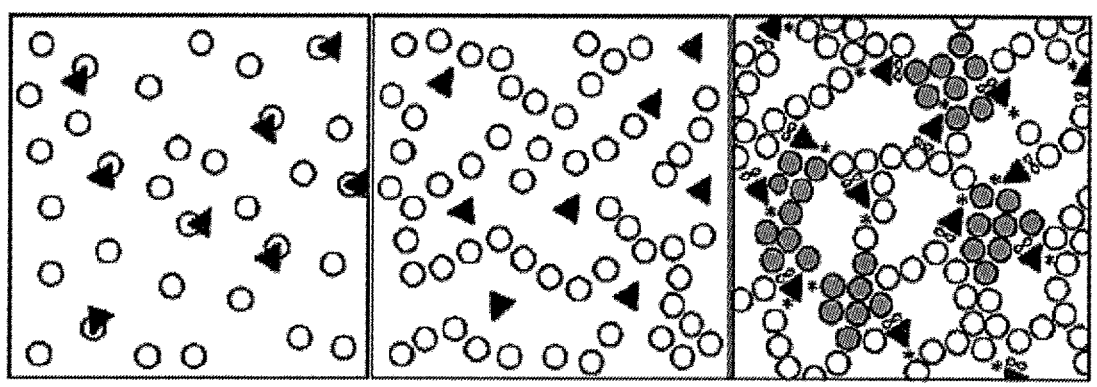
FIGS. 26A to 26C. Schematic representation of the 3 proposed mechanisms of reinforcement of the OPI-inulun gel structure at pH 7. (○) Protein, (▲) Inulin, (*) Hydrogen bonds, (∞) Hydrophobic forces.

Addition of inulin led to formation of phase separated gels during heating processing. This was expected, as it is highly unlikely for the OPI-inulin dispersions to establish electrostatic interactions; the protein has a negative charge at pH 7, whereas inulin has no charge. In this case protein-protein or inulin-inulin interactions require less energy than protein-inulin interactions, thus the system separated into a protein-rich and an inulin-rich phase. In fact, each polymer is excluded from a volume occupied by the other polymer; hence the effective concentration of both polymers is increased sub-micron crystalline structures that are able to immobilized large amounts of water. The addition of a small amount of inulin can force the protein into a smaller volume through the excluded volume effect. In this way an effective higher protein concentration is produced, which causes more intermolecular interactions. In a different study, incorporation of a low concentration of guar gum (neutral polysaccharide) improved the rheological properties of whey protein gels formed by thermal gelation. This was attributed to segregative interactions due to thermodynamic incompatibility of guar gum and whey protein on the gels strength. The addition of glucomannan to whey proteins increased the rate of gelation and G' values of heat-set gels. It was speculated that this improvement was attributed to localized changes in osmotic pressure which caused an apparent concentration of the protein phase greatly improved gel properties attributed to the addition of inulin in small amounts, can be explained by the strengthening effect of inulin nanoparticles homogeneously distributed inside the protein network. According to the rheological test results in section 3.4, addition of inulin may increase hydrogen bonding and hydrophobic interactions to further improve the oat protein gel network structures and mechanical properties. Therefore, it is possible that in the OPI-inulin system, hydrogen bonds and hydrophobic interaction could occur in the border between the continuous network and the discontinuous phase. Hydrophobic interactions between inulin and other proteins such as casein and β-lactoglobulin have been previously suggested due to the fact that inulin is able to form a α-helix in solution and may contain a hydrophobic center that binds to the hydrophobic regions of the oat protein. Another important consideration is that inulin is rich in hydroxyl groups that are able to take part in supramolecular interactions, in particular hydrogen bonding. Hence hydroxyl groups have considerable capacity for hydrogen bond formation with polar residues of the protein. Thus, additional hydrogen bonds and hydrophobic interactions may develop in the border between the continuous network and discontinuous phase that work as a junction zones and provide extra support to the structure. This would explain the reinforcing effect obtained with a small amount of inulin. In summary, three forms of gel reinforcement by inulin at pH 7 are proposed here (FIGS. 26A to 26C): 1) Increased interactions among the protein network by phase separation due to increased protein concentration, causing more intermolecular interactions; 2) Inulin performs a filling effect by occupying the void spaces of the protein network once the phase separation has been promoted by temperature and builds junctions zones; 3) Localized interactions such as hydrogen and hydrophobic bonds take place between protein and inulin at the phase borders.

Conclusion

The strength of oat protein gels may be improved by addition of small amounts of inulin. The enhancement on the mechanical properties of the gels is likely due to the increased concentration of protein produced by the excluded volume effect. Particle size distribution observations indicated that heating at 100° C. causes the dissociation of the oat globulin hexamers into monomer, which become the main reactive unit in the gel network development. Additionally, inulin contributed to the formation of junction zones in which hydrogen bonds and hydrophobic forces may participate in leading to a highly crosslinked gel network with a reinforced structure.

Protein and polysaccharides are often used in combination in the development of food products. The present invention may allow the use of oat protein as an appropriate food gelling agent since the strongest gels were formed at neutral conditions; in previous reports this was only achieved at alkaline conditions.

Section 4—Microwave Treatment

The work above shows that oat protein formed strong gels when heated above 100° C. for 15-20 minutes. We have found that gelling temperature, in any heating step described herein, may be reduced by combining heating and microwave technology, for example, by heating at less than about 100° C. for about 3 min and 15 sec microwave treatment. In one embodiment, microwave heating is done in an ordinary commercial microwave oven, at a power level of about 1000 W to about 1500 W. Microwave radiation may cause a higher degree of protein unfolding and may also contribute to some hydrolysis of the protein. The microwave treatment may occur simultaneously or consecutively with the heating step.

In one embodiment, the OPI gels were prepared with 25% (w/v) protein by 3 min heating at 80° C. followed by 15 sec microwave treatment, and exhibited compressive stress of 5 kPa. Adding about 1 to about 2% (w/v) fatty acids such as sodium dodecanoate may increase the compressive stress to 6-12 kPa. Addition of 1% inulin (w/w based on dry weight of protein) to oat protein in the presence of fatty acids may further enhance the compressive stress to 14 kPa. The gels also showed excellent water holding capacity (>90%) and good springiness (4-5 mm). The gels maintained their strength and water-holding capacity after freeze-thaw cycle treatment and microwave heating.

The gels with combined heat and microwave treatment also demonstrated polymer like network structures, unlike many other globulin protein gels (e.g. whey and soy), as seen in the photographs in FIGS. 27A and 27B. The polymer like network structure is seen to remain after freeze-thaw cycle treatment and microwave heating.

Definitions and Interpretation

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation.

The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment. As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. The exemplary amounts of various components described herein also describe the ranges between such exemplary amounts.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

REFERENCES

All of the references named herein, including those listed below, are incorporated herein by reference, where permitted, as if reproduced herein in their entirety.

References (Sections 1 and 2)

Adler-Nissen, J. (1979). Determination of degree of hydrolysis of food protein hydrolysates by trinitrobenzenesulfonic acid. Journal of Agricultural and Food Chemistry, 6, 1256-1262.

Adler-Nissen, J. (1986). Enzymic hydrolysis of food proteins. Bagsvaerd, Denmark: Elsevier Applied Science Publishers.

Banerjee, P., Keener, K. M., & Lukito, V. D. (2011). Influence of carbon dioxide on the activity of chicken egg with lysozyme. Poultry Science, 90(4), 889-895.

Benítez, R., Ibarz, A., & Pagan, J. (2008). Protein hydrolysates: Processes and applications. Acta Bioquimica Clinica Latinoamericana, 42(2), 227-236.

Braaten, J. T., Wood, P. J., & Scott, F. W. (1994). Oat beta-glucan reduces blood cholesterol concentration in hypercholesterolemic subjects. European Journal of Clinical Nutrition, 48(7), 465-474.

Brinegar, C. A., & Peterson, D. M. (1982). Separation and characterization of oat globulin polypeptides. Archives of Biochemistry and Biophysics, 219(1), 71-79.

Bryant, C. M., & McClements, D. J. (2000). Optimizing preparation conditions for heat-denatured whey protein solutions to be used as cold-gelling ingredients. Journal of Food Science, 65, 259-263.

Burgess, S. R., Shewry, P. R., Matlashewski, G. J., Altosaar, I., & Miflin, B. J. (1983). Characteristics of oat (*Avena sativa*) seed globulin. Journal of Experimental Botany, 34, 1320-1332.

Chantrapornchai, W., & McClements, D. J. (2002). Influence of NaCl on optical properties, large-strain rheology and water holding capacity of heat induced whey protein isolate gels. Food Hydrocolloids, 16, 467-476.

Chen, J., Tian, J., Zheng, F., Li, X., Zhao, Y., Gao, X., et al. (2012). Effects of protein hydrolysis on pasting properties of wheat flour. Starch-Starke, 64, 524-530.

Foegeding, E. A., & Davis, J. P. (2011). Food protein functionality: A comprehensive approach. Food Hydrocolloids, 25, 1853-1864.

Gómez-Guillén, M. C., Turnay, J., Fernández-Díaz, M., Ulmo, N., Lizarbe, M. A., & Montero, P. (2002). Structural and physical properties of gelatin extracted from different marine species: A comparative study. Food Hydrocolloids, 16, 25-34.

Hammershøj, M., & Larsen, L. B. (2001). Effect of hen egg production and protein composition on textural properties of egg albumen gels. Journal of Texture Studies, 32(2), 105-129.

Handa, A., Hayashi, K., Shidara, H., & Kuroda, N. (2001). Correlation of the protein structure and gelling properties in dried egg white products. Journal of Agricultural and Food Chemistry, 49, 3957-3964.

Hou, Y., & Zhao, X.-H. (2011). Limited hydrolysis of two soybean protein products with trypsin and neutrase and the impacts on their solubility, gelation and fat absorption capacity. Biotechnology, 10(2), 190-196.

Inglett, G. E., Lee, S., & Stevenson, D. G. (2008). Converting oats to high-fiber products for use in functional foods. In B. R. Hamaker (Ed.), Technology of functional cereal products (pp. 476-494). Cambridge: CRC, Woodhead.

Klose, C., & Arendt, E. K. (2012). Proteins in Oats; their synthesis and changes during germination: A review. Critical Reviews in Food Science and Nutrition, 52, 629-639.

Kuipers, B. J., & Gruppen, H. (2008). Identification of strong aggregating regions in soy glycinin upon enzymatic hydrolysis. Journal of Agricultural and Food Chemistry, 56, 3818-3827.

Lamsal, B. P., Jung, S., & Johnson, L. (2007). Rheological properties of soy hydrolysates obtained from limited enzymatic hydrolysis. LWT—Food Science and Technology, 40, 1215-1223.

Lefevre, T., & Subirade, M. (2000). Molecular difference in the formation and structure of fine-stranded and particulate beta lactoglobulin gels. Biopolymers, 54, 578-586.

Liu, G., Li, J., Shi, K., Wang, S., Chen, J., Liu, Y., et al. (2009). Composition, secondary structure, and self assembly of oat protein isolate. Journal of Agricultural and Food Chemistry, 57, 4552-4558.

Ma, C.-Y. (1984). Functional properties of acylated oat protein. Journal of Food Science, 49, 1128-1131.

Ma, C.-Y. (1985). Functional properties of oat concentrate treated with linoleate or trypsin. Journal Canadian Institute of Food Science and Technology, 18, 79-84.

Ma, C.-Y., & Harwalkar, V. R. (1987). Thermal coagulation of oat globulin. Cereal Chemistry, 64, 212-218.

Ma, C.-Y., Khanzada, G., & Harwalkar, V. R. (1988). Thermal gelation of oat. Journal of Agricultural and Food Chemistry, 36, 275-280.

Ma, C.-Y., Rout, M. K., & Phillips, D. L. (2003). Study of thermal aggregation and gelation of oat globulin by Raman spectroscopy. Spectroscopy, 17, 417-428.

Ma, C.-Y., & Wood, D. F. (1986). Functional properties of oat proteins modified by acylation, trypsin hydrolysis or linoleate treatment. Journal of the American Oil Chemists Society, 63, 447-447.

Ma, C.-Y., & Wood, D. F. (1987). Functional properties of oat protein modified by acylation, trypsin hydrolysis or linoleate treatment. Journal of the American Oil Chemists Society, 64, 1726-1731.

Mannheim, A., & Cheryan, M. (1992). Enzyme-modified proteins from corn gluten meal: Preparation and functional properties. Journal of the American Oil Chemists Society, 69, 1163-1169.

Mao, R., Tang, J., & Swanson, B. (2001). Water holding capacity and microstucture of gellan gels. Carbohydrate Polymers, 46(4), 356-371.

Marambe, P., Shand, P., &Wanasundara, J. (2008). An in-vitro investigation of selected biological activities of hydrolysed flaxseed (Linum usitatissimum L.) proteins. Journal of the American Oil Chemists Society, 85, 1155-1164.

Mohamed, A., Biresaw, G., Xu, J., Hojilla-Evangelista, M. P., & Rayas-Duarte, P. (2009). Oat protein isolate: Oats protein isolate: Thermal, rheological, surface and functional properties. Food Research International, 42, 107-114.

Molina, E., Defaye, A. B., & Ledward, D. A. (2002). Soy protein pressure-induced gels. Food Hydrocolloids, 16(6), 625-632.

Mulvihill, D. M., Rector, D., & Kinsella, J. E. (1991). Mercaptoethanol, N-ethylmaleimide, propylene glycol and urea effects on rheological properties of thermally induced $\beta$-lactoglobulin gels at alkaline pH. Journal of Food Science, 56(5), 1338-1341.

Pinterits, A., & Arntfield, S. D. (2007). The effect of limited proteolysis on canola protein gelation. Food Chemistry, 102, 1337-1343.

Plietz, P., Zirwer, D., Schlesier, B., Gast, K., & Damaschun, G. (1984). Shape, symmetry, hydration and secondary structure of the legumin from Vicia faba in solution. Biochimica et Biophysica Acta, 784, 140-146.

Pons, M., & Fiszman, S. M. (1996). Instrumental texture profile analysis with particular reference to gelled systems. Journal of Texture Studies, 27, 597-624.

Robert, L. S., Nozzolillo, C., Cudjoe, A., & Altosaar, I. (1983). Total solubilization of groat proteins in high protein oat (Avena sativa L. cv. Hinoat): Evidence that glutelins are aminor component. Journal Canadian Institute of Food Science and Technology, 16(3), 196-200.

Sanchez, A. C., & Burgos, J. (1997). Factors affecting the gelation properties of hydrolyzed sunflower proteins. Journal of Food Science, 62(2), 284-288.

Statistics Canada (2012). Production of principal field crops, November 2012 (final). Retrieved Jan. 28, 2013, from. http://www.statcan.gc.ca/daily-quotidien/121205/dq121205a-eng.htm Sukan, G., & Andrews, A. T. (1982). Application of the plastein reaction to caseins and skim milk powder. I. Protein hydrolysis and plastein formation. Journal of Dairy Research, 49, 265-278.

Sun, X. D., & Arntfield, S. D. (2011). Dynamic oscillatory rheological measurements and thermal properties of pea protein extracted by salt: Effect of pH and NaCl. Journal of Food Engineering, 105, 577-582.

Svendsen, I., & Breddam, K. (1992). Isolation and amino acid sequence of a glutamic acid specific endopeptidase from Bacillus licheniformis. European Journal of Biochemistry, 204, 164-171.

Totosaus, A., Montejano, J. G., Salazar, J. A., & Guerrero, I. (2002). A review of physical and chemical protein-gel induction. International Journal of Food Science and Technology, 37, 589-601.

Wood, P. J., Scott, J. T., Riedel, K. D., Wolynetz, M. S., & Collins, M. W. (1994). Effect of dose and modification of viscous properties of oat gum on plasma glucose and insulin following an oral glucose load. The British Journal of Nutrition, 72(5), 731-743.

Wu, W., Hua, Y., Lin, O., & Xiao, H. (2011). Effects of oxidative modification on thermal aggregation and gel properties of soy protein by peroxyl radicals. International Journal of Food Science and Technology, 46, 1891-1897.

Wu, V., Sexson, K. R., Cluskey, J. E., & Inglett, G. E. (1977). Protein isolate from high-protein oats: Preparation composition and properties. Journal of Food Science, 42(5), 1383-1386.

Yamul, D. K., & Lupano, C. E. (2003). Properties of gels from whey protein concentrate and honey at different pH. Food Research International, 36, 25-33.

Yeom, H.-J., Lee, E.-H., Ha, M.-S., Ha, S.-D., & Bae, D.-H. (2010). Production of physicochemical properties of rice bran protein isolates prepared with autoclaving and enzymatic hydrolysis. Journal of Korean Society for Applied Biological Chemistry, 53(1), 62-70.

Yin, S.-W., Tang, C.-H., Cao, J.-S., Hu, E.-K., Wen, Q.-B., & Yang, X.-Q. (2008). Effects of limited enzymatic hydrolysis with trypsin on the functional properties of hemp (Cannabis sativa L.) protein isolate. Food Chemistry, 106, 1004-1013.

Yuan, S., & Chang, S. (2007). Texture profile of Tufu as affected by Instron parameters and sample preparation, and correlations of Instron hardness and springines with sensory scores. Journal of Food Science, 72(2), 136-144.

Zhao, G., Liu, Y., Zhao, M., Ren, J., & Yang, B. (2011). Enzymatic hydrolysis and their effects on conformational and functional properties of peanut protein isolate. Food Chemistry, 127, 1438-1443.

References (Section 3)

1 Food and Agricultural Organization (FAO), 2012, 2014.
2 L. S. Robert, C. Nozzolillo, A. Cudjoe and I. Altosaar, *Canadian Institute of Food Science and Technology Journal*, 1983, 16, 196-200.
3 C. Ma-Y. and D. Wood F., *J. Am. Oil Chem. Soc.*, 1987, 64, 1726-1731.
4 C. Y. Ma, G. Khanzada and V. R. Harwalkar, *J. Agric. Food Chem.*, 1988, 36, 275-280.
5 T. V. Nieto-Nieto, Y. X. Wang, L. Ozimek and L. Chen, *Food Res. Int.*, 2014, 55, 418-425 (DOI:10.1016/j.foodres.2013.11.038).
6 C. De Kruif and R. Tuinier, *Food Hydrocoll.*, 2001, 15, 555-563.
7 S. Turgeon, M. Beaulieu, C. Schmitt and C. Sanchez, *Current opinion in colloid & interface science*, 2003, 8, 401-414.
8 X. T. Le and S. L. Turgeon, *Soft Matter*, 2013, 9, 3063-3073.
9 V. Morris, in in *Gums and Stabilisers for the Food Industry 3*, ed. ed. G. Phillips, D. Wedloc and P. williams, Elsevier Applied Science, London, 1986, pp.87-99.
10 S. M. Fitzsimons, D. M. Mulvihill and E. R. Morris, *Food Hydrocoll.*, 2008, 22, 576-586.
11 H. H. Chen, S. Y. Xu and Z. Wang, *J. Food Eng.*, 2007, 80, 1051-1059.
12 J. T. Tobin, S. M. Fitzsimons, V. Chaurin, A. L. Kelly and M. A. Fenelon, *Food Hydrocoll.*, 2012, 27, 201-207.
13 M. Tomczynska-Mleko, M. Wesolowska-Trojanowska, P. Grzegory, S. Mleko and L. Ozimek, *Milchwissenschaft-Milk Science International*, 2012, 67, 311-314.
14 Y. Tseng, Y. L. Xiong and F. Yang, *J. Sci. Food Agric.*, 2009, 89, 2650-2658.
15 M. B. Roberfroid, *J. Nutr.*, 2007, 137, 2493S-2502S.
16 C. Blecker, J. Chevalier, J. Van Herck, C. Fougnies, C. Deroanne and M. Paquot, *Recent research developments in agricultural & food chemistry*, 2001, 5, 125-131.
17 A. Bot, U. Erle, R. Vreeker and W. G. Agterof, *Food Hydrocoll.*, 2004, 18, 547-556.
18 O. Arango, A. Trujillo and M. Castillo, *J. Dairy Sci.*, 2013, 96, 1984-1996.
19 D. Guggisberg, J. Cuthbert-Steven, P. Piccinali, U. Bitikofer and P. Eberhard, *Int. Dairy J.*, 2009, 19, 107-115.
20 A. Girl, S. K. Kanawjia and Y. Khetra, *Food and Bioprocess Technology*, 2014, 7, 1533-1540.
21 P. Van der Meeren, K. Dewettinck and H. Saveyn, in in *Handbook of Food Analysis: Methods and instruments in applied food analysis<br /><br />*, ed. ed. L. Nollet, Marcel Dekker AG, 2004, pp.1805-1807.
22 S. Ikeda and V. J. Morris, *Biomacromolecules*, 2002, 3, 382-389.
23 P. Glibowski and A. Bukowska, *Acta Scientiarum Polonorum. Technologia Alimentaria*, 2011, 10, 189-196.
24 J. A. Pires Vilela, A L. F. Cavallieri and R. Lopes da Cunha, *Food Hydrocoll.*, 2011, 25, 1710-1718 (DOI: http://dx.doi.org/10.1016/j.foodhyd.2011.03.012).
25 F. A. Perrechil, A. L. M. Braga and R. L. Cunha, *Int. J. Food Sci. Tech.*, 2013, 48, 620-627.
26 C. E. Lupano and S. Gonzalez, *J. Agric. Food Chem.*, 1999, 47, 918-923.
27 J. Liu, K. Zhu, T. Ye, S. Wan, Y. Wang, D. Wang, B. Li and C. Wang, *Food Res. Int.*, 2013, 51, 437-443 (DOI: http://dx.doi.org/10.1016/j.foodres.2013.01.002).
28 E. A. Foegeding, *Current Opinion in Colloid & Interface Science*, 2007, 12, 242-250.
29 W. Chantarpornchai and D. J. McClements, *Food Hydrocoll.*, 2002, 16, 467-476.
30 M. Djabourov, *Contemporary Physics*, 1988, 29, 273-297.
31 K. Weigandt and D. Pozzo, in in *Proteins in Solutions and at Interphases: Methods and Applications in Biotechnology and Material Science*, ed. ed. J. M. Ruso and A. Pifieiro, John Wiley & Sons, Inc., 2013, pp.437-448.
32 S. R. Owen, M. A. Tung and A. T. Paulson, *J. Food Eng.*, 1992, 16, 39-53.
33 J. Lefebvre, Y. Popineau, G. Deshayes and L. Lavenant, *Cereal Chem.*, 2000, 77, 193-201.
34 Y. Kim, M. Faqih and S. Wang, *Carbohydr. Polym.*, 2001, 46, 135-145.
35 S. Samant, R. Singhal, P. Kulkarni and D. Rege, *Int. J. Food Sci.* Tech., 1993, 28, 547-562.
36 Y. Zhao, Y. Mine and C. Ma, *J. Agric. Food Chem.*, 2004, 52, 3089-3096.
37 C. Ma, M. K. Rout and W. Mock, *J. Agric. Food Chem.*, 2001, 49, 3328-3334.
38 T. Lefevre and M. Subirade, *Biopolymers*, 2000, 54, 578-586.
39 G. E. Remondetto and M. Subirade, *Biopolymers*, 2003, 69, 461-469.
40 T. van Vliet, in in *Hydrocolloids*, ed. ed. K. Nishinari, New York, Elsevier Science, 2000, pp.367-377.
41 R. Sarroukh, E. Goormaghtigh, J. Ruysschaert and V. Raussens, *Biochimica et Biophysica Acta (BBA)-Biomembranes*, 2013, 1828, 2328-2338.
42 V. Tolstoguzov, in in *Understanding and controlling the microstructure of complex foods*, ed. ed. D. McClements, Woodhead Publishing in Food Science, Technology and Nutrition, 2007, pp.185-206.
43 L. Schaller-Povolny and D. Smith, *Milchwissenschaft*, 2002, 57, 494-497.
44 P. Glibowski, *Int. Dairy J.*, 2009, 19, 443-449.
45 T. Barclay, M. Ginic-Markovic, P. Cooper and N. Petrovsky, *Journal of Excipients & Food Chemicals*, 2010, 1, 27-50.

46 A. Boraston, D. Bolam, H. Gilbert and G. Davies, *Biochem. J.,* 2004, 382, 769-781.

The invention claimed is:

1. A method of forming an oat protein gel, comprising the step of partially hydrolyzing oat protein with trypsin or flavourzyme to produce a hydrolysate comprising peptides having a molecular weight between about 26 to 34 kDa, 17 to 26 kDa and a larger number of peptides between 0.7 kDa and 2.4 kDa, and forming a gel from the hydrolysate.

2. The method of claim 1 wherein the pH of the gel formation step is between about pH 8 and about pH 9.

3. A method of forming an oat protein gel, comprising the step of pre-heating a non-hydrolyzed oat protein solution at of less than about 10% (w:v), between about 5% and 9% (w:v) to disassociate globular proteins, mixing with an organic acid or acidulant, and non-thermally forming the gel.

4. The method of claim 3 wherein the oat protein is pre-heated at a temperature above the denaturation temperature of the oat protein and less than about 120° C.

5. The method of claim 3 wherein the organic acid or acidulant at less than about 20% w/w of protein, at a pH less than about 9.

6. The method of claim 5 wherein the acid or acidulant comprises GDL.

7. The method of claim 6 wherein the oat protein is added about 7% w/v, and GDL at about 10% w/w of protein, at a pH of about 8.

8. A method of forming an oat protein gel, comprising the step of mixing oat protein with inulin, wherein the oat protein has a protein concentration greater than about 10% (w:v), inulin has a concentration greater than about 0.1% (based on dry weight of protein) and less than about 5%, heating the mixture at about 100° C., at about pH 5 to about pH 7, without an added acid or acidulant.

9. A method of forming an oat protein gel comprising the steps of heating an oat protein isolate at 25% (w:v) at less than about 100° C. and microwaving the oat protein for about 15 seconds, either consecutively or simultaneously.

10. The method of claim 1 wherein the degree of hydrolysis is less than about 20.

11. The method of claim 10 wherein the degree of hydrolysis is less than about 10.

12. The method of claim 3, wherein the protein concentration is between about 5% and 7% (w:v).

* * * * *